(12) United States Patent
Okano

(10) Patent No.: US 9,199,622 B2
(45) Date of Patent: Dec. 1, 2015

(54) HYDRAULIC BRAKE SYSTEM

(75) Inventor: Takahiro Okano, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/381,869

(22) PCT Filed: Mar. 7, 2012

(86) PCT No.: PCT/JP2012/055808
§ 371 (c)(1),
(2), (4) Date: Aug. 28, 2014

(87) PCT Pub. No.: WO2013/132609
PCT Pub. Date: Sep. 12, 2013

(65) Prior Publication Data
US 2015/0035351 A1 Feb. 5, 2015

(51) Int. Cl.
| | |
|---|---|
| B60T 8/88 | (2006.01) |
| B60T 13/66 | (2006.01) |
| B60T 8/48 | (2006.01) |
| B60T 13/12 | (2006.01) |
| B60T 17/22 | (2006.01) |
| B60T 8/32 | (2006.01) |
| B60T 8/36 | (2006.01) |
| B60T 7/04 | (2006.01) |
| B60T 8/40 | (2006.01) |
| B60T 13/14 | (2006.01) |
| B60T 13/68 | (2006.01) |

(52) U.S. Cl.
CPC ............... *B60T 13/662* (2013.01); *B60T 7/042* (2013.01); *B60T 8/3265* (2013.01); *B60T 8/3655* (2013.01); *B60T 8/4077* (2013.01); *B60T 8/48* (2013.01); *B60T 13/12* (2013.01); *B60T 13/14* (2013.01); *B60T 13/146* (2013.01); *B60T 13/686* (2013.01); *B60T 17/22* (2013.01); *B60T 2270/403* (2013.01)

(58) Field of Classification Search
CPC ............... B60T 8/88; B60T 8/92; B60T 8/94; B60T 17/22; B60T 17/221; B60T 17/225; B60T 2270/403
USPC ................... 303/122, 122.09, 122.13, 122.14
See application file for complete search history.

(56) References Cited

U.S. PATENT DOCUMENTS

| | | | | |
|---|---|---|---|---|
| 5,951,120 A | * | 9/1999 | Shimura et al. | 303/122.05 |
| 5,979,997 A | * | 11/1999 | Ohkubo et al. | 303/122.09 |

(Continued)

FOREIGN PATENT DOCUMENTS

| | | |
|---|---|---|
| JP | 2001-219841 A | 8/2001 |
| JP | 2005 35469 | 2/2005 |

(Continued)

OTHER PUBLICATIONS

International Search Report Issued Jun. 5, 2012 in PCT/JP12/055808 Filed Mar. 7, 2012.

*Primary Examiner* — Thomas J Williams
(74) *Attorney, Agent, or Firm* — Oblon, McClelland, Maier & Neustadt, L.L.P.

(57) ABSTRACT

A hydraulic brake system for a vehicle in which a pressure of a working fluid supplied from a high-pressure-source device having a pump is adjusted by an electromagnetic pressure-increase linear valve and an electromagnetic pressure-decrease linear valve, and a brake device provided for a wheel generates a braking force whose magnitude depends on the pressure adjusted by the linear valves, the hydraulic brake system being configured to cope with fluid leakage in the pressure-increase linear valve that is beyond a set degree.

20 Claims, 18 Drawing Sheets

(56) References Cited

U.S. PATENT DOCUMENTS

| | | | |
|---|---|---|---|
| 6,123,397 A * | 9/2000 | Ohtomo et al. | 303/122.05 |
| 6,450,591 B1 * | 9/2002 | Kawahata et al. | 303/122.05 |
| 2013/0127240 A1 * | 5/2013 | Noro et al. | 303/14 |

FOREIGN PATENT DOCUMENTS

| | | |
|---|---|---|
| JP | 2006 175960 | 7/2006 |
| JP | 2011 156998 | 8/2011 |
| JP | 2011-235721 A | 11/2011 |

* cited by examiner

FIG.23

| | | CONTROL OF HIGH-PRESSURE-SOURCE DEVICE | CONTROL OF PRESSURE-INCREASE LINEAR VALVE | CONTROL OF PRESSURE-DECREASE LINEAR VALVE |
|---|---|---|---|---|
| NORMAL-CONDITION BRAKE CONTROL | BRAKING-FORCE NON-REQUIRED STATE | NORMAL-CONDITION HIGH-PRESSURE-SOURCE CONTROL | — | — |
| | BRAKING-FORCE REQUIRED STATE | NORMAL-CONDITION HIGH-PRESSURE-SOURCE CONTROL | NORMAL-CONDITION PRESSURE-INCREASE-VALVE CONTROL | NORMAL-CONDITION PRESSURE-DECREASE-VALVE CONTROL |
| BRAKE CONTROL IN SMALL-VOLUME LEAKAGE CONDITION | BRAKING-FORCE NON-REQUIRED STATE | PUMP INTERMITTENT-DRIVING CONTROL | — | — |
| | BRAKING-FORCE REQUIRED STATE | PUMP INTERMITTENT-DRIVING CONTROL PUMP FORCIBLE-DRIVINGCONTROL | NORMAL-CONDITION PRESSURE-INCREASE-VALVE CONTROL | NORMAL-CONDITION PRESSURE-DECREASE-VALVE CONTROL |
| FIRST BRAKE CONTROL IN LARGE-VOLUME LEAKAGE CONDITION | BRAKING-FORCE NON-REQUIRED STATE | FIRST PUMP-DRIVING LIMITING CONTROL [PUMP-DRIVING INHIBITING CONTROL] [UPPER-LIMIT-PRESSURE REDUCING CONTROL] | — | — |
| | BRAKING-FORCE REQUIRED STATE | PUMP FORCIBLE-DRIVING CONTROL | NORMAL-CONDITION PRESSURE-INCREASE-VALVE CONTROL | NORMAL-CONDITION PRESSURE-DECREASE-VALVE CONTROL |
| SECOND BRAKE CONTROL IN LARGE-VOLUME LEAKAGE CONDITION | BRAKING-FORCE NON-REQUIRED STATE | SECOND PUMP-DRIVING LIMITING CONTROL [PUMP-DRIVING INHIBITING CONTROL] | — | — |
| | BRAKING-FORCE REQUIRED STATE | FIRST PUMP-BASED PRESSURE REGULATING CONTROL | PRESSURE-INCREASE-VALVE OPENING CONTROL | NORMAL-CONDITION PRESSURE-DECREASE-VALVE CONTROL |
| THIRD BRAKE CONTROL IN LARGE-VOLUME LEAKAGE CONDITION | BRAKING-FORCE NON-REQUIRED STATE | SECOND PUMP-DRIVING LIMITING CONTROL [PUMP-DRIVING INHIBITING CONTROL] | — | — |
| | LARGE-BRAKING-FORCE REQUIRED STATE | PUMP FORCIBLE-DRIVING CONTROL | PRESSURE-INCREASE-VALVE CLOSURE MAINTAINING CONTROL PRESSURE-INCREASE-VALVE OPENING ADJUSTING CONTROL | PRESSURE-DECREASE-VALVE ADJUSTING CONTROL |
| | SMALL-BRAKING-FORCE REQUIRED STATE | SECOND PUMP-BASED PRESSURE REGULATING CONTROL | PRESSURE-INCREASE-VALVE OPENING CONTROL | PRESSURE-DECREASE-VALVE CLOSURE MAINTAINING CONTROL PRESSURE-DECREASE-VALVE OPENING ADJUSTING CONTROL |

HYDRAULIC BRAKE SYSTEM

TECHNICAL FIELD

The present invention relates to a hydraulic brake system for a vehicle.

BACKGROUND ART

As a hydraulic brake system for a vehicle, there is known a system disclosed in the following Patent Literature, for instance. The disclosed system is configured such that a pressure of a working fluid supplied from a high-pressure-source device is adjusted by a pressure-increase linear valve and a pressure-decrease linear valve and a brake device provided for a wheel generates a braking force whose magnitude depends on the pressure adjusted by the linear valves, namely, an adjusted pressure. In this system, in view of a risk that a sufficient braking force is not obtained in a case where leakage of the working fluid occurs in the brake device or in fluid passages that communicate with the brake device, some measures are taken to cope with the fluid leakage.

CITATION LIST

Patent Literature

Patent Literature 1: JP-A-2011-156998

SUMMARY OF INVENTION

Technical Problem

In a hydraulic brake system for generating a braking force whose magnitude depends on a pressure of a working fluid adjusted by electromagnetic pressure-increase and pressure-decrease linear valves, namely, in a pressure regulating system utilizing linear valves, fluid leakage in the pressure-increase linear valve causes a phenomenon different from a phenomenon caused by the fluid leakage with which the system disclosed in the Patent Literature intends to cope. Accordingly, to cope with the fluid leakage in the pressure-increase linear valve leads to an improvement in the utility of the pressure regulating system utilizing the linear valves. The present invention has been made in view of such situations. It is therefore an object of the invention to provide a hydraulic brake system having a high degree of utility.

Solution to Problem

To solve the problem described above, the invention provides a hydraulic brake system in which a pressure of a working fluid supplied from a high-pressure-source device having a pump is adjusted by an electromagnetic pressure-increase linear valve and an electromagnetic pressure-decrease linear valve, and a brake device provided for a wheel generates a braking force whose magnitude depends on the pressure adjusted by the linear valves (adjusted pressure). The hydraulic brake system according to the present invention is configured to cope with fluid leakage in the pressure-increase linear valve, more specifically, to cope with fluid leakage that is beyond a set degree.

Advantageous Effects of Invention

When fluid leakage occurs in the pressure-increase linear valve, the leaked working fluid flows into a reservoir via the pressure-decrease linear valve, whereby a time or a frequency of driving of the pump of the high-pressure-source device is increased, and the load on the pump, accordingly, the load on a drive source for the pump, is increased. Further, when the fluid leakage that is beyond the set degree occurs, the adjusted pressure may be increased even if the pressure-decrease linear valve is in an open state and there is accordingly a risk that the brake device unintentionally generates a braking force, namely, there is a risk of occurrence of the so-called brake drag phenomenon. The hydraulic brake system according to the present invention is configured to cope with the fluid leakage in the pressure-increase linear valve. Therefore, according to the present hydraulic brake system, it is possible to obviate or reduce an increase in the load on the pump and occurrence of the brake drag phenomenon. Accordingly, the present hydraulic brake system has a high degree of utility.

Forms of Invention

There will be exemplified and explained various forms of an invention that is considered claimable. (The invention will be hereinafter referred to as "claimable invention" where appropriate and is a concept that includes an invention relating to claims). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

In the following forms, a combination of the forms (1) and (11) correspond to claim 1. A form in which the matter to define the invention of the form (13) is added to claim 1 corresponds to claim 2. A form in which the matter to define the invention of the form (14) is added to claim 2 corresponds to claim 3. A form in which the matter to define the invention of the form (15) is added to claim 2 corresponds to claim 4. A form in which the matter to define the invention of the form (16) is added to claim 4 corresponds to claim 5. A form in which the matter to define the invention of the form (17) is added to any one of claims 2-5 corresponds to claim 6. A form in which the matter to define the invention of the form (18) is added to any one of claims 2-5 corresponds to claim 7. A form in which the matter to define the invention of the form (20) is added to claim 7 corresponds to claim 8. A form in which the matter to define the invention of the form (21) is added to any one of claims 2-5 corresponds to claim 9. A form in which the matter to define the invention of the form (31) is added to any one of claims 1-9 corresponds to claim 10. A form in which the matter to define the invention of the form (32) is added to claim 10 corresponds to claim 11. A form in which the matter to define the invention of the form (33) is added to claim 10 corresponds to claim 12. A form in which the matter to define the invention of the form (12) is added to any one of claims 1-12 corresponds to claim 13. A form in which the matter to define the invention of the form (41) is added to any one of claims 1-13 corresponds to claim 14. A form in which the matter to define the invention of the form (44) is added to claim 14 corresponds to claim 15. A form in which the matter to define the invention of the form (45) is added to claim 14 or 15 corresponds to claim 16. A form in which the matter to define the invention of the form (46) is added to claim 16 corresponds to claim 17. A form in which the matter to define the invention of the form (47) is added to claim 16 or 17 corresponds to claim 18. A form in which the matter to define the invention of the form (2) is added to any one of claims 1-18 corresponds to claim 19. A form in which the matter to define the invention of the form (4) is added to any one of claims 1-19 corresponds to claim 20.

[A] Basic Forms (1) A hydraulic brake system for a vehicle, comprising: (a) a brake device provided for a wheel of the vehicle, (b) a high-pressure-source device having a pump configured to pump up a working fluid from a low-pressure source and to pressurize the working fluid and an accumulator for accumulating the working fluid pressurized by the pump, the high-pressure-source device being configured to supply the working fluid that is highly pressurized, (c) a pressure adjusting valve device having an electromagnetic pressure-increase linear valve and an electromagnetic pressure-decrease linear valve that are disposed in series between the high-pressure-source device and the low-pressure source, the pressure adjusting valve device being configured to adjust a pressure of the working fluid between the pressure-increase linear valve and the pressure-decrease linear valve, and (d) a controller configured to control the hydraulic brake system, the hydraulic brake system being configured to cause the brake device to generate a braking force whose magnitude depends on an adjusted pressure that is a pressure of the working fluid adjusted by the pressure adjusting valve device, wherein the controller includes:

a high-pressure-source control portion configured to execute a normal-condition high-pressure-source control in which a high-pressure-source pressure that is a pressure of the working fluid supplied from the high-pressure-source device is maintained so as to fall within a set pressure range by activating the pump when the high-pressure-source pressure becomes lower than a set lower-limit pressure and by stopping the pump when the high-pressure-source pressure becomes higher than a set upper-limit pressure;

a valve control portion configured to execute a normal-condition pressure-increase-valve control in which electricity to be supplied to the pressure-increase linear valve is adjusted and a normal-condition pressure-decrease-valve control in which electricity to be supplied to the pressure-decrease linear valve is adjusted, such that the adjusted pressure becomes equal to a pressure in accordance with a required braking force that is a braking force required to be generated by the brake device; and a fluid leakage coping portion configured to cope with leakage of the working fluid when the leakage of the working fluid is detected in the pressure-increase linear valve.

This form relates to a basic structure of a hydraulic brake system according to the claimable invention and relates to a functional portion to cope with fluid leakage in the pressure-increase linear valve. In the hydraulic brake system having the basic structure described above (hereinafter referred to as "pressure regulating system utilizing linear valves" where appropriate), in a case where the pressure-increase linear valve is suffering from leakage of the working fluid (hereinafter simply referred to as "fluid leakage" where appropriate), the working fluid leaks even if the pressure-increase linear valve is in a closed state, and the leaked working fluid flows to a reservoir via the pressure-decrease linear valve when the pressure-decrease linear valve is in an open state. That is, the fluid leakage coping portion in this form copes with such fluid leakage in the pressure-increase linear valve. Where such fluid leakage occurs in the pressure regulating system utilizing linear valves, a reduction in the high-pressure-source pressure, namely, an outflow of the working fluid from the high-pressure-source device, causes an increase in a driving time or a driving frequency of the pump of the high-pressure-source device, thereby increasing the load on the pump and accordingly increasing the load on a drive source for the pump such as a motor. Further, there may be a risk of occurrence of various defects such as the so-called brake drag phenomenon as explained later in detail. The system according to this form is configured to cope with the fluid leakage in the pressure-increase linear valve, so that it is possible to obviate or reduce an increase in the load on the pump and various defects. As a result, the system according to this form has a high degree of utility.

The system according to this form may be arranged such that the working fluid whose pressure is adjusted to the adjusted pressure is supplied directly to the brake device. Alternatively, the system may be arranged such that the working fluid whose pressure is adjusted to the adjusted pressure is supplied to a pressure regulator or a master cylinder device and the working fluid having a pressure in accordance with the adjusted pressure is supplied to the brake device from the pressure regulator or the master cylinder device, as later explained. Moreover, the system may be arranged such that the working fluid whose pressure is adjusted to the adjusted pressure is supplied to a pressure regulator, the working fluid having a pressure in accordance with the adjusted pressure is supplied from the pressure regulator to a master cylinder device, and the working fluid having a pressure in accordance with the pressure is supplied from the master cylinder device to the brake device.

Each of the electromagnetic pressure-increase linear valve and the electromagnetic pressure-decrease linear valve may be of a normally closed type or a normally open type. That is, the electromagnetic linear valves in this form may be the ones configured to be closed in a non-energized state and to be opened in an energized state or may be the ones configured to be opened in a non-energized state and to be closed in an energized state.

[B] Variations of Hardware Structure (2) The hydraulic brake system according to the form (1), further comprising a pressure regulator having a pilot chamber and configured to regulate a pressure of the working fluid supplied from the high-pressure-source device so as to be equal to a pressure in accordance with a pilot pressure that is a pressure of the working fluid in the pilot chamber and to supply the working fluid whose pressure is regulated, wherein the pressure-increase linear valve is disposed between the high-pressure-source device and the pilot chamber and the pressure-decrease linear valve is disposed between the pilot chamber and the low-pressure source, whereby the pressure adjusting valve device adjusts the pilot pressure as the adjusted pressure, and wherein the hydraulic brake system is configured to cause the brake device to generate a braking force whose magnitude depends on a supply pressure that is a pressure of the working fluid supplied from the pressure regulator.

This form includes the above-indicated two arrangements: the arrangement in which the working fluid whose pressure is adjusted to the adjusted pressure is supplied to the pressure regulator and the working fluid having a pressure in accordance with the adjusted pressure is supplied directly to the brake device from the pressure regulator; and the arrangement in which the working fluid whose pressure is adjusted to the adjusted pressure is supplied to the pressure regulator, the working fluid having a pressure in accordance with the adjusted pressure is supplied to a master cylinder device, and the working fluid having a pressure in accordance with the pressure is supplied from the master cylinder device to the brake device.

In the system according to this form, the working fluid whose pressure is adjusted to the adjusted pressure is not directly supplied to the brake device, but is supplied to the pilot chamber of the pressure regulator. Accordingly, in the system according to this form, because the adjusted pressure serves as the pilot pressure, the braking force generated by the brake device is largely influenced by the fluid leakage in the pressure-increase linear valve even if the leakage amount of the working fluid is small, as compared with a system in which the working fluid whose pressure is adjusted to the adjusted pressure is supplied directly to the brake device. In other words, even if a relatively low degree of the fluid leakage is occurring, there is a high possibility that the brake device generates an unintended braking force due to the fluid leakage. In this sense, the system according to this form fully exhibits the advantage of having the fluid leakage coping portion.

(3) The hydraulic brake system according to the form (2),
wherein the pressure regulator includes a housing, a movable member disposed in the housing so as to be movable in an axial direction of the housing, a valve mechanism disposed in the housing so as to be arranged with the movable member in the axial direction, and a low-pressure-source communication passage that communicates with the low-pressure source, wherein the pressure regulator includes: a regulated-pressure chamber which is formed on one of opposite sides of the movable member near to the valve mechanism and which accommodates the working fluid having the supply pressure and supplied from the pressure regulator; a pilot chamber formed on the other of the opposite sides of the movable member remote from the valve mechanism; and a high pressure chamber which is formed such that the valve mechanism is sandwiched between the high pressure chamber and the regulated-pressure chamber and which receives the working fluid having the high-pressure-source pressure and supplied from the high-pressure-source device, and wherein, when the movable member is moved in the axial direction toward the valve mechanism by a pressure-difference-based acting force that acts on the movable member depending on a pressure difference between the supply pressure and the pilot pressure, the movable member engages with the valve mechanism, whereby the valve mechanism permits communication between the regulated-pressure chamber and the high pressure chamber and shuts off communication between the regulated-pressure chamber and the low-pressure-source communication passage, and wherein, when the movable member is moved in the axial direction away from the valve mechanism by the pressure-difference-based acting force, the movable member disengages from the valve mechanism, whereby the valve mechanism shuts off the communication between the regulated-pressure chamber and the high pressure chamber and permits the communication between the regulated-pressure chamber and the low-pressure-source communication passage.

In this form, there is added limitation relating to concrete configuration of the pressure regulator.

(4) The hydraulic brake system according to any one of the forms (1)-(3), further comprising a master cylinder device to which a brake operation member is connected and which is configured to receive the working fluid having the adjusted pressure or a pressure in accordance with the adjusted pressure and to supply, to the brake device, the working fluid that is pressurized depending on the pressure of the received working fluid without depending on an operation force applied to the brake operation member by a driver, wherein the hydraulic brake system is configured to cause the brake device to generate a braking force whose magnitude depends on a master pressure that is a pressure of the working fluid supplied from the master cylinder device to the brake device.

This form includes the above-indicated two arrangements: the arrangement in which the working fluid whose pressure is adjusted to the adjusted pressure is supplied directly to the master cylinder device, and the working fluid having a pressure in accordance with the adjusted pressure is supplied from the master cylinder device to the brake device; and the arrangement in which the working fluid whose pressure is adjusted to the adjusted pressure is supplied to the pressure regulator, the working fluid having a pressure in accordance with the adjusted pressure is supplied to the master cylinder device, and the working fluid having a pressure in accordance with the pressure is supplied from the master cylinder device to the brake device. The latter arrangement is a combination of this form and the form explained above with respect to the pressure regulator.

In the master cylinder device according to this form, the working fluid having the adjusted pressure or having a pressure in accordance with the adjusted pressure is introduced into the master cylinder device, and the working fluid having a pressure in accordance with the pressure of the introduced working fluid is supplied from the master cylinder device to the brake device, depending on the structure of the master cylinder device. In general, a brake operation force is input to the master cylinder device. Therefore, by suitably designing the master cylinder device, the master cylinder device may be configured such that the working fluid to be supplied to the brake device is pressurized in dependence on the brake operation force applied to the brake operation member, when the system suffers from some sort of defect, or the master cylinder device may be configured such that the working fluid to be supplied to the brake device is arbitrarily pressurized in dependence on both of the introduced working fluid and the brake operation force. The master cylinder device having such a configuration contributes to enhancement of the utility of the system according to this form.

The master cylinder device in this form is configured to pressurize the working fluid depending on the adjusted pressure or the pressure in accordance with the adjusted pressure, without depending on the brake operation force, so as to supply the pressurized working fluid to the brake device. Therefore, the system according to this form is suitable for vehicles in which a regenerative brake system is additionally employed.

(5) The hydraulic brake system according to the form (4),
wherein the master cylinder device has (A) a housing whose front-side end is closed and which includes a partition portion partitioning an interior of the housing into a front-side chamber and a rear-side chamber, the partition portion having an opening formed therethrough, (B) a pressurizing piston which has a main body portion having a flange formed at a rear end of the main body portion and disposed in the front-side chamber, (C) an input piston connected to the brake operation member and disposed in the rear-side chamber, and (D) a reaction-force applying mechanism configured to apply, to the input piston, a reaction force against a forward movement of the input piston having a magnitude in accordance with an amount of the forward movement, wherein the master cylinder device has (a) a pressurizing chamber which is formed forward of the main body portion of the pressurizing piston and in which the working fluid to be supplied to the brake device is pressurized by a forward movement of the pressurizing piston, (b) an inter-piston chamber defined between the pressurizing piston and the input piston by utilizing the opening formed in the partition portion of the housing, such that the pressurizing piston and the input piston face to each other with the inter-piston chamber interposed therebetween, (c) an input chamber which is defined between the flange formed on the main body portion of the pressurizing piston and the partition portion and to which is input the working fluid having the adjusted pressure or the pressure in accordance with the adjusted pressure, and (d) an opposing chamber which is formed forward of the flange so as to be opposed to the input chamber with the flange interposed therebetween and which communicates with the inter-piston chamber, and wherein a pressure receiving area of the pressurizing piston on which a pressure of the working fluid in the inter-piston chamber acts and a pressure receiving area of the pressurizing piston on which a pressure of the working fluid in the opposing chamber acts are made equal to each other.

In this form, there is added limitation relating to a concrete configuration of the master cylinder device.

[C] Measures for Coping with Large-volume Leakage

(11) The hydraulic brake system according to any one of the forms (1)-(5), wherein the fluid leakage coping portion has a large-volume leakage coping portion configured to cope with the leakage of the working fluid in the pressure-increase linear valve that is beyond a set degree.

The system according to this form, it is possible to cope with a relatively high degree of the fluid leakage in the pressure-increase linear valve. Here, the degree of the fluid leakage means a level of an amount of the working fluid that leaks (e.g., a leakage amount per unit time), a level of a velocity of the flow of the working fluid that leaks, or the like. As explained above, the working fluid that has leaked from the pressure-increase linear valve is discharged into the reservoir via the pressure-decrease linear valve. When a high degree of the fluid leakage (hereinafter referred to as "large-volume leakage" where appropriate) occurs, however, the leaked working fluid is not smoothly discharged even if the pressure-decrease linear valve is in the open state. In this case, the adjusted pressure is increased, and there may arise a possibility that the brake device generates an unintended braking force, that is, a possibility of occurrence of the so-called "brake drag phenomenon". In the system according to this form, it is possible to prevent or reduce the brake drag phenomenon due to the fluid leakage in the pressure-increase linear valve.

(12) The hydraulic brake system according to the form (11), wherein the set degree is set as a degree of the leakage of the working fluid in the pressure-increase linear valve at which generation of the braking force is expected when the pressure-increase linear valve is in a closed state and the pressure-decrease linear valve is in an open state.

In this form, in short, the fluid leakage that causes the brake drag phenomenon is defined as the large-volume leakage, and it is clarified that this form copes with the large-volume leakage.

1. Control in Braking-Force Non-Required State

(13) The hydraulic brake system according to the form (11) or (12), wherein the large-volume leakage coping portion is configured to control the high-pressure-source control portion to execute, in a braking-force non-required state in which generation of the braking force by the brake device is not required, a pump-driving limiting control in which driving of the pump is limited, in place of the normal-condition high-pressure-source control.

In this form, there is added limitation in relation to the control of the high-pressure-source device in the braking-force non-required state when the fluid leakage is occurring. The "driving of the pump is limited" in this form includes limiting a time period during which the pump is being driven, limiting a frequency at which the pump is driven, limiting the output of the pump, and so on. Where the high-pressure-source device is configured such that the pump is driven by a drive source such as an electric motor or the like, the "driving of the pump is limited" means limiting the operation of the drive source.

As explained above, when the pressure-increase linear valve is suffering from the fluid leakage, the working fluid in the high-pressure-source device, i.e., the working fluid in the accumulator, is discharged into the reservoir through the pressure-decrease linear valve that is in the open state. The outflow of the working fluid increases the driving time of the pump or the driving frequency of the pump. Where the fluid leakage is the large-volume leakage, the increase of the driving time or the driving frequency of the pump is relatively large. In view of this, driving of the pump is limited in this form. By limiting driving of the pump, it is possible to reduce a load on the pump, i.e., a load on the drive source for driving the pump.

(14) The hydraulic brake system according to the form (13), wherein the high-pressure-source control portion is configured to limit driving of the pump in the pump-driving limiting control by inhibiting driving of the pump irrespective of whether the high-pressure-source pressure falls within the set pressure range.

In the system according to this form, the pump of the high-pressure-source device is not driven in the braking-force non-required state when the pressure-increase linear valve is suffering from the large-volume leakage. Accordingly, the load on the pump is largely reduced.

(15) The hydraulic brake system according to the form (13), wherein the high-pressure-source control portion is configured to limit driving of the pump in the pump-driving limiting control by stopping driving of the pump when the high-pressure-source pressure becomes higher than an upper-limit pressure in a large-volume leakage condition that is set so as to be lower than the set upper-limit pressure.

In this form, in short, when the pressure-increase linear valve is suffering from the large-volume leakage, the normal-condition high-pressure-source control is executed in the braking-force non-required state while setting, to a low level, the set upper-limit pressure that defines an upper limit of the set pressure range set for the high-pressure-source pressure. By thus controlling the high-pressure-source pressure, the driving time of the pump is shortened, thereby reducing the load on the pump. The system according to this form is inferior in the reduction effect of the load on the pump, as compared with the above-indicated form in which driving of the pump is inhibited. However, in the present system, the high-pressure-source pressure is maintained so as to be equal to or higher than a certain level, in contrast to the above-indicated form. It is accordingly possible to relatively quickly respond to a request for the braking force. It is noted that the set lower-limit pressure may also be set to a lower level, in addition to the set upper-limit pressure.

As the control of the high-pressure-source device in the braking-force non-required state when the pressure-increase linear valve is suffering from the fluid leakage, both of the control in this form and the above-indicated form in which driving of the pump is inhibited may be executed. In this instance, the two controls may be switchable, namely, may be selectively executed, depending upon arbitrary selection by the driver, some parameters indicative of the degree of the fluid leakage or the like, the running state of the vehicle, or the like, for instance.

(16) The hydraulic brake system according to the form (15), wherein the upper-limit pressure in the large-volume leakage condition is set as a pressure that does not cause generation of the braking force by the brake device in the braking-force non-required state.

According to this form, even when the pressure-increase linear valve is suffering from the fluid leakage, the high-pressure-source pressure is kept, in the braking-force non-required state, at the pressure lower than the pressure that does not cause the brake drag phenomenon described above. Therefore, this form can prevent the brake drag phenomenon with high reliability while responding to the request for the braking force relatively quickly.

2. Control in Braking-Force Required State

(17) The hydraulic brake system according to any one of the forms (11)-(16), wherein the large-volume leakage coping portion is configured to control the high-pressure-source control portion to execute, in a braking-force required state in which generation of the braking force by the brake device is required, a pump forcible-driving control in which the pump is driven irrespective of whether the high-pressure-source pressure falls within the set pressure range, in place of the normal-condition high-pressure-source control.

According to this form, the pump of the high-pressure-source device is forcibly driven in the braking-force required state when the pressure-increase linear valve is suffering from the large-volume leakage. For instance, this form includes an arrangement in which the pump is kept driven as long as the braking force is required. This form is particularly effective when combined with the above-described form in which driving of the pump is limited in the braking-force non-required state. In other words, driving of the pump is limited in the braking-force non-required state and the high-pressure-source pressure is made relatively low. In this sense, therefore, to forcibly drive the pump in the braking-force required state is really significant. In this form, the adjustment of the adjusted pressure in the process of increase of the braking force may be conducted by mainly adjusting the opening degree of the pressure-increase linear valve, as in the normal condition or by mainly adjusting the opening degree of the pressure-decrease linear valve, in contrast to the normal condition.

(18) The hydraulic brake system according to any one of the forms (11)-(16), wherein the large-volume leakage coping portion is configured to control the high-pressure-source control portion to execute, in a braking-force required state in which generation of the braking force by the brake device is required, a pump-based pressure regulating control in which the pump is driven until the braking force generated by the brake device reaches the required braking force and the pump is stopped being driven when the braking force reaches the required braking force, in place of the normal-condition high-pressure-source control.

When the braking force is in the process of increase in the braking-force required state, the adjustment of the adjusted pressure, that is, the control of the braking force, is normally conducted by the operation of the pressure-increase linear valve, more specifically, by adjusting the opening degree of the pressure-increase linear valve, for instance. According to this form, when the pressure-increase linear valve is suffering from the large-volume leakage, the adjustment of the adjusted pressure is conducted by driving the pump and by stopping driving the pump. That is, the adjustment of the adjusted pressure is conducted by the pump of the high-pressure-source device. According to this form, the pressure of the working fluid is adjusted without relying on the pressure-increase linear valve that is suffering from the fluid leakage, thereby enabling relatively accurate adjustment of the adjusted pressure. In this form, when the adjustment of the adjusted pressure is conducted by the pump, the pump may be driven with a constant output or may be driven while changing the degree of driving as later explained. That is, the adjustment of the adjusted pressure may be conducted by changing the output of the pump. This form is also effective when combined with the above-indicated form in which driving of the pump is limited in the braking-force non-required state. In particular, this form is effective when combined with the form in which driving of the pump is inhibited in the braking-force non-required state.

(19) The hydraulic brake system according to the form (18), wherein the large-volume leakage coping portion is configured to control the valve control portion to execute, together with the pump-based pressure regulating control, a pressure-increase-valve opening control in which the pressure-increase linear valve is placed in an open state in the process of increase of the braking force irrespective of the required braking force, in place of the normal-condition pressure-increase-valve control.

According to this form, the pressure-increase linear valve is placed in the open state in the adjustment of the adjusted pressure by the pump. More specifically, the pressure-increase linear valve is placed in a state in which the opening degree thereof is the highest, for instance. This form ensures relatively accurate adjustment of the adjusted pressure without a fear that the pressure-increase linear valve hinders the adjustment of the adjusted pressure by the pump.

(20) The hydraulic brake system according to the form (18) or (19), wherein the high-pressure-source control portion is configured to change, in the pump-based pressure regulating control, a degree of driving of the pump in accordance with a degree of change in the required braking force.

For instance, this form includes an arrangement in which the output of the pump is changed when the adjusted pressure is adjusted by the pump. Further, this form includes an arrangement in which the driving time of the pump is changed when the pump is intermittently driven at very short time intervals. Concretely, where the pump is configured to be driven by an electric drive source such as an electric motor, electricity supplied to the drive source is arranged to be changed. That is, at least one of the supply current to the drive source and the application voltage to the drive source is arranged to be changed. This form enables generation of the braking force having a relatively accurate magnitude irrespective of an increase gradient of the braking force to be required. That is, this form is capable of appropriately deal with an abrupt braking operation and a slow braking operation.

(21) The hydraulic brake system according to any one of the forms (11)-(16), wherein, in a situation in which there is caused the leakage of the working fluid in the pressure-increase linear valve to such an extent that the adjusted pressure is equal to a remaining pressure at a certain level in a state in which the pressure-decrease linear valve is opened and the pump is being driven, the large-volume leakage coping portion controls the high-pressure-source control portion to execute, in place of the normal-condition high-pressure-source control, a pump forcible-driving control in which the pump is driven in the process of increase of the braking force irrespective of whether the high-pressure-source pressure falls within the set pressure range, and the large-volume leakage coping portion controls the valve control portion to execute, in place of the normal-condition pressure-decrease-valve control, a pressure-decrease-valve adjusting control in which electricity supplied to the pressure-decrease linear valve is adjusted also in the process of increase of the braking force such that the braking force becomes equal to the required braking force, where the required braking force is larger than the braking force in accordance with the remaining pressure in a braking-force required state in which generation of the braking force by the brake device is required, and wherein, in the situation, the large-volume leakage coping portion controls the high-pressure-source control portion to execute, in place of the normal-condition high-pressure-source control, a pump-based pressure regulating control in which the pump is driven until the braking force generated by the brake device reaches the required braking force and the pump is stopped being driven when the braking force reaches the required braking force, where the required braking force is not larger than the braking force in accordance with the remaining pressure in the braking-force required state.

In short, in this form, the forcible driving of the pump and the adjustment of the adjusted pressure of the pump are switchably executed in accordance with the required braking force. More specifically, where the adjusted pressure is adjusted to be relatively high, the pump is forcibly driven. Where the adjusted pressure is adjusted to be relatively low, the adjustment of the adjusted pressure is conducted by the pump. Accordingly, this form enjoys the advantages explained above with respect to the forcible driving of the pump and the adjustment of the adjusted pressure by the pump. In this form, when the pump is forcibly driven, the adjusted pressure is adjusted by the pressure-decrease linear valve. Therefore, this form does not necessarily require that the output of the pump be changeable and is easily applicable to a high-pressure-source device having a pump whose output is unchangeable. This form is also effective when combined with the above-indicated form in which driving of the pump is limited in the braking-force non-required state. In particular, this form is effective when combined with the form in which driving of the pump is inhibited in the braking-force non-required state.

(22) The hydraulic brake system according to the form (21), wherein the large-volume leakage coping portion is configured to control the valve control portion to execute, together with the pump-based pressure regulating control, a pressure-increase-valve opening control in which the pressure-increase linear valve is placed in an open state in the process of increase of the braking force irrespective of the required braking force, in place of the normal-condition pressure-increase-valve control.

In this form, where the adjusted pressure is adjusted by the pump, the pressure-increase linear valve is placed in the open state. This form ensures relatively accurate adjustment of the adjusted pressure without a fear that the pressure-increase linear valve hinders the adjustment of the adjusted pressure by the pump as explained above.

(23) The hydraulic brake system according to the form (21) or (22), wherein the large-volume leakage coping portion is configured to control the valve control portion to execute, together with the pump forcible-driving control, one of a pressure-increase-valve closure maintaining control in which a closed state of the pressure-increase linear valve is maintained and a pressure-increase-valve opening adjusting control in which an opening degree of the pressure-increase linear valve is adjusted in accordance with a degree of change in the required braking force, in place of the normal-condition pressure-increase-valve control.

In this form, there is added limitation relating to the control of the pressure-increase linear valve when the pump is forcibly driven. Because the adjusted pressure can be increased utilizing the fluid leakage in the pressure-increase linear valve, the adjusted pressure can be increased even when the pressure-increase linear valve is in the closed state. Where the closed state of the pressure-increase linear valve is maintained, it is not necessary to supply electricity to the pressure-increase linear valve, thereby reducing electricity consumption of the pressure-increase linear valve. In the meantime, where the required braking force is relatively large, it is expected that the degree of change in the braking force, i.e., the degree of change in the adjusted pressure, is also high. More specifically, there is a great likelihood of a situation in which an abrupt braking operation or the like is performed and the increase gradient of the adjusted pressure should be accordingly made larger. In this form, it is possible to appropriately deal with such a situation by adjusting the opening degree of the pressure-increase linear valve. Concretely, the opening degree of the pressure-increase linear valve should be made higher as the increase gradient of the braking force, namely, the increase gradient of the adjusted pressure, becomes larger. Further, by thus adjusting the opening degree of the pressure-increase linear valve, the adjusted pressure can be adjusted relatively appropriately, namely, the braking force can be adjusted relatively accurately, even when the pump is driven with a constant output. In this form, the maintenance of closure of the pressure-increase linear valve and the adjustment of the opening degree of the pressure-increase linear valve may be switchably executed or only one of those may be executed.

(24) The hydraulic brake system according to any one of the forms (21)-(23), wherein the large-volume leakage coping portion is configured to control the valve control portion to execute, together with the pump-based pressure regulating control, one of a pressure-decrease-valve closure maintaining control in which a closed state of the pressure-decrease linear valve is maintained and a pressure-decrease-valve opening adjusting control in which an opening degree of the pressure-decrease linear valve is adjusted in accordance with a degree of change in the required braking force, in place of the normal-condition pressure-decrease-valve control.

In this form, there is added limitation relating to the control of the pressure-decrease linear valve when the adjusted pressure is adjusted by the pump. In most cases, the adjustment of the adjusted pressure by driving of the pump and stopping of driving of the pump enables generation of an appropriate braking force. However, it is sometimes difficult to generate an accurate braking force depending upon the degree of change in the braking force, such as when the increase gradient of the required braking force becomes small due to a relatively slow braking operation. It is particularly difficult to generate an accurate braking force in a case where the pump is driven with a constant output. In this form, by adjusting the opening degree of the pressure-decrease linear valve, it is possible to effectively deal with such a situation. In short, the adjusted pressure is increased while permitting the working fluid to flow out from the linear valve. Concretely, the opening degree of the pressure-decrease linear valve should be made higher as the increase gradient of the braking force, i.e., the increase gradient of the adjusted pressure, becomes smaller. Further, by thus adjusting the opening degree of the pressure-decrease linear valve, the adjusted pressure can be adjusted relatively appropriately, namely, the braking force can be adjusted relatively accurately, even when the pump is driven with a constant output. In this form, the maintenance of closure of the pressure-decrease linear valve and the adjustment of the opening degree of the pressure-decrease linear valve may be switchably executed or only one of those may be executed.

[D] Measures for Coping with Small-Volume Leakage

(31) The hydraulic brake system according to any one of the forms (11)-(24), wherein the fluid leakage coping portion has a small-volume leakage coping portion configured to cope with the leakage of the working fluid in the pressure-increase linear valve that does not exceed the set degree.

The system according to this form can cope with a relatively low degree of the fluid leakage in the pressure-increase linear valve, namely, slight or negligible fluid leakage (hereinafter referred to as "small-volume leakage" where appropriate). For instance, the small-volume leakage includes fluid leakage in which, when the pressure-decrease linear valve is in the open state, the working fluid that has flowed out from the pressure-increase linear valve is relatively smoothly discharged into the reservoir through the pressure-decrease linear valve. In short, the small-volume leakage includes fluid leakage that does not cause the brake drag phenomenon described above, for instance.

This form is desirably combined with various forms for coping with the large-volume leakage described above. Such a combination of the forms can cope with both of the large-volume leakage and the small-volume leakage. Further, the fluid leakage can be coped with in mutually different ways for the large-volume leakage and the small-volume leakage, whereby it is possible to appropriately cope with the fluid leakage in accordance with the degree of the fluid leakage.

(32) The hydraulic brake system according to the form (31), wherein the small-volume leakage coping portion is configured to control the high-pressure-source control portion to execute, in place of the normal-condition high-pressure-source control, a pump intermittent-driving control in which the pump is repeatedly driven at set driving time intervals during a set driving time.

In short, in this form, the pump is intermittently driven according to the settings regardless of the high-pressure-source pressure, thereby making it possible to obviate or reduce an increase in the load on the pump, namely, an increase in the load on the drive source for driving the pump, due to the fluid leakage. In this form, therefore, it is desirable to determine the set driving time and the set driving time intervals so as not to exceed the load on the pump in the normal condition even when the small-volume leakage is occurring. The adjustment of the adjusted pressure when the small-volume leakage is occurring may be conducted mainly by the pressure-increase linear valve and the pressure-decrease linear valve, as in the normal condition.

(33) The hydraulic brake system according to the form (31), wherein the small-volume leakage coping portion is configured to control the high-pressure-source control portion to execute a pump intermittent-driving control in which the pump is repeatedly driven at set driving time intervals during a set driving time in a braking-force non-required state in which generation of the braking force by the brake device is not required and to execute a pump forcible-driving control in which the pump is driven in a braking-force required state in which the generation of the braking force by the brake device is required irrespective of whether the high-pressure-source pressure falls within the set pressure range, in place of the normal-condition high-pressure-source control.

According to this form, the pump is intermittently driven in the braking-force non-required state while the pump is forcibly driven in the braking-force required state. More specifically, the pump is kept driven during a time period in which generation of the braking force is required. According to this form, it is possible to generate an appropriate braking force in cases where an abrupt braking operation is performed, where a considerably large braking force is required or the like while suppressing the load on the pump. Also in this form, the adjustment of the adjusted pressure may be conducted mainly by the pressure-increase linear valve and the pressure-decrease linear valve, as in the normal condition.

[E] Detection of Fluid Leakage

(41) The hydraulic brake system according to any one of the forms (1)-(33), further comprising a fluid leakage detecting portion configured to detect leakage of the working fluid in the pressure-increase linear valve, wherein the fluid leakage coping portion is configured to cope with the leakage of the working fluid in the pressure-increase linear valve based on a result of detection by the fluid leakage detecting portion.

The system according to this form has a function of detecting the fluid leakage in the pressure-increase linear valve and is capable of coping with the fluid leakage based on results of detection by itself. According to this form, it is possible to establish the system with a considerably high degree of utility.

(42) The hydraulic brake system according to the form (41), wherein the fluid leakage detecting portion is configured to judge whether the leakage of the working fluid in the pressure-increase linear valve is beyond a set degree.

According to this form, it is possible to judge whether the fluid leakage in the pressure-increase linear valve is the large-volume leakage or the small-volume leakage and is accordingly possible to appropriately cope with different degrees of the fluid leakage. It is preferable not only to judge whether the fluid leakage is the large-volume leakage or the small-volume leakage, but also to minutely judge the degree of the large-volume leakage and the degree of the small-volume leakage.

(43) The hydraulic brake system according to the form (42), wherein the fluid leakage detecting portion is configured to judge that the leakage of the working fluid in the pressure-increase linear valve is beyond the set degree where generation of the braking force is expected when the pressure-increase linear valve is in a closed state and the pressure-decrease linear valve is in an open state.

According to this form, whether the fluid leakage in the pressure-increase linear valve is the large-volume leakage or the small-volume leakage is judged based on whether or not the brake drag phenomenon explained above is observed. Therefore, this form is capable of coping with the fluid leakage more appropriately.

(44) The hydraulic brake system according to any one of the forms (41)-(43), wherein the fluid leakage detecting portion is configured to place the pressure-decrease linear valve in a closed state in a stationary state of the vehicle and to detect the leakage of the working fluid in the pressure-increase linear valve based on a change of a braking force index in the stationary state of the vehicle, the braking force index indicative of the braking force.

In short, in the detection processing according to this form, by placing the pressure-decrease linear valve in the closed state, the system is rendered into a state in which the braking force can be actually generated in a case where the fluid leakage is occurring, and whether or not the fluid leakage is occurring is detected based on a certain barometer (indicator) indicative of the braking force. According to this form, when the fluid leakage is occurring, the braking force is actually generated, so that whether or not the fluid leakage is occurring is relatively accurately detectable. It is further possible to detect whether or not the fluid leakage is beyond the set degree, namely, whether the fluid leakage is the large-volume leakage or the small-volume leakage, based on the barometer. As the above-indicated braking force index, there may be employed various detectable pressures of the working fluid in any portion of the system, such as the adjusted pressure, the pressure of the working fluid supplied from the pressure regulator where the system is equipped with the pressure regulator, the pressure of the working fluid supplied from the master cylinder device where the system is equipped with the master cylinder device, and the pressure of the working fluid supplied to the brake device.

(45) The hydraulic brake system according to any one of forms (41)-(43), wherein the fluid leakage detecting portion is configured to detect the leakage of the working fluid in the pressure-increase linear valve based on a change in the high-pressure-source pressure in a braking-force non-required state in which generation of the braking force by the brake device is not required.

In the detection processing according to the previous form, there is a possibility that the braking force is actually generated. Accordingly, the detection processing of the previous form can be executed only when the vehicle is stationary. In contrast, the detection processing of this form enables detection of the fluid leakage in a state in which the system normally operates in the braking-force non-required state, based on a change in the high-pressure-source pressure in the state of the system. The detection processing of this form is simple in this respect.

(46) The hydraulic brake system according to the form (45), wherein the fluid leakage detecting portion is configured to detect the leakage of the working fluid in the pressure-increase linear valve based on a degree of increase in the high-pressure-source pressure when the pump is being driven in the braking-force non-required state.

When the pump is driven so as to increase the high-pressure-source pressure to the set upper-limit pressure in a case where the pressure-increase linear valve is suffering from the fluid leakage, the increase gradient of the high-pressure-source pressure is smaller due to the fluid leakage, as compared with that in a case where the fluid leakage is not occurring. In this form, the fluid leakage in the pressure-increase linear valve is detected based on whether or not such a phenomenon is observed, for instance. Further, it is possible to judge whether the fluid leakage is the large-volume leakage or the small-volume leakage, based on the degree of such a phenomenon, e.g., the degree of the increase gradient. The "degree of increase in the high-pressure-source pressure" in this form may be judged based on an increase amount of the high-pressure-source pressure within a set time period, a time required for the high-pressure-source pressure to increase from a certain pressure to another certain pressure, or the like.

(47) The hydraulic brake system according to the form (45) or (46), wherein the fluid leakage detecting portion is configured to detect the leakage of the working fluid in the pressure-increase linear valve based on a degree of decrease in the high-pressure-source pressure when the pump is not being driven in the braking-force non-required state.

In a case where the pressure-increase linear valve is suffering from the fluid leakage, the high-pressure-source pressure is decreased due to the fluid leakage in a state in which the pump is not being driven. In this form, the fluid leakage in the pressure-increase linear valve is detected based on whether or not such a phenomenon is observed, for instance. Further, it is possible to judge whether the fluid leakage is the large-volume leakage or the small-volume leakage, based on the degree of such a phenomenon, e.g., the degree of the decrease gradient. The "degree of decrease in the high-pressure-source pressure" may be judged based on a decrease amount of the high-pressure-source pressure within a set time period, a time required for the high-pressure-source pressure to decrease from a certain pressure to another certain pressure, or the like.

BRIEF DESCRIPTION OF DRAWINGS

FIG. 23 is a table showing various controls effectuated by execution of the brake control program.

DESCRIPTION OF EMBODIMENT

There will be hereinafter explained in detail a representative embodiment of the claimable invention with reference to the drawings. It is to be understood that the claimable invention is not limited to the following embodiment and modified examples, and the forms described in FORMS OF INVENTION, but may be embodied with various changes and modifications based on the knowledge of those skilled in the art. It is to be further understood that modified examples of the following embodiment can be provided through the use of technical matters described in the forms described in FORMS OF INVENTION.

Embodiment

<Hardware Structure of Hydraulic Brake System>

1. Overall Structure

Figure 1:
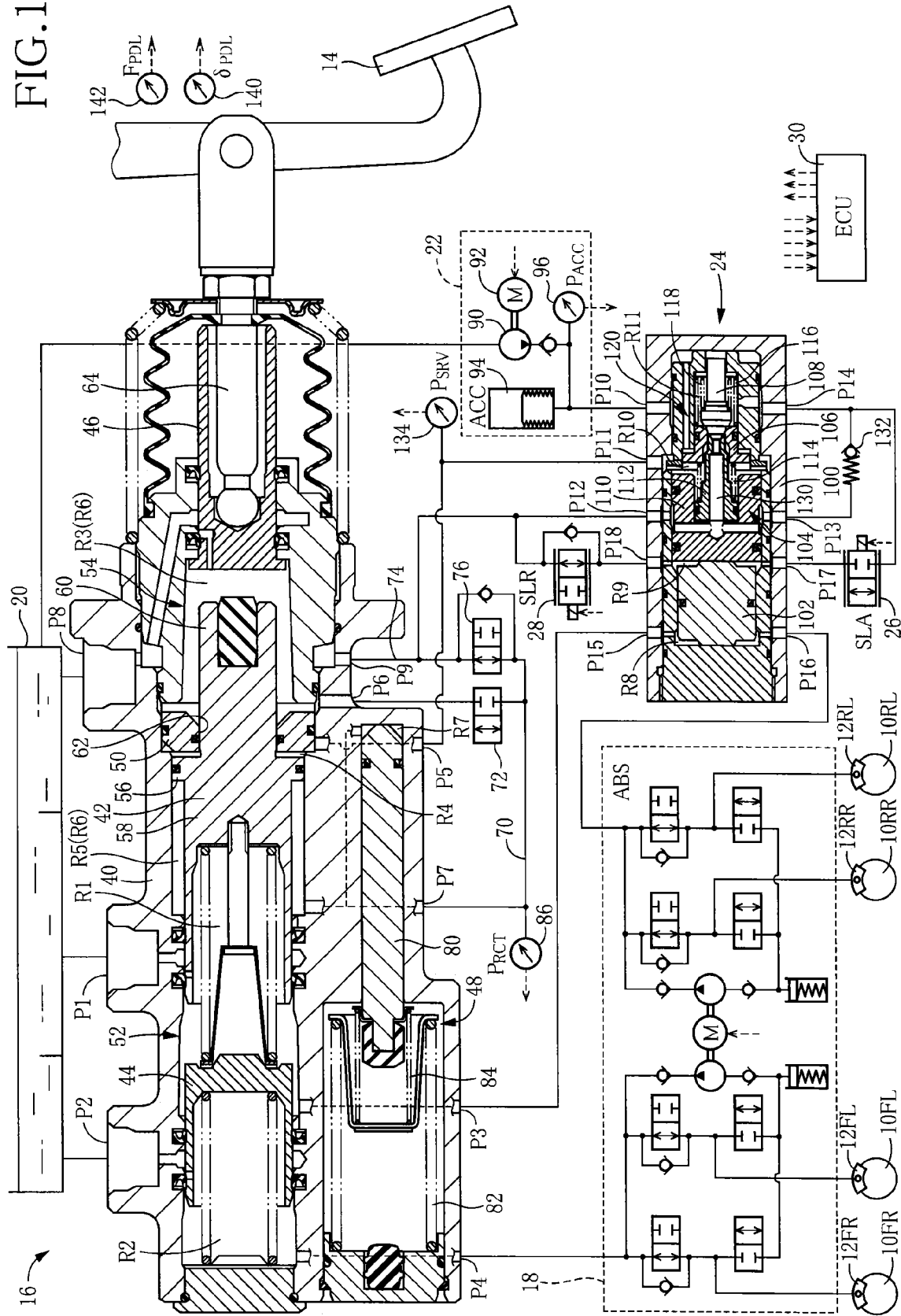
FIG. 1 is a view showing a hardware structure of a hydraulic brake system for a vehicle according to one embodiment of the claimable invention.

A hydraulic brake system for a vehicle according to one embodiment of the claimable invention is a hydraulic brake system that is installed on hybrid vehicles and that uses a brake oil as a working fluid. As shown in FIG. 1, the present hydraulic brake system generally includes (A) four brake devices 12 which are provided for respective four wheels 10 and each of which is configured to generate a braking force, (B) a master cylinder device 16 to which is input an operation of a brake pedal 14 as a brake operation member and which is configured to supply a pressurized working fluid to each brake device 12, (C) an antilock unit 18 disposed between the master cylinder device 16 and the four brake devices 12, (D) a high-pressure-source device 22 configured to pump up the working fluid from a reservoir 20 as a low-pressure source and to pressurize the pumped fluid, so as to supply the working fluid that is highly pressurized, (E) a regulator 24, as a pressure regulator, configured to regulate a pressure of the working fluid supplied from the high-pressure-source device 22 and to supply, to the master cylinder device 16, the working fluid whose pressure is regulated, (F) an electromagnetic pressure-increase linear valve 26 and an electromagnetic pressure-decrease linear valve 28 (hereinafter simply referred to as "pressure-increase linear valve 26" and "pressure-decrease linear valve 28", respectively, where appropriate) for adjusting a pressure of the working fluid supplied from the regulator 24, and (G) a brake electronic control unit 30, as a controller, configured to control the hydraulic brake system by controlling the devices, equipment, valves, and so on. It is noted that the antilock unit 18 may be referred to as "ABS unit 18" where appropriate and a sign "ABS" is attached in FIG. 1. The pressure-increase linear valve 26 and the pressure-decrease linear valve 28 are respectively marked with signs "SLA" and "SLR" in FIG. 1. The brake electronic control unit 30 may be referred to as "brake ECU 30" where appropriate and is marked with a sign "ECU" in FIG. 1. Where it is necessary to distinguish the four wheels 10 in terms of "front", "rear", "right", and "left", the four wheels 10 are indicated as a front right wheel 10FR, a front left wheel 10FL, a rear right wheel 10RR, and a rear left wheel 10RL, respectively. Where it is necessary to similarly distinguish the constituent elements, the same suffixes as used for the wheels 10 are used. For instance, the four brake devices 12 are indicated as 12FR, 12FL, 12RR, and 12RL, respectively, where appropriate.

2. Brake Devices and ABS Unit

Each of the brake devices 12 provided for the respective wheels 10 is a disc brake device including a disc rotor that rotates together with the wheel 10, a caliper held by a carrier, a wheel cylinder held by the caliper, and brake pads held by the caliper and configured to be moved by the wheel cylinder so as to sandwich the disc rotor. The ABS unit 18 is a unit constituted by four pairs of open/close valves corresponding to the four wheels, a pump device, and so on. One of the open/close valves in each pair is a pressure-increase open/close valve while the other of the open/close valves in each pair is a pressure-decrease open/close valve. The ABS unit 18 is configured to be activated when the wheels 10 are locked due to skidding or the like, so as to prevent the lock of the wheels from being continued. Each brake device 12 and the ABS unit 18 are an ordinary device and an ordinary unit and have low relevance to the features of the claimable invention. Accordingly, a detailed explanation of the brake devices 12 and the ABS unit 18 is dispensed with.

3. Master Cylinder Device

The master cylinder device 16 is a master cylinder device in which a stroke simulator is integrally incorporated. In general, the master cylinder device 16 has a housing 40 in which two pressurizing pistons, i.e., a first pressurizing piston 42 and a second pressurizing piston 44, and an input piston 46 are disposed, and a stroke simulator mechanism 48 is incorporated in the housing 40. In the following explanation about the master cylinder device 16, a leftward direction and a rightward direction in FIG. 1 are respectively referred to as a forward direction and a rearward direction for the sake of convenience. Similarly, a leftward movement and a rightward movement of the pistons, etc., explained below are respectively referred to as a forward or advancing movement and a rearward or retracting movement.

The housing 40 has a space in which are accommodated the first pressurizing piston 42, the second pressurizing piston 44, and the input piston 46. The space is closed at its front-side end and is partitioned by an annular partition portion 50 into a front-side chamber 52 and a rear-side chamber 54. The second pressurizing piston 44 has a cylindrical shape which is open on its front side and closed on its rear side. The second pressurizing piston 44 is disposed at a frond-side portion of the front-side chamber 52. The first pressurizing piston 42 has a cylindrical shape having a closed end and includes: a main body portion 58 having a flange 56 formed at a rear end of the main body portion 58; and a protruding portion 60 that extends rearward from the main body portion 58. The main body portion 58 is disposed in the front-side chamber 52 so as to be located rearward of the second pressurizing piston 44. The annular partition portion 50 has an opening 62 at its central portion, and the protruding portion 60 extends into the rear-side chamber 54 through the opening 62. The input piston 46 is disposed in the rear-side chamber 54 such that the input piston 46 partially extends into the rear-side chamber 54 from the rear side. The brake pedal 14 is connected to a rear end of the input piston 46 via a link rod 64.

A first pressurizing chamber R1 is formed between the first pressurizing piston 42 and the second pressurizing piston 44, more specifically, on the front side of the main body portion 58 of the first pressurizing piston 42. In the first pressurizing chamber R1, the working fluid to be supplied to the two brake devices 12RR, 12RL corresponding to the respective two rear wheels 10RR, 10RL is pressurized by a forward movement of the first pressurizing piston 42. Further, a second pressurizing chamber R2 is formed on the front side of the second pressurizing piston 44. In the second pressurizing chamber R2, the working fluid to be supplied to the brake devices 12FR, 12FL corresponding to the respective two front wheels 10FR, 10FL is pressurized by a forward movement of the second pressurizing piston 44. Further, an inter-piston chamber R3 is formed between the first pressurizing piston 42 and the input piston 46. More specifically, the inter-piston chamber R3 is formed such that a rear end of the protruding portion 60 that extends rearward from the opening 62 formed in the partition portion 50 and a front end of the input piston 46 face to each other, namely, such that the first pressurizing piston 42 and the input piston 46 face to each other utilizing the opening 62. Further, in the front-side chamber 52 of the housing 40, there are formed: an annular input chamber R4 to which the working fluid supplied from the regulator 24 is input; and an annular opposing chamber R5. More specifically, the input chamber R4 is formed around an outer circumference of the protruding portion 60 so as to be defined by a front end face of the partition portion 50 and a rear end face of the main body portion 58 of the first pressurizing piston 42, i.e., a rear end face of the flange 56. The opposing chamber R5 is formed forward of the flange 56 around an outer circumference of the main body portion 58 such that the opposing chamber R5 is opposed to the input chamber R4 with the flange 56 interposed therebetween.

The first pressurizing chamber R1 is fluidly communicable with the reservoir 20 via an atmospheric pressure port P1 when the first pressurizing piston 42 is located at a rear end position in its movement range while the second pressurizing chamber R2 is fluidly communicable with the reservoir 20 via an atmospheric pressure port P2 when the second pressurizing piston 44 is located at a rear end position in its movement range. The first pressurizing chamber R1 and the second pressurizing chamber R2 communicate with the brake devices 12 via respective output ports P3, P4 and via the ABS unit 18. In this respect, the first pressurizing chamber R1 communicates with the brake devices 12RR, 12RL also via the regulator 24 (that will be later explained). Further, the input chamber R4 communicates with a regulated-pressure port of the regulator 24 (that will be later explained) via an input port P5.

The inter-piston chamber R3 communicates with a communication port P6 while the opposing chamber R5 communicates with a communication port P7. The communication port P6 and the communication port P7 are connected by an inter-chamber communication passage 70 as an external communication passage. At a certain position in the inter-chamber communication passage 70, there is provided a normally closed electromagnetic open/close valve 72, namely, an open/close valve 72 configured to be closed in a non-energized state and opened in an energized state. When the open/close calve 72 is placed in an open state, the inter-piston chamber R3 and the opposing chamber R5 are brought into communication with each other. In a state in which the inter-piston chamber R3 and the opposing chamber R5 are held in communication with each other, the chambers R3, R5 define one fluid chamber, namely, a fluid chamber that may be referred to as a reaction-force chamber R6 is defined. The electromagnetic open/close valve 72 has a function of switching a communication state of the inter-piston chamber R3 and the opposing chamber R5 between a communicating state and a non-communicating state. In view of this, the electromagnetic open/close valve 72 will be hereinafter referred to as "inter-chamber-communication switching valve 72".

The master cylinder device 16 has two more atmospheric pressure ports P8, P9 that communicate with each other via an internal passage. The atmospheric pressure port P8 is connected to the reservoir 20 while the atmospheric pressure port P9 is connected, between the inter-chamber-communication switching valve 72 and the opposing chamber R5, to the inter-chamber communication passage 70 via an atmospheric-pressure release passage 74 as an external communication passage. In the atmospheric-pressure release passage 74, there is provided a normally open electromagnetic open/close valve 76, namely, an open/close valve 76 configured to be opened in a non-energized state and closed in an energized state. The open/close valve 76 has a function of releasing the opposing chamber R5 to the atmospheric pressure. In view of this, the open/close valve 76 will be hereinafter referred to as "atmospheric-pressure release valve 76" where appropriate.

The housing 40 has a space different from the space in which the first pressurizing piston 42, the second pressurizing piston 44, and the input piston 46 are disposed. The stroke simulator mechanism 48 is constituted by the space in question, a reaction-force piston 80 disposed in the space, and two reaction-force springs 82, 84 (both of which are compression coil springs) for biasing the reaction-force piston 80. On the rear side of the reaction-force piston 80, a buffer chamber R7 is formed. (In FIG. 1, the buffer chamber R7 is illustrated in an almost deflated or compressed state). When the input piston 46 moves forward by an operation of the brake pedal 14, the working fluid in the opposing chamber R5, i.e., the working fluid in the reaction-force chamber R6, is introduced into the buffer chamber R7 via an inner passage, and elastic forces of the reaction-force springs 82, 84 in accordance with the introduced amount of the working fluid, namely, in accordance with the amount of the forward movement of the input piston 46, act on the reaction-force chamber R6, whereby an operation reaction force is applied to the brake pedal 14. That is, the stroke simulator mechanism 48 functions as a reaction-force applying mechanism for applying, to the input piston 46, a reaction force against the forward movement of the input piston 46 having a magnitude in accordance with the amount of the forward movement of the input piston 46. The two reaction-force springs 82, 84 are disposed in series, and the reaction-force spring 84 has a spring constant considerably smaller than that of the reaction-force spring 82. Thus, the stroke simulator mechanism 48 is configured to effectuate reaction-force characteristics in which an increase gradient of the reaction force becomes large from a certain point in the progress of the operation of the brake pedal 14 by inhibiting the reaction-force spring 84 from being deformed at the certain point in the progress of the operation of the brake pedal 14. In the present system, there is provided, in the inter-chamber communication passage 70, a reaction-force pressure sensor 86 for detecting a pressure of the working fluid in the reaction-force chamber R6 (reaction-force pressure). (In FIG. 1, the reaction-force pressure sensor 86 is marked with a sign "$P_{RCT}$" indicative of the reaction-force pressure.

In a normal condition, the inter-chamber-communication switching valve 72 is in the open state while the atmospheric-pressure release valve 76 is in the closed state, and the reaction-force chamber R6 is defined by the inter-piston chamber R3 and the opposing chamber R5. In the present master cylinder device 16, a pressure receiving area (pressure receiving area with respect to the inter-piston chamber) of the first pressurizing piston 42 on which a pressure of the working fluid in the inter-piston chamber R3 acts for moving the first pressurizing piston 42 forward, namely, an area of a rear face of the protruding portion 60 of the first pressurizing piston 42, is made equal to a pressure receiving area (pressure receiving area with respect to the opposing chamber) of the first pressurizing piston 42 on which a pressure of the working fluid in the opposing chamber R5 acts for moving the first pressurizing piston 42 rearward, namely, an area of a front end face of the flange 56 of the first pressurizing piston. Accordingly, even if the input piston 46 is moved forward by operating the brake pedal 14, the first pressurizing piston 42 and the second pressurizing piston 44 do not move forward by an operation force, namely, by the pressure in the reaction-force chamber R6, and the working fluid pressurized by the master cylinder device 16 is not supplied to the brake devices 12. On the other hand, when a pressure of the working fluid from the high-pressure-source device 22 is introduced into the input chamber R4, the first pressurizing piston 42 and the second pressurizing piston 44 move forward in dependence on the pressure of the working fluid, and the working fluid pressurized in accordance with a pressure of the working fluid in the input chamber R4 is supplied to the brake devices 12. That is, according to the master cylinder device 16, there is effectuated, in the normal condition, a state in which the braking force is generated depending on the high-pressure-source pressure, namely, a state in which the brake devices 12 generate the braking force having a magnitude that depends on the pressure of the working fluid supplied from the high-pressure-source device 22 to the master cylinder device 16, without depending on the operation force applied to the brake pedal 14.

The vehicle on which the present system is installed is a hybrid vehicle as described above, and a regenerative braking force is accordingly available. Accordingly, it is needed for the brake devices 12 to generate a braking force that corresponds to a difference by subtracting the regenerative braking force from a braking force that is determined based on the braking operation. The present system effectuates the above-indicated state in which the braking force is generated depending on the high-pressure-source pressure, so that the brake devices 12 can generate the braking force that does not depend on the brake operation force. Thus, the present system is a hydraulic brake system suitable for hybrid vehicles.

In the case of electric failure or the like, on the other hand, the inter-chamber-communication switching valve 72 is in the closed state, the atmospheric-pressure release valve 76 is in the open state, and the inter-piston chamber R3 is hermetically closed while the opposing chamber R5 is released to the atmospheric pressure. In this state, the operation force applied to the brake pedal 14 is transmitted to the first pressurizing piston 42 via the working fluid in the inter-piston chamber R3, so that the first pressurizing piston 42 and the second pressurizing piston 44 move forward. That is, there is effectuated a state in which the braking force is generated depending on the operation force, namely, a state in which the brake devices 12 generate the braking force having a magnitude that depends on the operation force applied to the brake pedal 14. Where the inter-chamber-communication switching valve 72 is placed in the closed state, the atmospheric-pressure release valve 76 is placed in the open state, and the working fluid is introduced from the high-pressure-source device 22 into the input chamber R4, the first pressurizing piston 42 and the second pressurizing piston 44 are moved forward by both of: the pressure of the working fluid supplied from the high-pressure-source device 22 to the master cylinder device 16; and the operation force. As a result, there is effectuated a state in which the braking force is generated depending on the operation force and the high-pressure-source pressure, namely, a state in which the brake devices 12 generate the braking force that depends on both of the operation force and the high-pressure-source pressure, namely, the braking force that is a sum of the braking force whose magnitude depends on the pressure of the working fluid supplied from the high-pressure-source device 22 to the master cylinder device 16 and the braking force whose magnitude depends on the operation force.

4. High-Pressure-Source Device

The high-pressure-source device 22 includes: a pump 90 configured to pump up the working fluid from the reservoir 20 and to pressurize the pumped working fluid; a motor 92 for driving the pump 90; and an accumulator 94 (that is marked with a sign "ACC" in FIG. 1) for accumulating the working fluid pressurized by the pump 90. The high-pressure-source device 22 is provided with a high-pressure-source pressure sensor 96 for detecting a pressure of the working fluid in the accumulator 94, namely, for detecting a pressure of the working fluid to be supplied, i.e., the high-pressure-source pressure. (In FIG. 1, the high-pressure-source pressure sensor 96 is marked with a sign "$P_{ACC}$" indicative of the high-pressure-source pressure.

5. Regulator

The regulator 24 includes: a housing 100 having a two-piece structure and an interior space; and a first piston 102, a second piston 104, a ring-shaped valve seat 106, and a valve rod 108 that are disposed in the space of the housing 100 so as to be arranged in this order from the left side in FIG. 1 in the axial direction of the housing 100, i.e., in the left-right direction. Each of the first piston 102 and the second piston 104 functions as a movable member and is movable in the axial direction of the housing 100. The second piston 104 is constituted by a piston main body 110 having a recess and a plunger 112 fitted in the recess. The ring-shaped valve seat 106 is a cylindrical member which has a flange portion and which is open at opposite ends thereof. The ring-shaped valve seat 106 is floatingly supported by two springs 114, 116 with respect to the second piston 104 and the housing 100. A left end portion of the valve rod 108 functions as a valve member. The valve rod 108 is disposed such that the left end portion thereof functioning as the valve member can be seated on a right end portion of the ring-shaped valve seat 106 functioning as a valve seat. The valve rod 108 is biased leftward by a spring 118. That is, the ring-shaped valve seat 106, the valve rod 108, and the spring 118 provide a valve mechanism 120 that is disposed so as to be arranged with the second piston 104, functioning as the movable member, in the axial direction of the housing 100. A distal (right) end of the plunger 112 of the second piston 104 is arranged to be abuttable on the left end portion of the valve rod 108 within the ring-shaped valve seat 106.

A plurality of fluid chambers are formed in the space of the housing 100. More specifically, a first pilot chamber R8 is formed on the left side of the first piston 102. A second pilot chamber R9 is formed between the first piston 102 and the second piston 104. A regulated-pressure chamber R10 is formed around an outer circumference of the plunger 112 of the second piston 104 generally between the piston main body 110 and the flange portion of the ring-shaped valve seat 106. In the regulated-pressure chamber R10, there is accommodated the working fluid whose pressure is regulated and which is supplied from the regulator 24 to the master cylinder device 16. A high pressure chamber R11 for receiving the working fluid supplied from the high-pressure-source device 22 is formed on an outer circumference of the valve rod 108. Roughly, the regulated-pressure chamber R10 is formed on one of opposite sides of the second piston 104 nearer to the valve mechanism 120, and the high pressure chamber R11 and the regulated-pressure chamber R10 sandwich the valve mechanism 120 therebetween.

The housing 100 is formed with various ports, and the fluid chambers described above communicate with various devices of the present system via the ports. To be more specific, the working fluid from the high-pressure-source device 22 is supplied to the high pressure chamber R11 via a high pressure port P10. The regulated-pressure chamber R10 communicates with the input port P5 of the master cylinder device 16 via a regulated-pressure port P11. In the second piston 104, there is formed an atmospheric pressure passage 130 constituted by a fluid passage that penetrates the plunger 112 in the axial direction and a fluid passage that communicates with the above-indicated fluid passage and that penetrates the piston main body 110 in the diametric direction. Two atmospheric pressure ports P12, P13 communicate with each other via the atmospheric pressure passage 130. The atmospheric pressure port P12 is connected to the atmospheric-pressure release passage 74, whereby the atmospheric pressure passage 130 communicates with the reservoir 20 via the master cylinder device 16. In other words, the atmospheric pressure passage 130 functions as a low-pressure-source communication passage communicating with the low-pressure source. The atmospheric pressure port P13 is connected, via a relief valve 132, to a high pressure port P14 different from the above-indicated high pressure port P8. When a pressure in the high pressure chamber R11 becomes excessively high, the pressure in the high pressure chamber R11 is released to the reservoir 20.

The first pilot chamber R8 communicates with the output port P3 of the master cylinder device 16 via a first pilot port P15 and communicates with the brake devices 12RR, 12RL for the rear wheels via a first pilot port P16. That is, the first pilot chamber R8 is a part of a passage for the working fluid supplied from the master cylinder device 16 to the brake devices 12RR, 12RL. The second pilot chamber R9 is connected to two second pilot ports P17, P18. The second pilot port P17 is connected to the high pressure port P14 via the pressure-increase linear valve 26 while the second pilot port P18 is connected to the atmospheric-pressure release passage 74 via the pressure-decrease linear valve 28. That is, the second pilot chamber R9 is connected to the high-pressure-source device 22 via the pressure-increase linear valve 26 and is connected to the reservoir 20 via the pressure-decrease linear valve 28. As later explained in detail, a pressure of the working fluid in the second pilot chamber R9 is adjusted to a pressure (hereinafter referred to as "adjusted pressure" where appropriate) that is adjusted by the pressure-increase linear valve 26 and the pressure-decrease linear valve 28.

A pressure-difference-based acting force acts on the second piston 104. The pressure-difference-based acting force is a force that depends on a pressure difference between: a pressure of the working fluid in the regulated-pressure chamber R10, namely, a pressure of the working fluid supplied from the regulator 24, that is the so-called supply pressure of the pressure regulator and will be hereinafter referred to as "servo pressure" where appropriate; and a second pilot pressure that is the pressure in the second pilot chamber R9. The second piston 104 is moved in the housing 100 in the axial direction by the pressure-difference-based acting force. While it is actually needed to consider the elastic reaction forces of the springs 114, 116 and so on, in short, the second piston 104 is moved rightward in FIG. 1, namely, toward the valve mechanism 120 when an acting force that depends on the second pilot pressure is dominant over an acting force that depends on the servo pressure. On the other hand, the second piston 104 is moved leftward in FIG. 1, namely, in a direction away from the valve mechanism 120 when the acting force that depends on the servo pressure is dominant over the acting force that depends on the second pilot pressure. Where the second piston 104 is moved rightward, the second piston 104 comes into engagement, at the distal end of the plunger 112, with the valve mechanism 120 and the distal end of the valve rod 108 is separated away from the ring-shaped valve seat 106, whereby the regulated-pressure chamber R10 and the high pressure chamber R11 are brought into communication with each other by the valve mechanism 120. In this case, an opening of the atmospheric pressure passage 130 formed at the distal end of the plunger 112 is closed by the distal end of the valve rod 108, whereby communication between the regulated-pressure chamber R10 and the atmospheric pressure passage 130 is shut off. Where the second piston 104 is moved leftward, on the other hand, the distal end of the plunger 112 of the second piston 104 is disengaged from the valve mechanism 120, whereby communication between the regulated-pressure chamber R10 and the high pressure chamber R11 is shut off. In this case, the opening of the atmospheric pressure passage 130 is not closed by the distal end of the valve rod 108, and the regulated-pressure chamber R10 and the atmospheric pressure passage 130 are brought into communication with each other. Owing to the operation of the regulator 24, the pressure of the working fluid in the regulated-pressure chamber R10 is regulated to a pressure in accordance with the second pilot pressure, namely, a pressure in accordance with the adjusted pressure adjusted by the pressure-increase linear valve 26 and the pressure-decrease linear valve 28. In the present system, there is provided a servo pressure sensor 134 for detecting the servo pressure. (The servo pressure sensor 134 is marked, in FIG. 1, with a sign "$P_{SRV}$" indicative of the servo pressure).

In the normal condition, the servo pressure introduced from the regulator 24 as the pressure regulator to the master cylinder device 16 is regulated to the pressure in accordance with the adjusted pressure as described above. As is understood from the explanation above, in the normal condition, a pressure of the working fluid supplied from the master cylinder device 16 to the brake devices 12 (hereinafter referred to as "master pressure" where appropriate) becomes equal to a pressure in accordance with the servo pressure. Accordingly, in the normal condition, the master pressure becomes equal to the pressure in accordance with the adjusted pressure. Therefore, in the present system, the brake devices 12 generate the braking force whose magnitude depends on the adjusted pressure. In this connection, in the normal condition, a first pilot pressure that is a pressure in the first pilot chamber R8 becomes equal to the master pressure. However, a ratio between the servo pressure and the master pressure that depends on the structure of the master cylinder device 16 and a ratio between the adjusted pressure and the servo pressure that depends on the structure of the regulator 24 are set such that the first piston 102 does not move rightward in the housing 100 by a pressure-difference-based acting force that acts on the first piston 102 in dependence on a pressure difference between the second pilot pressure that is equal to the adjusted pressure and the first pilot pressure that is equal to the master pressure.

Where the working fluid at the adjusted pressure cannot be supplied to the second pilot chamber R9 due to failure or the like of the pressure-increase linear valve 26, for instance, the first piston 102 and the second piston 104 move in the housing 100 in the axial direction with the first piston 102 and the second piston 104 being kept in contact with each other, namely, the first piston 102 and the second piston 104 move as a unit, by a pressure-difference-based acting force that acts based on a pressure difference between the master pressure introduced into the first pilot chamber R8 and the servo pressure. As in the normal condition, the valve mechanism 120 switches between: communication between the high pressure chamber R11 and the regulated-pressure chamber R10; and shutting off of the communication and switches between: communication between the atmospheric pressure passage 130 and the regulated-pressure chamber R10; and shutting off of the communication, whereby the working fluid having the servo pressure that is equal to a pressure in accordance with the master pressure is supplied from the regulator 24 to the master cylinder device 16. That is, even in a situation in which the working fluid at the adjusted pressure cannot be supplied to the second pilot chamber R9, the present system can effectuate the above-indicated state in which the braking force is generated depending on the high-pressure-source pressure, namely, the state in which the brake devices 12 generate the braking force whose magnitude depends on the pressure of the working fluid supplied from the high-pressure-source device 22 to the master cylinder device 16, when the high-pressure-source device 22 is properly operating or when a certain extent of the pressure remains in the accumulator 94 even if the high-pressure-source device 22 is not properly operating.

In the present system, the master pressure is arranged to be introduced into the first pilot chamber R8 of the regulator 24. In place of the arrangement, the pressure of the working fluid in the reaction-force chamber R6 or in the inter-piston chamber R3 may be arranged to be introduced. Such an arrangement can also effectuate the above-indicated state in which the braking force is generated depending on the high-pressure-source pressure, namely, the state in which the brake devices 12 generate, in dependence on the pressure of the working fluid supplied from the high-pressure-source device 22, the braking force having a magnitude in accordance with the operation force applied to the brake pedal 14 by the driver, in a situation in which the working fluid at the adjusted pressure cannot be supplied to the second pilot chamber R9.

6. Pressure-Increase Linear Valve and Pressure-Decrease Linear Valve

The pressure-increase linear valve 26 and the pressure-decrease linear valve 28 are ordinary electromagnetic linear valves, and illustration of the structure thereof is dispensed with. The pressure-increase linear valve 26 is a normally closed electromagnetic linear valve and is disposed between the high-pressure-source device 22 and the second pilot chamber R9 of the regulator 24. The pressure-increase linear valve 26 has a plunger whose distal end functions as a valve member and a valve seat on which the plunger is seated. In the pressure-increase linear valve 26, there are formed: an adjusted-pressure chamber which is located on one of opposite sides of the valve seat nearer to the plunger and which communicates with the second pilot chamber R9 of the regulator 24 for accommodating the working fluid having an adjusted pressure $P_{AJT}$ corresponding to a second pilot pressure $P_{PLT}$ of the second pilot chamber R9; and a high pressure chamber which is located on the other of the opposite sides of the valve seat remote from the plunger and which communicates with the high-pressure-source device 22 for receiving the working fluid having a high-pressure-source pressure $P_{ACC}$. There acts, on the plunger, a pressure-difference-based acting force $F\Delta_{P\cdot A}$ based on a pressure difference between the high-pressure-source pressure $P_{ACC}$ and the adjusted pressure $P_{PLT}$, in a direction in which the plunger is separated away from the valve seat. At the same time, the plunger is biased in a direction in which the plunger is seated on the valve seat by a biasing force $F_{K\cdot A}$ of a spring that is larger than the pressure-difference-based acting force $F\Delta_{P\cdot A}$. By energization of the coil, there also acts, on the plunger, an electromagnetic acting force $F_{E\cdot A}$ having a magnitude in accordance with an energizing current $i_A$ supplied to a coil in the same direction as the pressure-difference-based acting force $F\Delta_{P\cdot A}$, namely, in a direction opposite to the biasing force $F_{K\cdot A}$ of the spring. Roughly, in the present pressure-increase linear valve 26, the energizing current $i_A$ is determined such that an arbitrary adjusted pressure $P_{AJT}$ is obtained while considering a balance among the pressure-difference-based acting force $F\Delta_{P\cdot A}$, the electromagnetic acting force $F_{E\cdot A}$, and the biasing force $F_{K\cdot A}$, and the determined energizing current is given to the coil. The determination of the energizing current $i_A$ will be later explained in detail. It is noted that, in the pressure-increase linear valve 26, the adjusted pressure $P_{AJT}$ increases with an increase in the energizing current $i_A$. In other words, an opening degree (e.g., a degree of easiness with which the valve changes from the closed state to the open state) becomes higher and a valve-opening pressure becomes higher, with an increase in the energizing current $i_A$.

The pressure-decrease linear valve 28 is a normally open electromagnetic linear valve disposed between the second pilot chamber R9 of the regulator 24 and the reservoir 20 as the low-pressure source. The pressure-decrease linear valve 28 has a plunger whose distal end functions as a valve member and a valve seat on which the plunger is seated. In the pressure-decrease linear valve 28, there are formed: an atmospheric pressure chamber which is located on one of opposite sides of the valve seat nearer to the plunger and which communicates with the reservoir 20 so as to have an atmospheric pressure $P_{RSV}$; and an adjusted-pressure chamber which is located on the other of the opposite sides of the valve seat remote from the plunger and which communicates with the second pilot chamber R9 of the regulator 24 for accommodating the working fluid having the adjusted pressure $P_{AJT}$ corresponding to the second pilot pressure $P_{PLT}$. There acts, on the plunger, a pressure-difference-based acting force $F\Delta_{P\cdot R}$ based on a pressure difference between the adjusted pressure $P_{AJT}$ and the atmospheric pressure $P_{RSV}$, in a direction in which the plunger is separated away from the valve seat. At the same time, the plunger is biased by a biasing force $F_{K\cdot R}$ of a spring in the same direction as the pressure-difference-based acting force $F\Delta_{P\cdot R}$. By energization of the coil, there also acts, on the plunger, an electromagnetic acting force $F_{E\cdot R}$ having a magnitude in accordance with an energizing current $i_R$ supplied to a coil in a direction opposite to the pressure-difference-based acting force $F\Delta_{P\cdot R}$ and the biasing force $F_{K\cdot R}$ of the spring. Roughly, in the present pressure-decrease linear valve 28, the energizing current $i_R$ is determined such that an arbitrary adjusted pressure $P_{PLT}$ is obtained while considering a balance among the pressure-difference-based acting force $F\Delta_{P\cdot R}$, the electromagnetic acting force $F_{E\cdot R}$, and the biasing force $F_{K\cdot R}$, and the determined energizing current is supplied to the coil. The determination of the energizing current $i_R$ will be later explained in detail, as in the pressure-increase linear valve 26. It is noted that, in the pressure-decrease linear valve 28, the adjusted pressure $P_{AJT}$ increases with an increase in the energizing current $i_R$. In other words, an opening degree (e.g., a degree of easiness with which the valve changes from the closed state to the open state) becomes lower and a valve-opening pressure becomes higher, with an increase in the energizing current $i_R$.

From the viewpoint of the functions of the pressure-increase linear valve 26 and the pressure-decrease linear valve 28 described above, in the present system, the pressure-increase linear valve 26 and the pressure-decrease linear valve 28 provide a pressure adjusting valve device configured to adjust the pressure of the working fluid to the adjusted pressure $P_{PLT}$. The pressure adjusting valve device is configured to adjust the second pilot pressure $P_{PLT}$ of the regulator 24 as the adjusted pressure $P_{AJT}$.

7. Control System

A control of the present system, namely, a brake control, is executed by the brake ECU 30. Roughly, the brake ECU 30 controls the high-pressure-source device 22, specifically, the brake ECU 30 controls the motor 92 of the high-pressure-source device 22, and further controls the pressure-increase linear valve 26 and the pressure-decrease linear valve 28. The brake ECU 30 is constituted by a computer as a main element and drive circuits (drivers) for driving the motor 92 of the high-pressure-source device 22, the pressure-increase linear valve 26, and the pressure-decrease linear valve 28, respectively.

To the brake ECU 30, the following sensors are connected: the reaction-force pressure sensor 86 for detecting a pressure $P_{RCT}$ in the reaction-force chamber R6 or in the opposing chamber R5 (hereinafter referred to as "reaction-force pressure $P_{RCT}$" where appropriate); the high-pressure-source pressure sensor 96 for detecting the high-pressure-source pressure $P_{ACC}$ (the so-called "accumulator pressure") that is a pressure of the working fluid supplied from the high-pressure-source device 22 to the regulator 24; and the servo pressure sensor 134 for detecting the servo pressure $P_{SRV}$ that is a pressure of the working fluid fed from the regulator 24 to the master cylinder device. The pressures $P_{RCT}$, $P_{ACC}$, $P_{SRV}$ are obtained as information necessary for the control. Further, the present system is provided with a brake operation amount sensor 140 for detecting a brake operation amount $\delta_{PDL}$ and a brake operation force sensor 142 for detecting a brake operation force $F_{PDL}$, as operation information of the brake pedal 14 functioning as the brake operation member. (In FIG. 1, the brake operation amount sensor 140 and the brake operation force sensor 142 are marked with a sign "$\delta_{PDL}$" indicative of the brake operation amount and a sign "$F_{PDL}$" indicative of the brake operation force, respectively.) The sensors 140, 142 are also connected to the brake ECU 30. The control in the present system is executed based on the values detected by the sensors.

In the present system, the brake ECU 30 is capable of executing a control to cope with fluid leakage in the pressure-increase linear valve 26 (hereinafter referred to as "brake control in the fluid leakage condition" where appropriate), in addition to a control in a normal condition (hereinafter referred to as "normal-condition brake control" where appropriate), as later explained in detail. Further, the brake ECU 30 is capable of executing a control for detecting the fluid leakage in the pressure-increase linear valve 26 (hereinafter referred to as "fluid leakage detection processing" where appropriate).

<Control and Processing in Hydraulic Brake System>

Hereinafter, the brake control and the fluid leakage detection processing in the present system will be explained with reference to programs therefor following flows of the programs. For easier understanding of the control and the processing in the system, there will be explained a main flow of the brake control, the normal-condition brake control, the fluid leakage in the pressure-increase linear valve and the fluid leakage detection processing, and the brake control in the fluid leakage condition, in this order. Thereafter, a functional structure of the brake ECU 30 relating to the control and the processing will be explained.

[A] Main Flow of Brake Control

Figure 2:
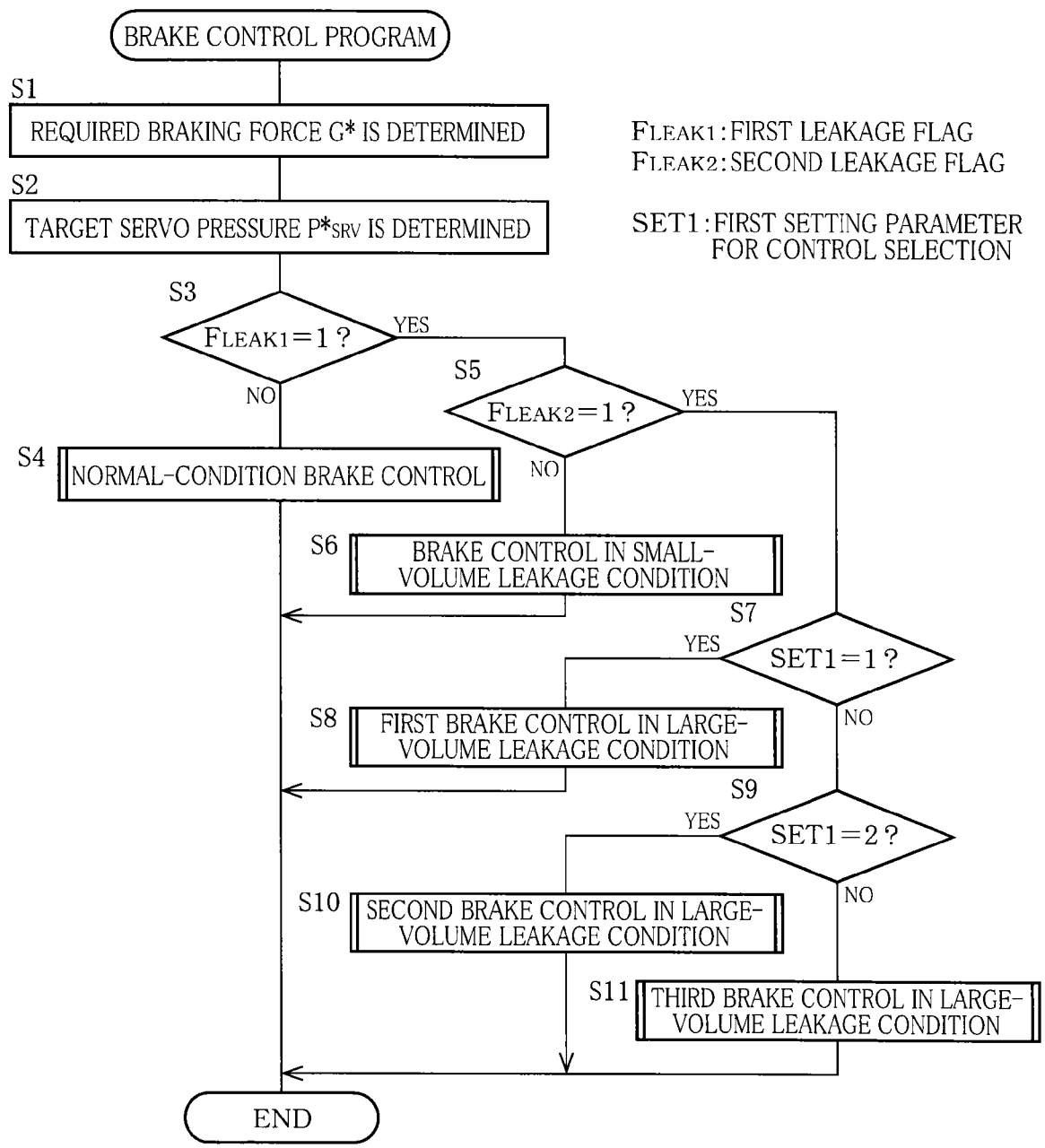
FIG. 2 is a flow chart showing a brake control program executed by a brake electronic control unit (ECU) of the hydraulic brake system of FIG. 1.

The brake control is executed for permitting the brake devices 12 to generate an appropriate braking force. The brake control is executed such that the brake ECU 30 repeatedly executes a brake control program represented by a flow chart of FIG. 2 at a short time pitch from several msec. to several tens of msec.

In the control processing according to this program, initially, at Step 1 (hereinafter abbreviated as "S1" and other steps will be similarly abbreviated), a required braking force G* is determined. The required braking force G* is a braking force required for the present hydraulic brake system to generate, namely, a braking force that should be generated by the four brake devices 12. The required braking force G* may be referred to as a target braking force. To be more specific, there is initially calculated, a required total braking force $G_{TOTAL}$ that is a braking force required for the vehicle as a whole according to a known technique on the basis of the brake operation amount $\delta_{PDL}$ and the brake operation force $F_{PDL}$ detected by the brake operation amount sensor 140 and the brake operation force sensor 142, respectively. Subsequently, there is obtained a regenerative braking force $G_{REG}$ that is to be generated at a current time point on the basis of information sent from the electronic control unit of a vehicle drive system. By subtracting the regenerative braking force $G_{REG}$ form the required total braking force $G_{TOTAL}$, the required braking force G* is determined.

Subsequently, there is determined, at S2, a target servo pressure $P^*_{SRV}$ that is a target value of the servo pressure $P_{SRV}$ on the basis of the required braking force G* determined at S1. To be more specific, the target servo pressure $P^*_{SRV}$ is calculated from the required braking force G* on the basis of a ratio among: a pressure receiving area of the piston of the wheel cylinder of each brake device 12; a pressure receiving area of the first pressurizing piston 42 with respect to the input chamber R4 of the master cylinder device 16; a pressure receiving area of the first pressurizing piston 42 with respect to the first pressurizing chamber R1; and a pressure receiving area of the second pressurizing piston 44 with respect to the second pressurizing chamber R2.

Subsequently, it is judged at S3 whether a first leakage flag $F_{LEAK1}$ is "1" or not. The first leakage flag $F_{LEAK1}$ is configured to have an initial value of "0" and is configured to be set to "1" when the pressure-increase linear valve 26 is suffering from fluid leakage. Where it is judged that the first leakage flag $F_{LEAK1}$ is "0", namely, where the fluid leakage is not occurring, the normal-condition brake control of S4 is executed. On the other hand, where the first leakage flag $F_{LEAK1}$ is "1", namely, where the fluid leakage is occurring, it is judged at S5 whether a second leakage flag $F_{LEAK2}$ is "1" or not. The second leakage flag $F_{LEAK2}$ is configured to have an initial value of "0" and is configured to be set to "1" when the fluid leakage in the pressure-increase linear valve 26 is beyond a set degree, namely, when the fluid leakage is "large-volume leakage" that will be later explained. Where it is judged that the second leakage flag $F_{LEAK2}$ is "0", namely, where the fluid leakage is not beyond the set degree, in other words, the fluid leakage is "small-volume leakage" that will be later explained, a brake control in the small-volume leakage condition of S6 is executed. On the other hand, where the fluid leakage is the large-volume leakage, the control flow goes to S7.

There are prepared, in the present system, the following mutually different three controls (that will be later explained in detail) to cope with the large-volume leakage: a first brake control in the large-volume leakage condition, a second brake control in the large-volume leakage condition, and a third brake control in the large-volume leakage condition. One of these three controls is selectively executed. Which one of the three controls is executed is determined based on a value of a first setting parameter SET1 for control selection. The value of the first setting parameter SET1 for control selection is set such that the values "1", "2", "3" correspond to the first brake control in the large-volume leakage condition, the second brake control in the large-volume leakage condition, and the third brake control in the large-volume leakage condition, respectively. Where it is judged at S7 that the first setting parameter SET1 for control selection is "1", the first brake control in the large-volume leakage condition is executed at S8. Where it is judged at S9 that the first setting parameter SET1 for control selection is "2", the second brake control in the large-volume leakage condition is executed at S10. Where it is judged that the first setting parameter SET1 for control selection is "3", the third brake control in the large-volume leakage condition is executed at S11.

[B] Normal-Condition Brake Control

Figure 3:
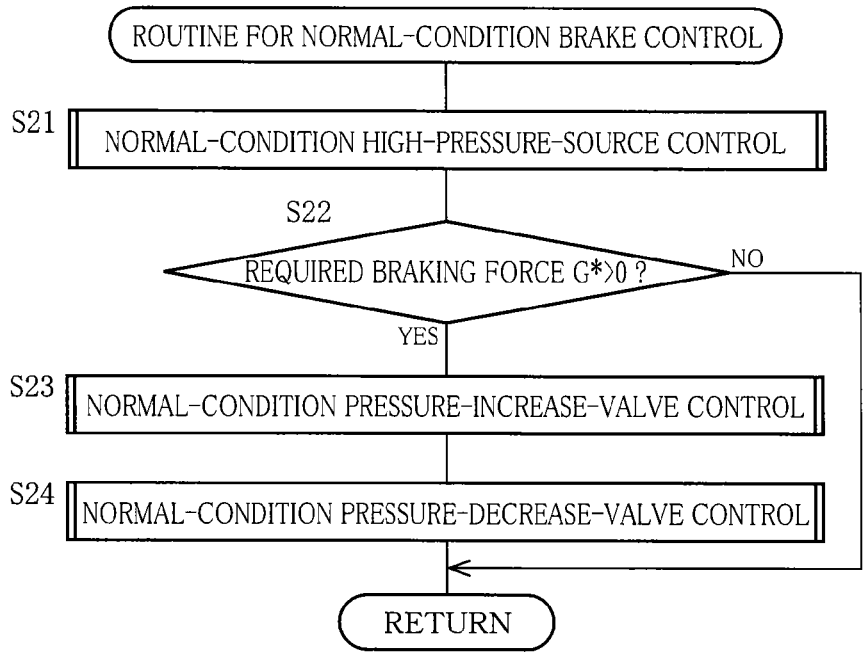
FIG. 3 is a flow chart showing a routine for a normal-condition brake control that constitutes a part of the brake control program.

The normal-condition brake control of S4 is a control to be executed in a case in which the pressure-increase linear valve 26 is not suffering from any fluid leakage. The normal-condition brake control is executed by execution of a routine for the normal-condition brake control indicated by a flow chart of FIG. 3. In processing according to this routine, a normal-condition high-pressure-source control is initially executed at S21. It is then judged at S22 whether or not the required braking force G* determined at S1 is larger than 0, namely, it is judged that the current state is a braking-force required state in which generation of a braking force by the brake devices 12 is required or a braking-force non-required state in which generation of the braking force by the brake devices 12 is not required. Where it is judged that the current state is the braking-force required state, a normal-condition pressure-increase-valve control is executed at S23, and a normal-condition pressure-decrease-valve control is executed at S24.

1. Normal-Condition High-Pressure-Source Control

Figure 4:
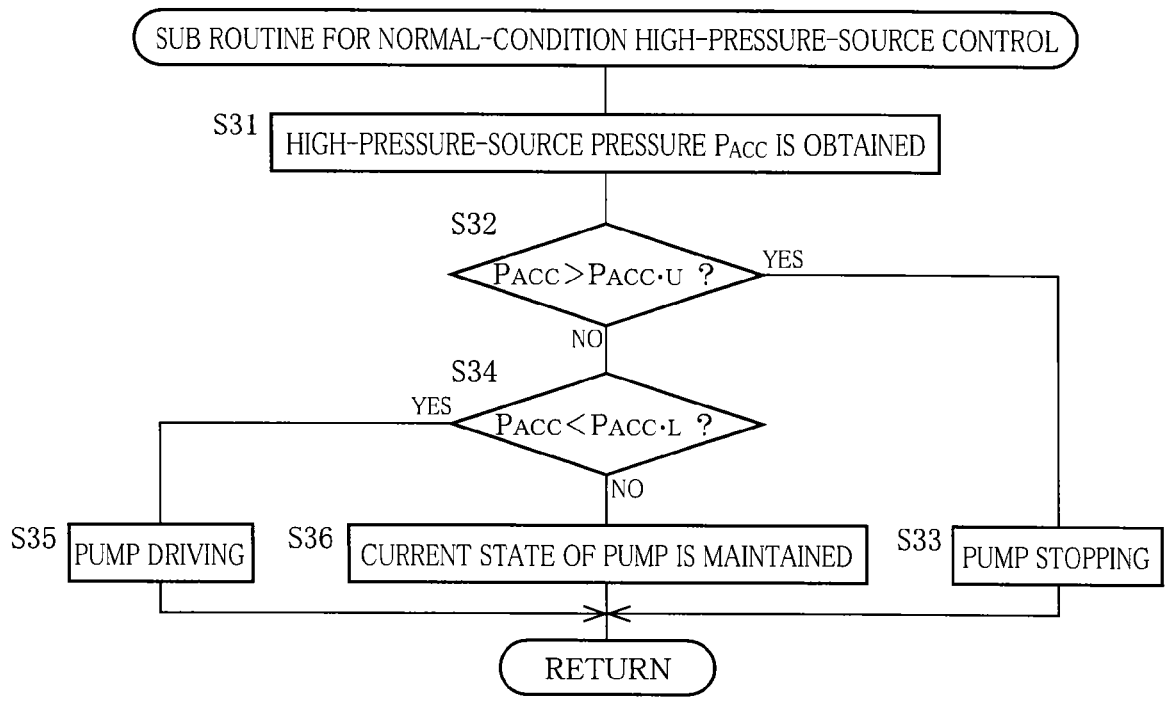
FIG. 4 is a flow chart showing a sub routine for a normal-condition high-pressure-source control that constitutes a part of the routine for the normal-condition brake control.

The normal-condition high-pressure-source control of S21 is executed by execution of a sub routine for the normal-condition high-pressure-source control indicated by a flow chart of FIG. 4. This control is a control for the high-pressure-source device 22, namely, a control for regulating the high-pressure-source pressure $P_{ACC}$. In processing according to the sub routine for the normal-condition high-pressure-source control, the high-pressure-source pressure $P_{ACC}$ is initially obtained at S31 based on detection by the high-pressure-source pressure sensor 96. It is subsequently judged at S32 whether or not the high-pressure-source pressure $P_{ACC}$ is over a set upper-limit pressure $P_{ACC \cdot U}$. Where it is judged at S32 that the high-pressure-source pressure $P_{ACC}$ is over the set upper-limit pressure $P_{ACC \cdot U}$, there is issued, at S33, a command to stop driving of the pump 90. More specifically, a command to stop the motor 92 is sent to the drive circuit. On the other hand, where it is judged that the high-pressure-source pressure $P_{ACC}$ is not over the set upper-limit pressure $P_{ACC \cdot U}$, it is judged at S34 whether or not the high-pressure-source pressure $P_{ACC}$ is below the set lower-limit pressure $P_{ACC \cdot L}$. Where it is judged that the high-pressure-source pressure $P_{ACC}$ is below the set lower-limit pressure $P_{ACC \cdot L}$, there is issued, at S35, a command to drive the pump 90. More specifically, a command to activate the motor 92 is sent to a motor driver. On the other hand, where it is judged that the high-pressure-source pressure $P_{ACC}$ is not below the set lower-limit pressure $P_{ACC \cdot L}$, namely, where the high-pressure-source pressure $P_{ACC}$ is not lower than the set lower-limit pressure $P_{ACC \cdot L}$ and is not higher than the set upper-limit pressure $P_{ACC \cdot U}$, there is issued, at S36, a command to maintain the current state of the pump 90. In other words, a command to maintain driving of the pump 90 is issued when the pump 90 is being driven while a command to maintain stopping of the pump 90 is issued when the pump 90 is at rest. More specifically, a command to activate the motor 92 is issued when the motor 92 is being activated while a command to stop the motor 92 is issued when the motor 92 is at rest.

By execution of the normal-condition high-pressure-source control described above, the high-pressure-source pressure $P_{ACC}$ is maintained within a set pressure range defined by the set upper-limit pressure $P_{ACC \cdot U}$ and the set lower-limit pressure $P_{ACC \cdot L}$. In the normal-condition high-pressure-source control, the motor 92 is activated by a constant current supplied thereto. That is, the pump 90 is driven by a constant power. In the normal-condition brake control, the control for the high-pressure-source device 22 executed by execution of the sub routine for the normal-condition high-pressure-source control is independent from a control for the pressure-increase linear valve 26 executed by execution of a sub routine for the normal-condition pressure-increase-valve control and a control for the pressure-decrease linear valve 28 executed by execution of the sub routine for the normal-condition pressure-decrease-valve control. These sub routines will be later explained.

2. Normal-Condition Pressure-Increase-Valve Control and Normal-Condition Pressure-Decrease-Valve Control The normal-condition pressure-increase-valve control of S23 for the pressure-increase linear valve 26 and the normal-condition pressure-decrease-valve control of S24 for the pressure-decrease linear valve 28 are executed by execution of a sub routine for the normal-condition pressure-increase-valve control indicated by a flow chart of FIG. 5 and a sub routine for the normal-condition pressure-decrease-valve control indicated by a flow chart of FIG. 6, respectively. These two controls cooperate with each other to adjust the adjusted pressure $P_{AJT}$, i.e., the second pilot pressure $P_{PLT}$ of the regulator 24, so as to obtain the target servo pressure $P^*_{SRV}$.

In processing according to the sub routine for the normal-condition pressure-increase-valve control, there is initially determined, at S41, a basic energizing current $I_{A0}$ that is a basis of an energizing current $I_A$ to be supplied to the pressure-increase linear valve 26. Due to the structure of the pressure-increase linear valve 26 explained above, a balance among the pressure-difference-based acting force $F\Delta_{P \cdot A}$, the biasing force $F_{K \cdot A}$ of the spring, and the electromagnetic acting force $F_{E \cdot A}$ is represented by the following formula:

$$F_{E \cdot A} = F_{K \cdot A} - F\Delta_{P \cdot A}$$

In this respect, where the energizing current when the forces described above are balanced is represented as "$I_{A \cdot FF}$", the following formulas are established:

$$F_{E \cdot A} = \alpha_A \cdot I_{A \cdot FF}$$

$$F\Delta_{P \cdot A} = \beta_A \cdot (P_{ACC} - P_{AJT}) \quad \alpha_A, \beta_A: \text{coefficients}$$

Accordingly, the above formula is represented as follows:

$$\alpha_A \cdot I_{A \cdot FF} = F_{K \cdot A} - \beta_A \cdot (P_{ACC} - P_{AJT})$$

wherein "$F_{K \cdot A}$" is regarded as a constant. The high-pressure-source pressure $P_{ACC}$ can be obtained based on the values detected by the high-pressure-source pressure sensor 96. The adjusted pressure $P_{AJT}$ is equal to the second pilot pressure $P_{PLT}$, and the second pilot pressure $P_{PLT}$ can be estimated from the servo pressure $P_{SRV}$ obtained based on the detected values of the servo pressure sensor 134 according to a pressure increase ratio determined by the structure of the regulator 24. In this way, the high-pressure-source pressure $P_{ACC}$ and the adjusted pressure $P_{AJT}$ are obtained, and the energizing current $I_{A\text{-}FF}$ when the above-indicated forces are balanced is calculated as a feedforward component according to the above formula, on the basis of the high-pressure-source pressure $P_{ACC}$ and the adjusted pressure $P_{AJT}$. Further, for making an actual servo pressure $P_{SRV}$ closer to the target servo pressure $P^*_{SRV}$, there is calculated, as a component based on a deviation therebetween, an energizing current $I_{A\text{-}FB}$ as a feedback component, according to the following formula:

$$I_{A\text{-}FB} = \gamma_A \cdot (P^*_{SRV} - P_{SRV}) \; \gamma_A\text{: control gain}$$

The thus obtained feedforward component $I_{A\text{-}FF}$ and feedback component $I_{A\text{-}FB}$ are added together according to the following formula, whereby the basic energizing current $I_{A0}$ is determined:

$$I_{A0} = I_{A\text{-}FF} + I_{A\text{-}FB}$$

Subsequently, at S42 and S43, it is judged, on the basis of a change in the target servo pressure $P^*_{SRV}$, in which one of the following three conditions the braking force is: the braking force is in the process of increase; the braking force is in the process of decrease; and the braking force is being maintained without changing. In other words, by comparing the target servo pressure $P^*_{SRV}$ determined in previous execution of the brake control program with the target servo pressure $P^*_{SRV}$ determined in current execution of the brake control program, it is judged whether the servo pressure $P_{SRV}$ is increasing, decreasing, or being maintained, namely, in a condition in which the current servo pressure $P_{SRV}$ should be maintained. Where it is judged that the servo pressure $P_{SRV}$ is increasing or being maintained, the energizing current $I_A$ to be supplied is determined at S44 so as to be equal to the above-indicated basic energizing current $I_{A0}$. On the other hand, where it is judged that the servo pressure $P_{SRV}$ is decreasing, the energizing current $I_A$ is determined at S45 so as to be equal to 0, in view of electricity consumption by the pressure-increase linear valve 26. Subsequently, there is issued, at S46, a command as to the determined energizing current $I_A$. To be more specific, the command as to the energizing current $I_A$ is sent to the drive circuit.

In processing according to the sub routine for the normal-condition pressure-decrease-valve control, there is initially determined, at S51, a basic energizing current $I_{R0}$ that is a basis of an energizing current $I_R$ to be supplied to the pressure-decrease linear valve 28. Due to the structure of the pressure-decrease linear valve 28 explained above, a balance among the pressure-difference-based acting force $F\Delta_{P\text{-}R}$, the biasing force $F_{K\text{-}R}$ of the spring, and the electromagnetic acting force $F_{E\text{-}R}$ is represented by the following formula:

$$F_{E\text{-}R} = F_{K\text{-}R} + F\Delta_{P\text{-}R}$$

In this respect, where the energizing current when the forces described above are balanced is represented as "$I_{R\text{-}FF}$", the following formulas are established:

$$F_{E\text{-}R} = \alpha_R \cdot I_{R\text{-}FF}$$

$$F\Delta_{P\text{-}R} = \beta_R \cdot (P_{AJT} - P_{RSV}) \; \alpha_R, \beta_R\text{: coefficients}$$

Accordingly, the above formula is represented as follows:

$$\alpha_R \cdot I_{R\text{-}FF} = F_{K\text{-}R} + \beta_R \cdot (P_{RSV} - P_{AJT})$$

wherein $F_{K\text{-}R}$ is regarded as a constant. The atmospheric pressure $P_{RSV}$ is generally 1 atmospheric pressure. The adjusted pressure $P_{AJT}$ is equal to the second pilot pressure $P_{PLT}$, and the second pilot pressure $P_{PLT}$ can be estimated from the servo pressure $P_{SRV}$ obtained based on the detected values of the servo pressure sensor 134 according to a pressure increase ratio determined by the structure of the regulator 24. In this way, the atmospheric pressure $P_{RSV}$ and the adjusted pressure $P_{AJT}$ are obtained, and the energizing current $I_{R\text{-}FF}$ when the above-indicated forces are balanced is calculated as a feedforward component according to the above formula, on the basis of the atmospheric pressure $P_{RSV}$ and the adjusted pressure $P_{AJT}$. Further, for making an actual servo pressure $P_{SRV}$ closer to the target servo pressure $P^*_{SRV}$, there is calculated, as a component based on a deviation therebetween, an energizing current $I_{R\text{-}FB}$ as a feedback component, according to the following formula:

$$I_{R\text{-}FB} = \gamma_R \cdot (P^*_{SRV} - P_{SRV}) \; \gamma_R\text{: control gain}$$

The thus obtained feedback component $I_{R\text{-}FB}$ is subtracted from the feedforward component $I_{R\text{-}FF}$ according to the following formula, whereby the basic energizing current $I_{R0}$ is determined:

$$I_{R0} = I_{R\text{-}FF} - I_{R\text{-}FB}$$

Subsequently, at S52 and S53, it is judged, on the basis of a change in the target servo pressure $P^*_{SRV}$, in which one of the following three conditions the braking force is: the braking force is in the process of decrease: the braking force is in the process of increase; and the braking force is being maintained without changing. In other words, by comparing the target servo pressure $P^*_{SRV}$ determined in previous execution of the brake control program with the target servo pressure $P^*_{SRV}$ determined in current execution of the brake control program, it is judged whether the servo pressure $P_{SRV}$ is decreasing, increasing, or being maintained, namely, in a condition in which the current servo pressure $P_{SRV}$ should be maintained. Where it is judged that the servo pressure $P_{SRV}$ is decreasing or being maintained, the energizing current $I_R$ to be supplied is determined at S54 so as to be equal to the basic energizing current $I_{R0}$. On the other hand, where it is judged that the servo pressure $P_{SRV}$ is increasing, the energizing current $I_R$ is determined at S55 so as to be equal to a sum of the basic energizing current $I_{R0}$ and a margin current $I_{MAG}$, for placing the pressure-decrease linear valve 28 in a sufficiently closed state. Subsequently, there is issued, at S56, a command as to the determined energizing current $I_R$. To be more specific, the command as to the energizing current $I_R$ is sent to the drive circuit.

[C] Fluid Leakage in Pressure-Increase Linear Valve and Fluid Leakage Detection Processing 1. Fluid Leakage Phenomenon and Influence of Fluid Leakage As described above, the pressure-increase linear valve 26 is a normally closed electromagnetic linear valve and is kept in the closed state when no energizing current is supplied thereto. The fluid leakage in the pressure-increase linear valve 26 is a phenomenon in which the working fluid leaks from the high-pressure-source device 22 to the second pilot chamber R9 of the regulator 24 even in the closed state. The fluid leakage occurs in a situation in which the valve 26 is not actually closed due to occurrence of structural defects or the like even if the valve 26 is placed in the closed state, for instance. As described above, the pressure-decrease linear valve 28 is a normally open electromagnetic linear valve and is kept in the open state when no energizing current is supplied thereto. Accordingly, the working fluid that flows into the second pilot chamber R9 due to the fluid leakage flows into the reservoir 20 via the pressure-decrease linear valve 28.

As described above, the pump 90 of the high-pressure-source device 22 is driven such that the high-pressure-source pressure $P_{ACC}$ falls within the set pressure range. When the pressure-increase linear valve 26 is suffering from the fluid leakage, the working fluid flows out from the accumulator 94, so that the high-pressure-source pressure $P_{ACC}$ is lowered, the driving frequency of the pump 90 becomes higher, and the activation time of the motor 92 is increased. As a result, the load on the motor 92 is increased, and the power consumption by the motor 92 is increased.

In the meantime, when a degree of the fluid leakage is high, namely, when an amount of the fluid leakage is large, not all of the leaked working fluid flows into the reservoir 20 via the pressure-decrease linear valve 28, but a part thereof remains in the second pilot chamber R9. In this instance, the second pilot pressure $P_{PLT}$ that is the pressure of the working fluid in the second pilot chamber R9 is increased, and the working fluid having the servo pressure $P_{SRV}$ in accordance with the second pilot pressure $P_{PLT}$ is supplied to the input chamber R4 of the master cylinder device 16. As a result, the master pressure $P_{MST}$ is increased, and the brake devices 12 generate the braking force. That is, there occurs a phenomenon in which the braking force is generated even though the brake pedal 14 is not operated, namely, there occurs the so-called brake drag phenomenon.

In view of the above, the present system is configured to not only detect the fluid leakage in the pressure-increase linear valve 26, but also detect whether or not the fluid leakage is beyond the set degree, namely, whether or not the fluid leakage is beyond a degree at which generation of the braking force is expected when the pressure-decrease linear valve 28 is in the open state. On the basis of results of the detection, the brake control is executed so as to cope with the fluid leakage in the pressure-increase linear valve 26. Here, the fluid leakage that is beyond the set degree corresponds to the above-indicated "large-volume leakage" while the fluid leakage that is below the set degree corresponds to the above-indicated "small-volume leakage".

The present system is capable of executing two sorts of fluid leakage detection processing, i.e., first fluid leakage detection processing and second fluid leakage detection processing. One of the two sorts of fluid leakage detection processing is selectively executed according to settings pre-installed on the vehicle or an arbitrary selecting operation by the driver. In this respect, each processing is executed in the braking-force non-required state in which generation of the braking force by the brake devices 12 is not required. More specifically, each processing is executed on the precondition that the brake pedal 14 is not being operated. Each processing is repeatedly executed until the fluid leakage is detected, and is not executed after the fluid leakage is once detected. Each processing is explained below.

2. First Fluid Leakage Detection Processing

Figure 7:
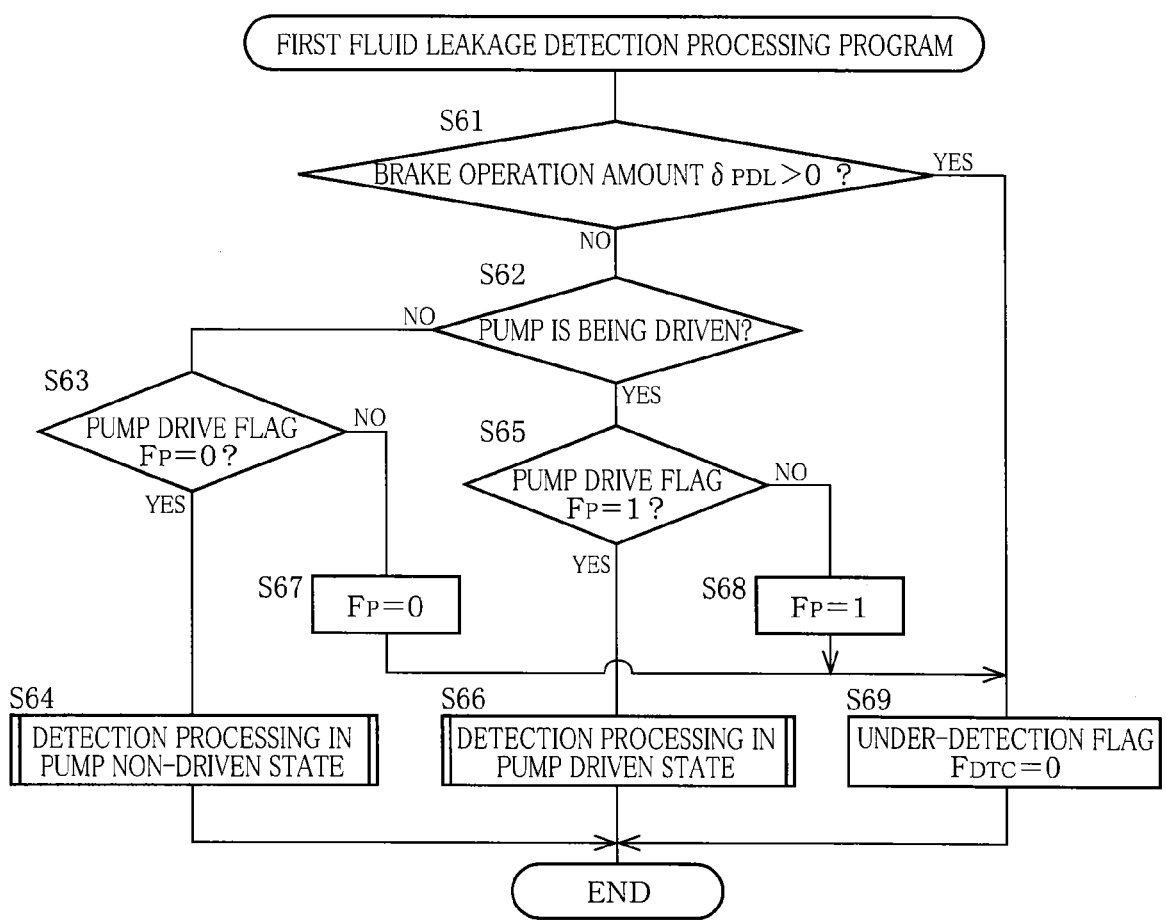
FIG. 7 is a flow chart showing a first fluid leakage detection processing program executed by the brake electronic control unit (ECU) of the hydraulic brake system of in FIG. 1.

The first fluid leakage detection processing is for detecting the fluid leakage in the pressure-increase linear valve 26 on the basis of a change in the high-pressure-source pressure $P_{ACC}$. To be more specific, the first fluid leakage detection processing is executed such that the brake ECU 30 executes a first fluid leakage detection processing program of FIG. 7. This program is repeatedly executed at a time pitch longer than that of the brake control program explained above, e.g., several hundreds of msec.

In processing according to the first fluid leakage detection processing program, it is initially judged at S61 whether or not the braking operation is being performed on the basis of the brake operation amount $\delta_{PDL}$. Where the braking operation is not being performed, it is judged at S62 whether or not the pump 90 of the high-pressure-source device 22 is being driven. In the processing according to this program, there is employed a pump drive flag $F_P$ configured to be set to "1" when the pump 90 is being driven and to be set to "0" when the pump 90 is not being driven. At S63, processing relating to the pump drive flag $F_P$ is executed. To be more specific, where it is judged that the pump 90 is not being driven, namely, where it is judged that the pump 90 is in a non-driven state, the driving state of the pump 90 at a time point when the program was immediately previously executed is confirmed at S63. That is, it is confirmed at S63 whether or not the pump 90 is being driven. Where the pump 90 was in the non-driven state also in the immediately previous execution of the program, it is judged that the non-driven state of the pump 90 is being continued and there is executed, at S64, detection processing in a pump non-driven state. On the other hand, where it is judged at S62 that the pump 90 is being driven, the state of the pump 90 in the immediately previous execution of the program is confirmed at S65. Where the pump 90 was in the driven state also in the immediately previous execution of the program, it is judged that the driven state of the pump 90 is being maintained and there is executed, at S66, detection processing in a pump driven state.

Where the state of the pump 90 in the immediately previous execution of the program and the state of the pump 90 in the current execution of the program differ from each other at each of S63 and S65, it is judged that the state of the pump 90 is changed from the driven state to the non-driven state or vice versa. In this case, the value of the pump drive flag $F_P$ is changed to a value indicative of the current state at each of S67 and S68, and a under-detection flag $F_{DTC}$ is reset at S69. The under-detection flag $F_{DTC}$ indicates whether or not the detection processing in the pump non-driven state or the detection processing in the pump driven state is being continuously executed. The under-detection flag $F_{DTC}$ is set to "1" when any one of the detection processing is being continuously executed and is set to "0" when none of the detection processing is being continuously executed at the current time point.

Figure 8:
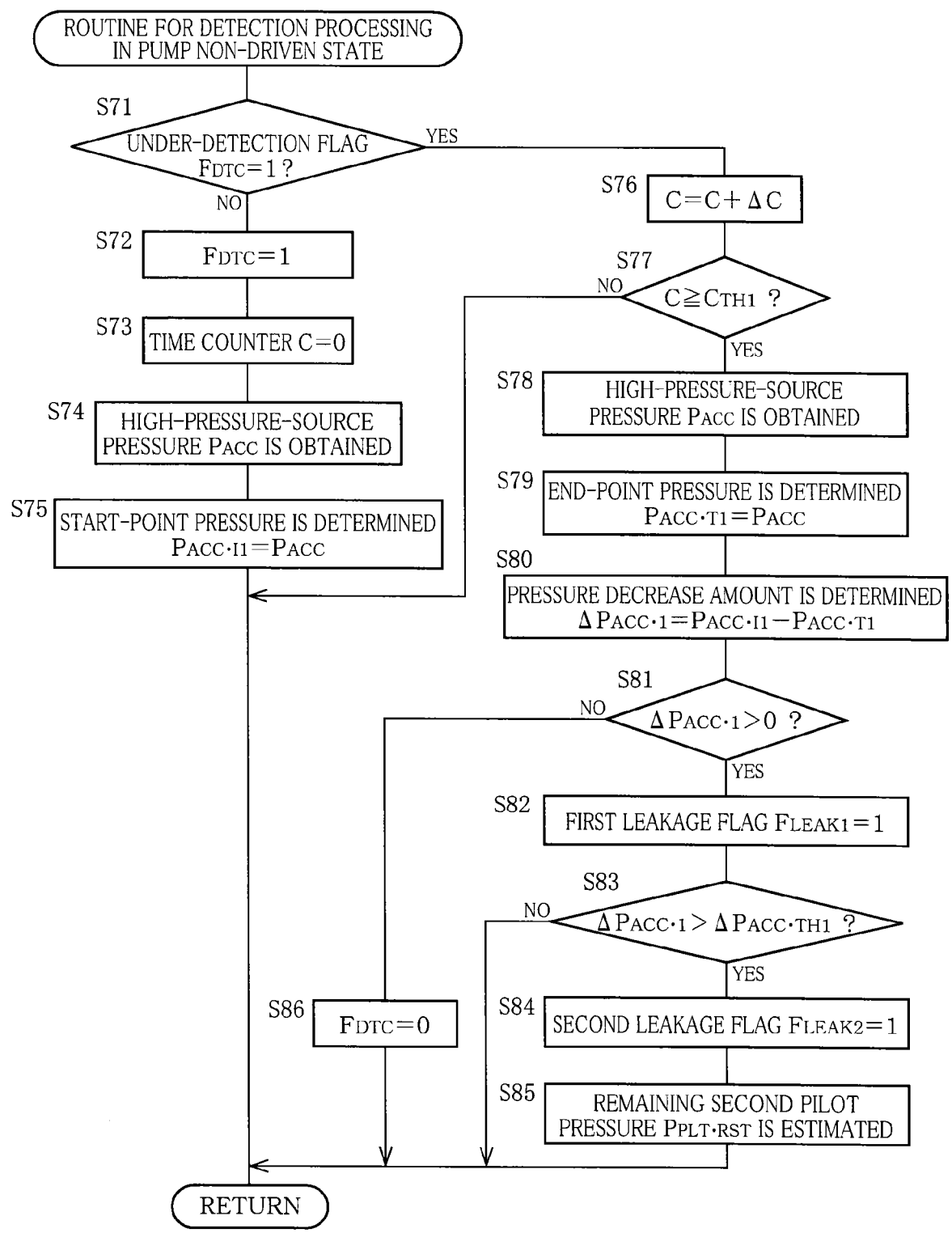
FIG. 8 is a flow chart showing a routine for detection processing in a pump non-driven state that constitutes a part of the first fluid leakage detection processing program.

The detection processing in the pump non-driven state at S64 is, in short, for detecting the leakage of the working fluid in the pressure-increase linear valve, on the basis of a degree of decrease in the high-pressure-source pressure $P_{ACC}$ in the non-driven state of the pump 90 in the braking-force non-required state. The detection processing in the pump non-driven state is executed by execution of a routine for the detection processing in the pump non-driven state indicated by a flow chart of FIG. 8. In processing according to the routine, it is judged at S71 whether the routine is currently executed for the first time, on the basis of a value of the under-detection flag $F_{DTC}$. Where it is judged that the routine is currently executed for the first time, there is executed initial processing of S72 and subsequent steps. In the initial processing, the under-detection flag $F_{DTC}$ is set to "1" at S72, and a time counter C for measuring a time required for the detection is reset at S73. Subsequently, the high-pressure-source pressure $P_{ACC}$ is obtained at S74 on the basis of the detected values of the high-pressure-source pressure sensor 96, and the high-pressure-source pressure $P_{ACC}$ is determined at S75 as a start-point pressure $P_{ACC-f1}$ that is the high-pressure-source pressure at a detection start point.

Where it is judged at S71 that the routine has been already executed, the time counter C is counted up at S76 by a count-up value $\Delta C$ corresponding to the time pitch of execution of the first fluid leakage detection processing program. It is subsequently judged at S77 whether or not the time required for the detection has elapsed by judging whether or not the value of the time counter C is equal to or greater than a value $C_{TH1}$ corresponding to a predetermined time required for the detection.

Where it is judged that the time required for the detection has elapsed, there is executed termination processing of S78 and subsequent steps. In the termination processing, the high-pressure-source pressure $P_{ACC}$ is initially obtained at S78 on the basis of the detected values of the high-pressure-source pressure sensor 96, and the high-pressure-source pressure $P_{ACC}$ is determined at S79 as an end-point pressure $P_{ACC\text{-}T1}$ that is the high-pressure-source pressure at a detection end point. There is subsequently determined at S80 a pressure decrease amount $\Delta P_{ACC}\cdot 1$ that is a decrease amount of the high-pressure-source pressure $P_{ACC}$, by subtracting the end-point pressure $P_{ACC\text{-}T1}$ from the start-point pressure $P_{ACC\text{-}I1}$. It is then judged at S81 whether or not the pressure decrease amount $\Delta P_{ACC}\cdot 1$ is larger than 0, namely, it is judged whether or not the high-pressure-source pressure $\Delta P_{ACC}$ has been decreased. Where the high-pressure-source pressure $\Delta P_{ACC}$ has been decreased, the first leakage flag $F_{LEAK1}$ is set at S82 to "1" indicative of occurrence of the fluid leakage in the pressure-increase linear valve 26. Subsequently, it is judged at S83 whether or not the pressure decrease amount $\Delta P_{ACC}\cdot 1$ is beyond a threshold pressure decrease amount $\Delta P_{ACC\text{-}TH1}$, namely, whether or not the fluid leakage is beyond the set degree. Where it is judged that the fluid leakage beyond the set degree is occurring, the second leakage flag $F_{LEAK2}$ is set at S84 to "1" indicative of the large-volume leakage. Then, on the basis of the pressure decrease amount $\Delta P_{ACC}\cdot 1$, there is estimated at S85 the pressure of the working fluid in the second pilot chamber R9 of the regulator 24 that will be generated due to the fluid leakage in the pressure-increase linear valve 26 when the pump 90 is driven in a state in which the braking operation is not performed, namely, there is estimated a remaining second pilot pressure $P_{PLT\text{-}RST}$ (that may be referred to as "remaining adjusted pressure $P_{AJT\text{-}RST}$"). The estimation of the remaining second pilot pressure $P_{PLT\text{-}RST}$ is conducted referring to an estimation map that is set based on data of experiments conducted at the design stage of the present system, for instance. In this respect, the amount of the working fluid that leaks from the pressure-increase linear valve 26, i.e., leakage speed, varies depending upon the level of the high-pressure-source pressure $P_{ACC}$. Accordingly, the threshold pressure decrease amount $\Delta P_{ACC\text{-}TH1}$ is set to an appropriate value in accordance with the start-point pressure $P_{ACC\text{-}I1}$ on the basis of the start-point pressure $P_{ACC\text{-}I1}$. Further, the estimation of the remaining second pilot pressure $P_{PLT\text{-}RST}$ is suitably conducted in accordance with the start-point pressure $P_{ACC\text{-}I1}$. Where it is judged at S81 that the fluid leakage is not occurring, the under-detection flag $F_{DTC}$ is reset at S86 for executing next series of detection processing.

Figure 9:
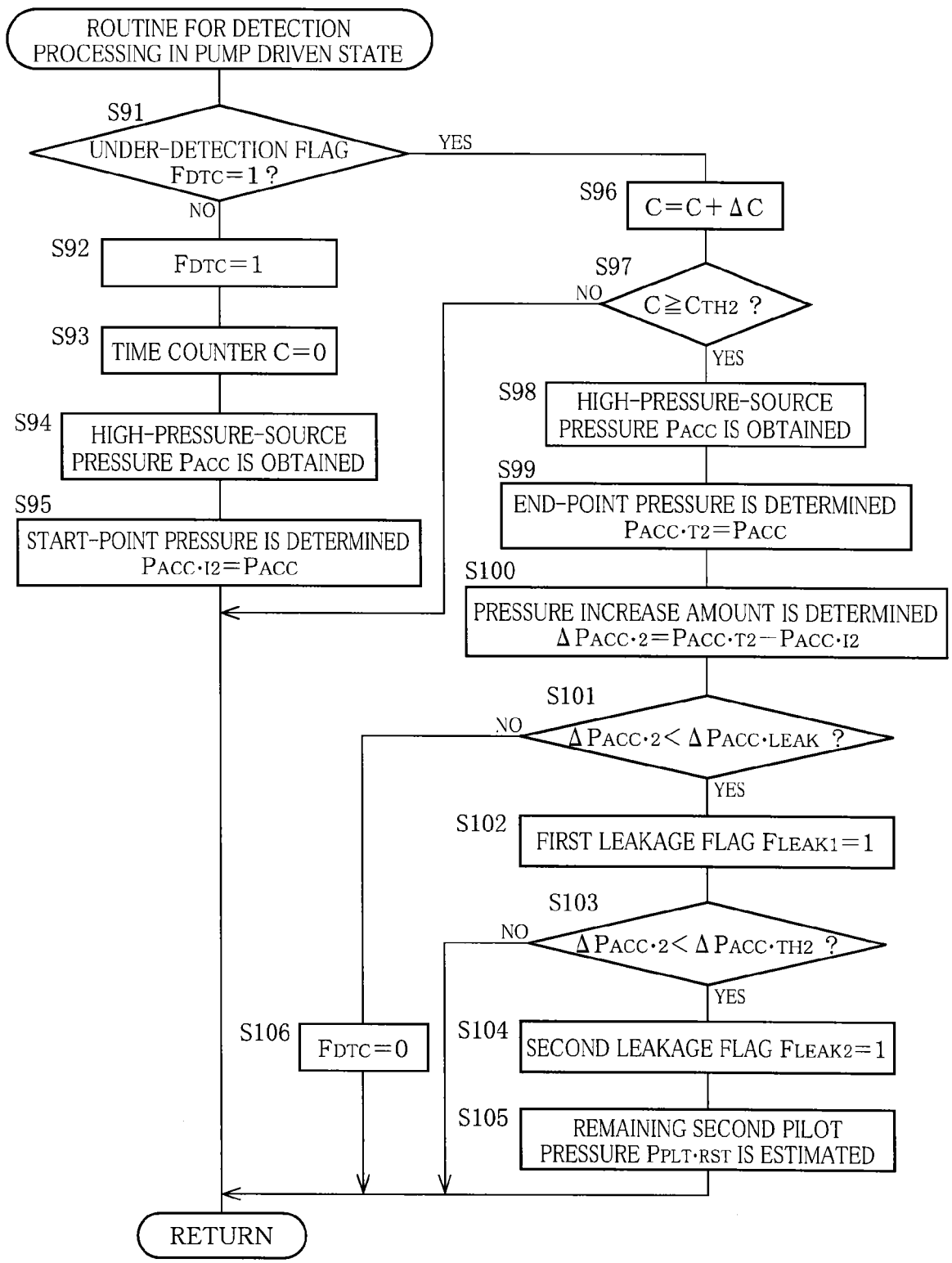
FIG. 9 is a flow chart showing a routine for detection processing in a pump driven state that constitutes a part of the first fluid leakage detection processing program.

The detection processing in the pump driven state at S66 is, in short, for detecting the leakage of the working fluid in the pressure-increase linear valve, on the basis of a degree of increase in the high-pressure-source pressure $P_{ACC}$ in the driven state of the pump 90 in the braking-force non-required state. The detection processing in the pump driven state is executed by execution of a routine for the detection processing in the pump driven state indicated a flow chart of FIG. 9. In processing according to the routine for the detection processing in the pump driven state, it is judged at S91 whether the routine is currently executed for the first time, on the basis of a value of the under-detection flag $F_{DTC}$. Where it is judged that the routine is currently executed for the first time, there is executed initial processing of S92 and subsequent steps. In the initial processing, the under-detection flag $F_{DTC}$ is set to "1" at S92, and the time counter C for measuring a time required for the detection is reset at S93. Subsequently, the high-pressure-source pressure $P_{ACC}$ is obtained at S94 on the basis of the detected values of the high-pressure-source pressure sensor 96, and the high-pressure-source pressure $P_{ACC}$ is determined at S95 as a start-point pressure $P_{ACC\text{-}I2}$ that is the high-pressure-source pressure at a detection start point.

Where it is judged at S91 that the routine has been already executed, the time counter C is counted up at S96 by a count-up value $\Delta C$ corresponding to the time pitch of execution of the program. It is subsequently judged at S97 whether or not the time required for detection has elapsed by judging whether or not the value of the time counter C is equal to or greater than a value $C_{TH2}$ corresponding to a predetermined time required for detection.

Where it is judged that the time required for the detection has elapsed, there is executed termination processing of S98 and subsequent steps. In the termination processing, the high-pressure-source pressure $P_{ACC}$ is initially obtained at S98 on the basis of the detected values of the high-pressure-source pressure sensor 96, and the high-pressure-source pressure $P_{ACC}$ is determined at S99 as an end-point pressure $P_{ACC\text{-}T2}$ that is the high-pressure-source pressure at a detection end point. There is subsequently determined at S100 a pressure increase amount $\Delta P_{ACC}\cdot 2$ that is an increase amount of the high-pressure-source pressure $P_{ACC}$, by subtracting the start-point pressure $P_{ACC\text{-}I2}$ form the end-point pressure $P_{ACC\text{-}T2}$. It is then judged at S101 whether or not the pressure increase amount $\Delta P_{ACC}\cdot 2$ is smaller than a set pressure for fluid leakage judgment $\Delta P_{ACC\text{-}LEAK}$, namely, it is judged whether or not the high-pressure-source pressure $\Delta P_{ACC}$ has been sufficiently increased. Where the high-pressure-source pressure $\Delta P_{ACC}$ is not sufficiently increased, the first leakage flag $F_{LEAK1}$ is set at S102 to "1" indicative of occurrence of the fluid leakage in the pressure-increase linear valve 26. Subsequently, it is judged at S103 whether or not the pressure increase amount $\Delta P_{ACC}\cdot 2$ is less than a threshold pressure increase amount $\Delta P_{ACC\text{-}TH2}$ that is set so as to be smaller than the above-indicated set pressure for fluid leakage judgment $\Delta P_{ACC\text{-}LEAK}$, namely, whether or not the fluid leakage is beyond the set degree. Where it is judged that the fluid leakage beyond the set degree is occurring, the second leakage flag $F_{LEAK2}$ is set at S104 to "1" indicative of the large-volume leakage. Then, on the basis of the pressure increase amount $\Delta P_{ACC}\cdot 2$, there is estimated at S105 the above-indicated remaining second pilot pressure $P_{PLT\text{-}RST}$, as in the detection processing in the pump non-driven state. As in the detection processing in the pump non-driven state, the threshold pressure increase amount $\Delta P_{ACC\text{-}TH2}$ is set to an appropriate value in accordance with the start-point pressure $P_{ACC\text{-}I2}$ on the basis of the start-point pressure $P_{ACC\text{-}I2}$, and the estimation of the remaining second pilot pressure $P_{PLT\text{-}RST}$ is suitably conducted in accordance with the start-point pressure $P_{ACC\text{-}I2}$. Where it is judged at S101 that the fluid leakage is not occurring, the under-detection flag $F_{DTC}$ is reset at S106 for executing next series of detection processing.

In the routine for the detection processing in the pump non-driven state, in short, the leakage of the working fluid in the pressure-increase linear valve 26 is detected in the non-driven state of the pump 90 on the basis of a degree of decrease in the high-pressure-source pressure $P_{ACC}$. In the routine for the detection processing in the pump driven state, in short, the leakage of the working fluid in the pressure-increase linear valve 26 is detected in the driven state of the pump 90 on the basis of a degree of increase in the high-pressure-source pressure $P_{ACC}$. In the processing according to the first fluid leakage detection processing program, the fluid leakage in the pressure-increase linear valve 26 is detected on the basis of a change in the high-pressure-source pressure $\Delta P_{ACC}$ within a set time. Instead, the fluid leakage in the pressure-increase linear valve 26 may be detected on the basis of a time when the high-pressure-source pressure $\Delta P_{ACC}$ has changed by a set degree. To be more specific, the fluid leakage may be judged based on a time required for the high-pressure-source pressure $\Delta P_{ACC}$ to be decreased by a set pressure when the pump 90 is not being driven or the fluid leakage may be judged based on a time required for the high-pressure-source pressure $\Delta P_{ACC}$ to be increased by a set pressure when the pump 90 is being driven.

3. Second Fluid Leakage Detection Processing

Figure 10:
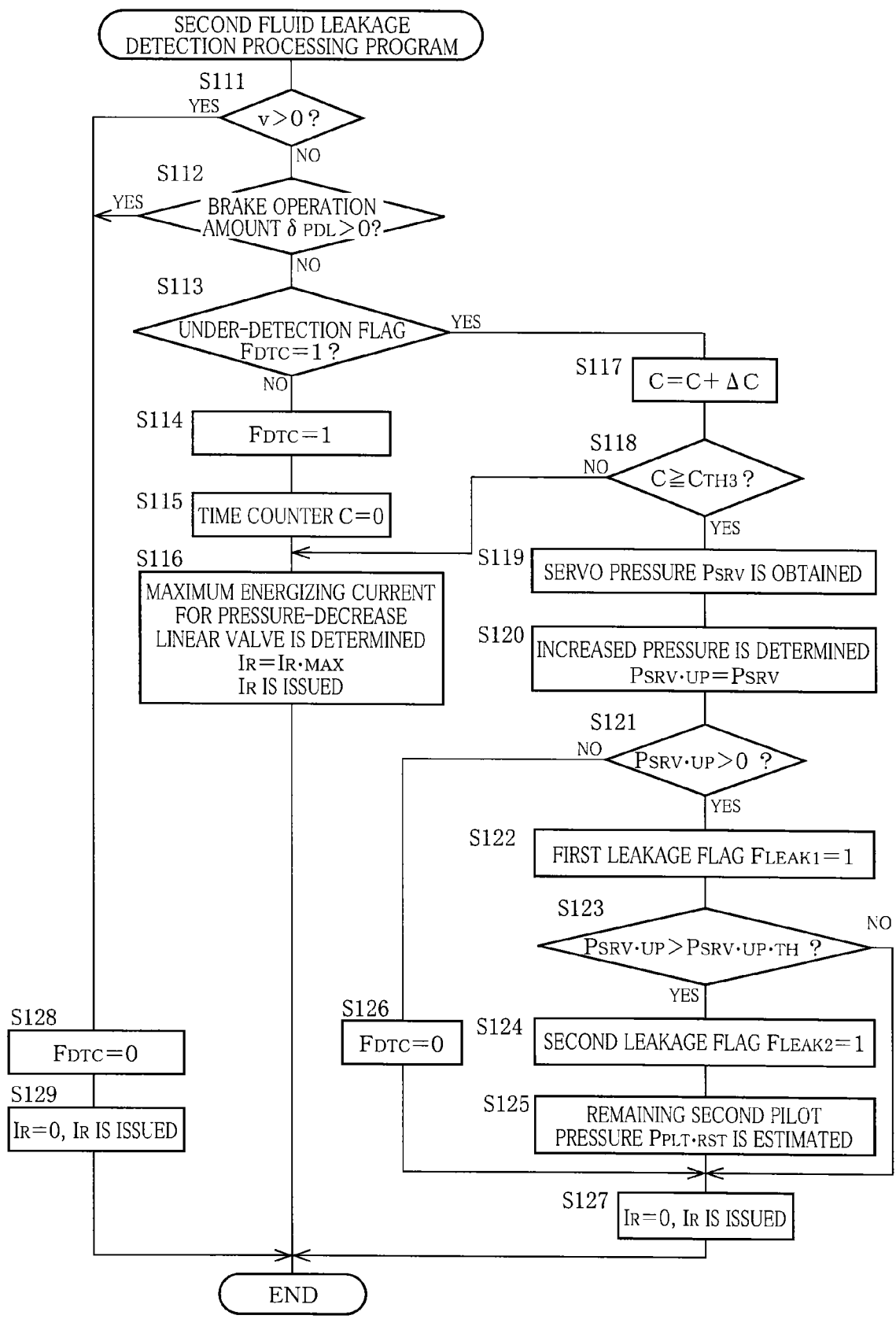
FIG. 10 is a flow chart showing a second fluid leakage detection processing program executed by the brake electronic control unit (ECU) of the hydraulic brake system of FIG. 1.

In second fluid leakage detection processing, the pressure-decrease linear valve 28 is forcibly placed in the closed state when the vehicle is stationary and the fluid leakage in the pressure-increase linear valve 26 is detected on the basis of a change in a braking force index when the valve 26 is forcible closed. Accordingly, the detection processing enables highly accurate detection of the fluid leakage in the pressure-increase linear valve 26. The braking force index is indicative of a magnitude of the braking force. In the present system, the servo pressure $P_{SRV}$ is employed as the braking force index. The processing is executed such that the brake ECU 30 executes a second fluid leakage detection processing program indicated in FIG. 10. This program is repeatedly executed at a time pitch longer that of the above-indicated brake control program, e.g., several hundreds of msec.

In processing according to the second fluid leakage detection processing program, it is initially judged at S111 whether or not the vehicle is running based on a running speed v of the vehicle. It is subsequently judged at S112 whether or not the braking operation is being performed based on the brake operation amount $\delta_{PDL}$. Where the vehicle is stationary and the braking operation is not being performed, it is judged at S113 whether or not the under-detection flag $F_{DTC}$ is "1". Like the under-detection flag employed in the first fluid leakage detection processing program, the under-detection flag $F_{DT}$ indicates whether or not detection processing that will be later explained is being continuously executed.

Where it is judged at S113 that the detection processing is currently executed for the first time, there is executed initial processing of S114 and subsequent steps. In the initial processing, the under-detection flag $F_{DTC}$ is set to "1" at S114, and the time counter C for measuring a time required for the detection is reset at S115. Subsequently, at S116, the energizing current $I_R$ to be supplied to the pressure-decrease linear valve 28 is determined so as to be equal to a maximum energizing current $I_{R-MAX}$ that is a set maximum energizing current, for forcibly placing the pressure-decrease linear valve 28 in the closed state, and a command as to the energizing current $I_R$ is issued. In the processing according to the program, when the maximum energizing current $I_{R-MAX}$ is supplied to the pressure-decrease linear valve 28 by the issuance of the command, the maximum energizing current $I_{R-MAX}$ is kept supplied until a next command as to another energizing current $I_R$ is issued.

Where it is judged at S113 that the detection processing has been already executed, the time counter C is counted up at S117. It is subsequently judged at S118 whether or not the time required for detection has elapsed by judging whether or not the value of the time counter C is equal to or greater than a value $C_{TH3}$ corresponding to a predetermined time required for detection Where it is judged that the time required for the detection has elapsed, there is executed termination processing of S119 and subsequent steps. In the termination processing, the servo pressure $P_{SRV}$ is initially obtained at S119 on the basis of the detected values of the servo pressure sensor 134, and the servo pressure $P_{SRV}$ is determined at S120 as an increased pressure $P_{SRV-UP}$. The increased pressure $P_{SRV-UP}$ is a pressure that has been increased by placing the pressure-decrease linear valve 28 in the closed state. Subsequently, it is judged at S121 whether or not the increased pressure $P_{SRV-UP}$ is larger than 0, namely, whether or not the servo pressure SRV is larger than the atmospheric pressure $P_{RSV}$. Where it is judged that the servo pressure $P_{SRV}$ is increased, the first leakage flag $F_{LEAK1}$ is set at S122 to "1" indicative of occurrence of the fluid leakage in the pressure-increase linear valve 26. It is then judged at S123 whether or not the increased pressure $P_{SRV-UP}$ is larger than a threshold increased pressure $P_{SRV-UP-TH}$, namely, whether or not the fluid leakage is beyond the set degree. In this respect, the pressure-decrease linear valve 28 is in the closed state. Accordingly, when the pressure-increase linear valve 26 is suffering from the fluid leakage, there is a possibility that the servo pressure $P_{SRV}$ finally becomes close to the high-pressure-source pressure $P_{ACC}$ even if the degree of the fluid leakage is small. In view of this, in order to accurately judge whether or not the degree of the fluid leakage is beyond the set degree, the value $C_{TH3}$ for the time counter C that corresponds to the time required for detection is set to a value corresponding to a comparatively short time, and the judgment at S123 is made by determining, as the increased pressure $P_{SRV-UP}$, the servo pressure $P_{SRV}$ before reaching the high-pressure-source pressure $P_{ACC}$.

Where it is judged at S123 that the fluid leakage is beyond the set degree, the second leakage flag $F_{LEAK2}$ is set at S124 to "1" indicative of the large-volume leakage. Then at S125, the above-indicated remaining second pilot pressure $P_{PLT-RST}$ is estimated on the basis of the increased pressure $P_{SRV-UP}$. In this respect, the increased pressure $P_{SRV-UP}$ varies depending upon the level of the high-pressure-source pressure $P_{ACC}$. Accordingly, the above-indicated threshold increased pressure $P_{SRV-TH}$ is set on the basis of the high-pressure-source pressure $\Delta P_{ACC}$ at a time point when the under-detection flag $F_{DTC}$ is set to "1", so as to be an appropriate value in accordance with the high-pressure-source pressure $\Delta P_{ACC}$, and the estimation of the remaining second pilot pressure $P_{PLT-RST}$ is appropriately conducted also in accordance with the high-pressure-source pressure $\Delta P_{ACC}$. Where it is judged at S121 that the fluid leakage is not occurring, the under-detection flag $F_{DTC}$ is reset at S126 for executing next series of the detection processing. At the end of the series of the termination processing, the energizing current $I_R$ is determined at S127 so as to be equal to 0 for placing the pressure-decrease linear valve 28 back into the open state, and a command as to the energizing current $I_R$ is issued. Where it is judged at S111 that the vehicle is running and where it is judged at S112 that the braking operation is being performed, the under-detection flag $F_{DTC}$ is reset at S128. Thereafter, at S129, the energizing current $I_R$ is determined so as to be equal to 0, and a command as to the energizing current $I_R$ is issued.

[D] Control in Fluid Leakage Condition

When the fluid leakage in the pressure-increase linear valve 26 is detected by the first fluid leakage detection processing or the second fluid leakage detection processing as described above, the first leakage flag $F_{LEAK1}$ is set to "1". Further, when it is detected that the fluid leakage is the large-volume leakage, the second leakage flag $F_{LEAK2}$ is set to "1". As explained above, in the brake control according to the brake control program of FIG. 2, there is executed one of: the brake control in the small-volume leakage condition; the first brake control in the large-volume leakage condition; the second brake control in the large-volume leakage condition; and the third brake control in the large-volume leakage condition, based on the values of the first leakage flag $F_{LEAK1}$ and the second leakage flag $F_{LEAK2}$ and the value of the first setting parameter SET1 for control selection. Each of the controls will explained below.

1. Brake Control in Small-Volume Leakage Condition

Figure 11:
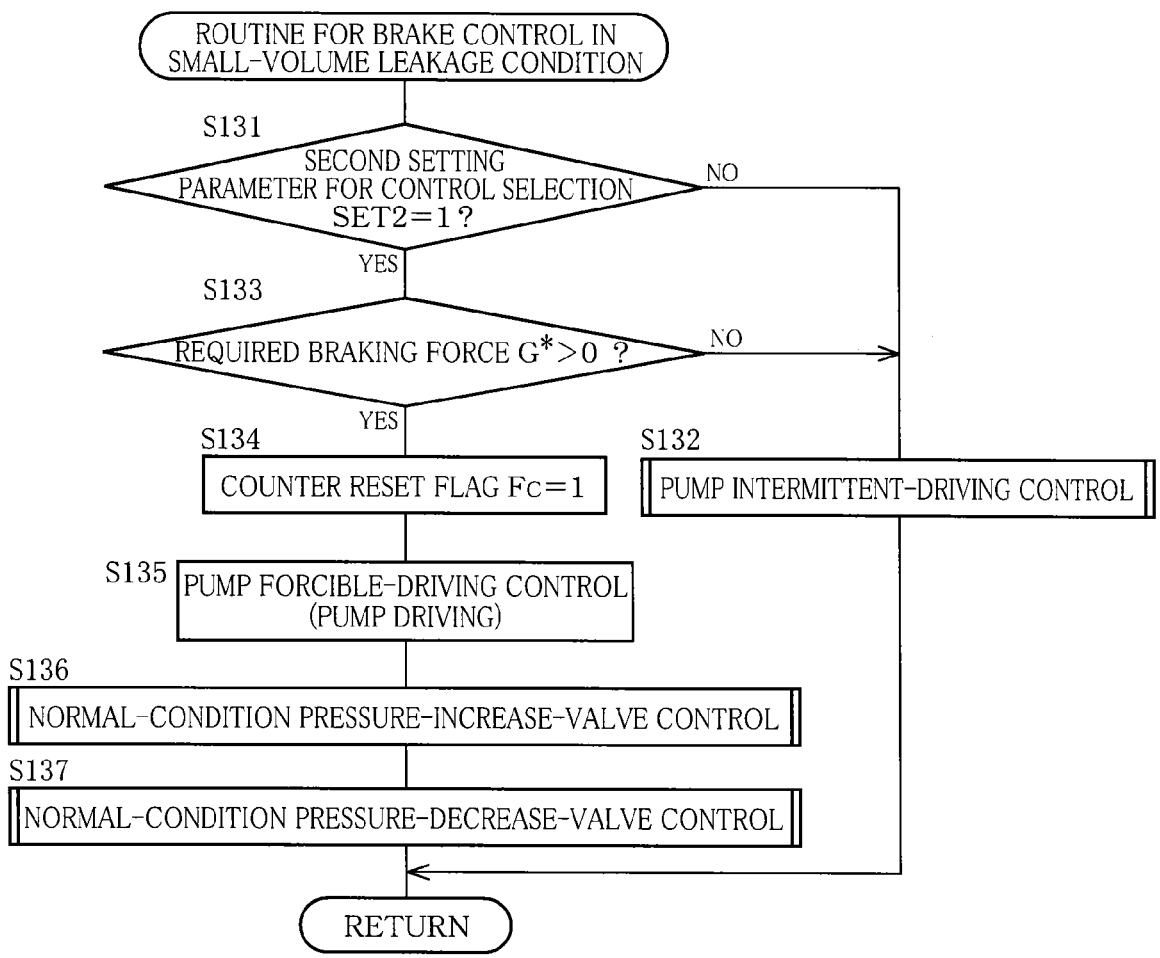
FIG. 11 is a flow chart showing a routine for a brake control in a small-volume leakage condition that constitutes a part of the brake control program.

The brake control in the small-volume leakage condition is executed when the fluid leakage in the pressure-increase linear valve 26 is not beyond the set degree. The brake control in the small-volume leakage condition is executed by execution, at S6 of the brake control program of FIG. 2, of a routine for the brake control in the small-volume leakage condition indicated by a flow chart of FIG. 11.

In processing according to the routine for the brake control in the small-volume leakage condition, a value of a second setting parameter SET2 for control selection is judged at S131. In the brake control in the small-volume leakage condition, two control modes are set for the control of the high-pressure-source device 22. Where the second setting parameter SET2 for control selection is set to "0", the control is executed in a first mode. Where the second setting parameter SET2 for control selection is set to "1", the control is executed in a second mode. In the first mode, a pump intermittent-driving control that will be later explained is executed irrespective of whether or not generation of the braking force is required, namely, irrespective of whether the current state is the braking-force required state or the braking-force non-required state. In the second mode, the pump intermittent-driving control is executed in the braking-force non-required state while a pump forcible-driving control is executed in the braking-force required state.

More specifically, where it is judged at S131 that the control is executed in the second mode, the pump intermittent-driving control of S132 is executed. On the other hand, where it is judged at S131 that the control is executed in the first mode, it is judged at S133 whether the current state is the braking-force required state or the braking-force non-required state, on the basis of the required braking force G* determined at S1. Where it is judged that the current state is the braking-force non-required state, the pump intermittent-driving control of S132 is executed. On the other hand, where it is judged that the current state is the braking-force required state, a counter reset flag $F_C$ (that will be later explained) is set to "1" at S134, and the pump forcible-driving control of S135 is subsequently executed. At S135, a command to drive the pump 90 is issued, and the pump 90 is kept driven in the braking-force required state by the control.

Figure 5:
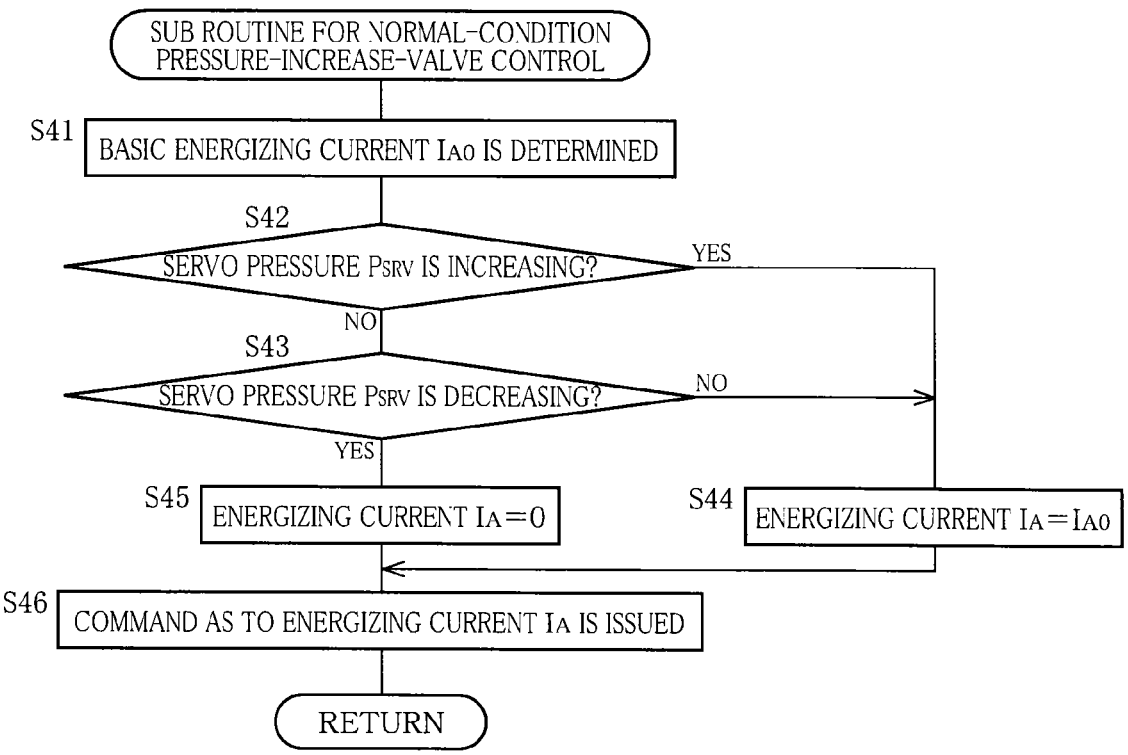
FIG. 5 is a flow chart showing a sub routine for a normal-condition pressure-increase-valve control that constitutes a part of the routine for the normal-condition brake control.
Figure 6:
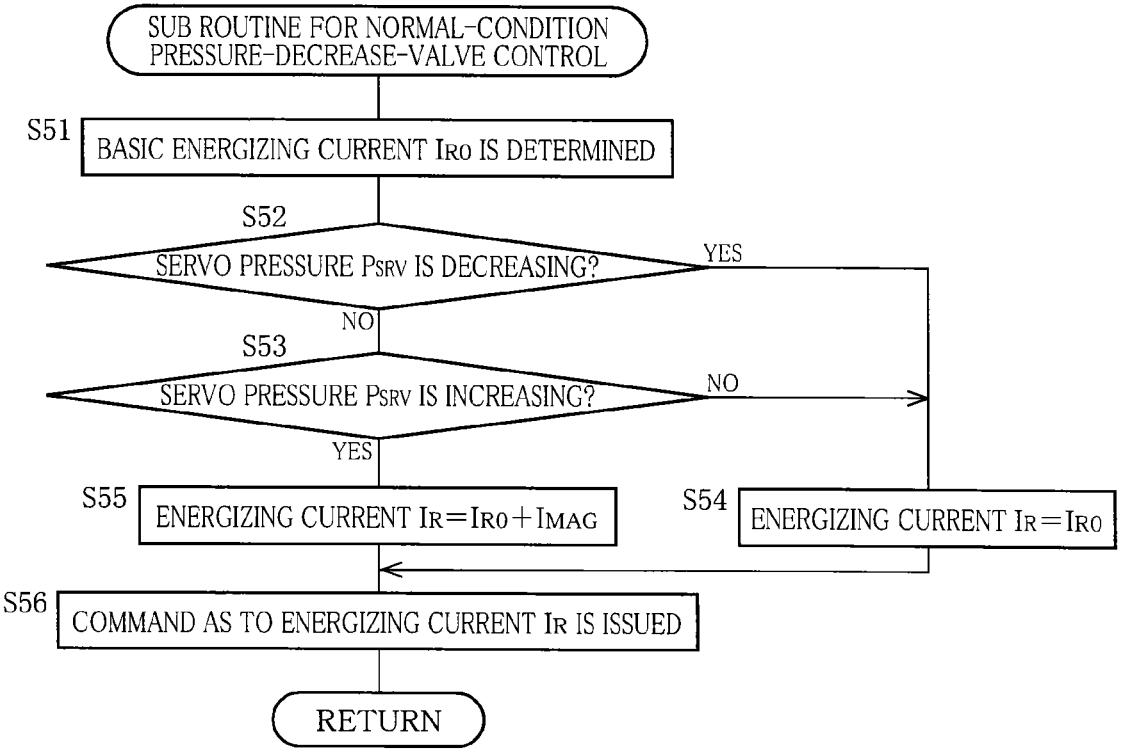
FIG. 6 is a flow chart showing a sub routine for a normal-condition pressure-decrease-valve control that constitutes a part of the routine for the normal-condition brake control.

In the brake control in the small-volume leakage condition, there is executed, in the braking-force required state, a control similar to the normal-condition brake control for each of the pressure-increase linear valve 26 and the pressure-decrease linear valve 28. That is, the normal-condition pressure-increase-valve control is executed at S136, and the normal-condition pressure-decrease-valve control is executed at S137. To be more specific, the sub routine for the normal-condition pressure-increase-valve control indicated by the flow chart of FIG. 5 is executed in the normal-condition pressure-increase-valve control while the sub routine for the normal-condition pressure-decrease-valve control indicated by the flow chart of FIG. 6 is executed in the normal-condition pressure-decrease-valve control.

Figure 12:
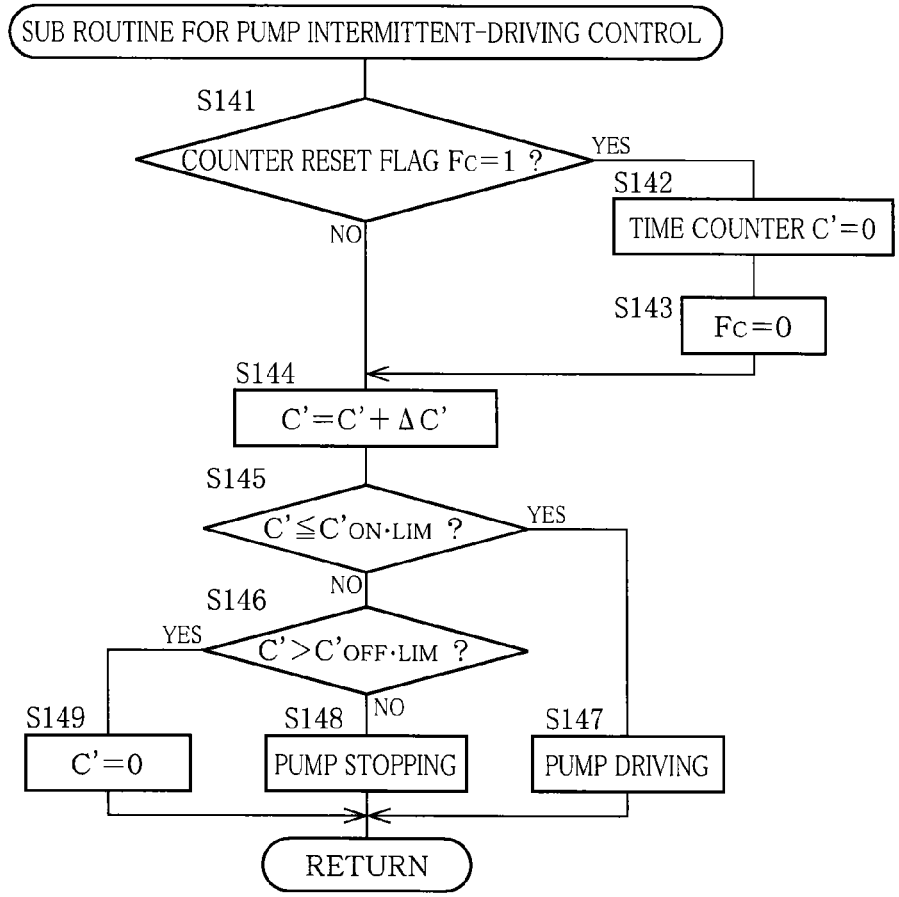
FIG. 12 is a flow chart showing a sub routine for a pump intermittent-driving control that constitutes a part of the routine for the brake control in the small-volume leakage condition.

The pump intermittent-driving control of S132 is a control for reducing the load on the pump 90, i.e., the load on the motor 92 for driving the pump 90, as compared with that in the above-indicated normal-condition high-pressure-source control. The pump intermittent-driving control is executed by execution of a sub routine for the pump intermittent-driving control indicated by a flow chart of FIG. 12. In processing according to the sub routine, the value of the counter reset flag $F_C$ is judged at S141. This flag $F_C$ is set to "1" when the pump forcible-driving control is executed in the second mode and is set to "0" when the pump intermittent-driving control is executed in the second mode. Where the value of the flag $F_C$ is judged to be equal to "1" at S141, it is judged that the pump forcible-driving control has been switched to the pump intermittent-driving control. As processing executed upon switching, a time counter C' for measuring a driving time and driving time intervals in the intermittent driving is reset at S142, and the flag $F_C$ is set to "0" at S143.

Subsequently, at S144, the time counter C' is counted up by a count-up value ΔC' corresponding to the time pitch of execution of the brake control program. It is then judged at S145 whether or not the time measured by the time counter C' is equal to or smaller than a pump-driving limit time C'$_{ON\text{-}LIM}$, and it is judged at S146 whether or not the time measured by the time counter C' is larger than a pump-stopping limit time C'$_{OFF\text{-}LIM}$. Where the time measured by the time counter C' is equal to or smaller than the pump-driving limit time C$_{ON\text{-}LIM}$, a command to drive the pump 90 is issued at S147. On the other hand, where the time measured by the time counter C' is larger than the pump-driving limit time C'$_{ON\text{-}LIM}$ and is equal to or smaller than the pump-stopping limit time C'$_{OFF\text{-}LIM}$, a command to stop the pump 90 is issued at S148. Where the time measured by the time counter C' is larger than the pump-stopping limit time C'$_{OFF\text{-}LIM}$, the time counter C' is reset at S149. According to the processing described above, the pump 90 is intermittently driven so as to be repeatedly driven at the set driving time intervals during the set driving time, in the pump intermittent-driving control.

According to the pump intermittent-driving control described above, the pump 90 is intermittently driven irrespective of whether or not the high-pressure-source pressure $P_{ACC}$ is within the set pressure range in the normal-condition high-pressure-source control. In the pump intermittent drive control, the pump-driving limit time C'$_{ON\text{-}LIM}$ and the pump-stopping limit time C'$_{OFF\text{-}LIM}$ are set such that the load on the pump 90, i.e., the load on the motor 92, is made smaller than that in an instance in which the normal-condition high-pressure-source control is executed when the small-volume leakage is occurring in the pressure-increase linear valve 26. Therefore, the load on the pump 90 or the motor 92 is reduced in the small-volume leakage condition. Further, according to the second mode, the pump 90 is forcibly continued to be driven in the braking-force required state. Therefore, although the load indicated above is larger in the second mode than that in the first mode, the braking force is sufficiently ensured in the second mode.

2. First Brake Control in Large-Volume Leakage Condition

Figure 13:
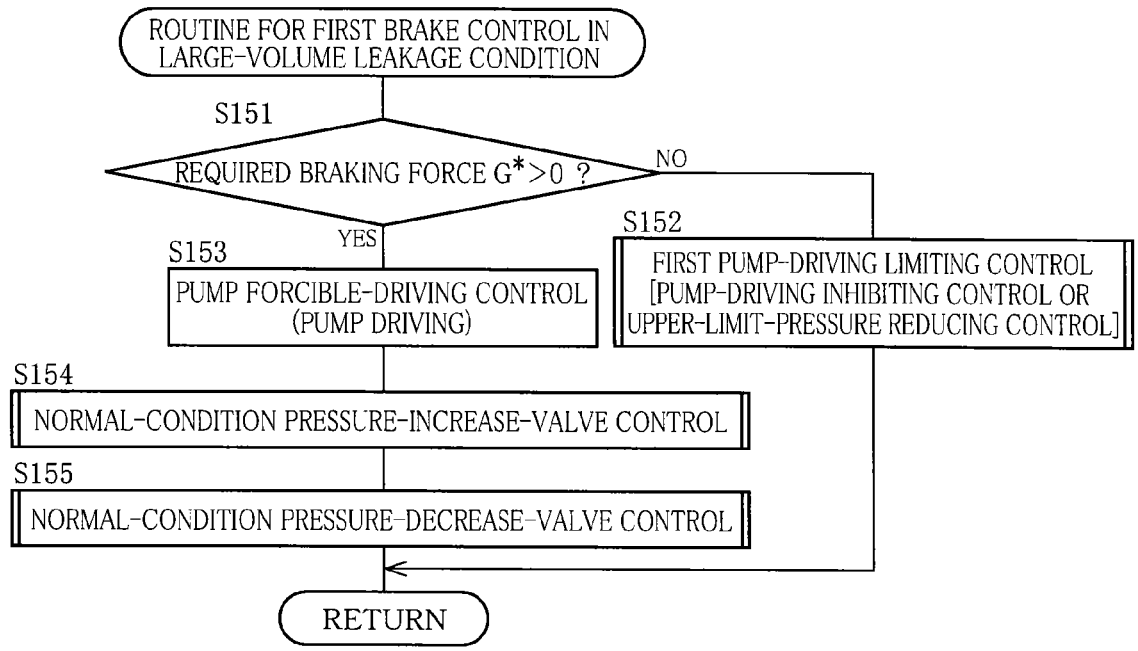
FIG. 13 is a flow chart showing a routine for a first brake control in a large-volume leakage condition that constitutes a part of the brake control program.

The first brake control in the large-volume leakage condition is one sort of the brake control in the large-volume leakage condition that is executed when the fluid leakage in the pressure-increase linear valve 26 is judged to be beyond the set degree. The first brake control in the large-volume leakage condition is executed when the first setting parameter SET1 for control selection is "1". This control is executed by execution of, at S8 of the brake control program of FIG. 2, a routine for the first brake control in the large-volume leakage condition indicated by a flow chart of FIG. 13.

In processing according to the routine for the first brake control in the large-volume leakage condition, it is judged at S151 whether the current state is the braking-force required state or the braking-force non-required state, on the basis of the required braking force G* determined at S1. Where it is judged that the current state is the braking-force non-required state, a first pump-driving limiting control of S152 is executed. On the other hand, where it is judged that the current state is the braking-force required state, a pump forcible-driving control of S153 is executed. This pump forcible-driving control is the same as the pump forcible-driving control in the brake control in the small-volume leakage condition. The pump 90 is kept driven in the braking-force required state by the control.

In the first brake control in the large-volume leakage condition, there is executed a control similar to the normal-condition brake control for each of the pressure-increase linear valve 26 and the pressure-decrease linear valve 28. That is, the normal-condition pressure-increase-valve control is executed at S154, and the normal-condition pressure-decrease-valve control is executed at S155. To be more specific, the sub routine for the normal-condition pressure-increase-valve control indicated by the flow chart of FIG. 5 is executed in the normal-condition pressure-increase-valve control while the sub routine for the normal-condition pressure-decrease-valve control indicated by the flow chart of FIG. 6 is executed in the normal-condition pressure-decrease-valve control.

Figure 14:
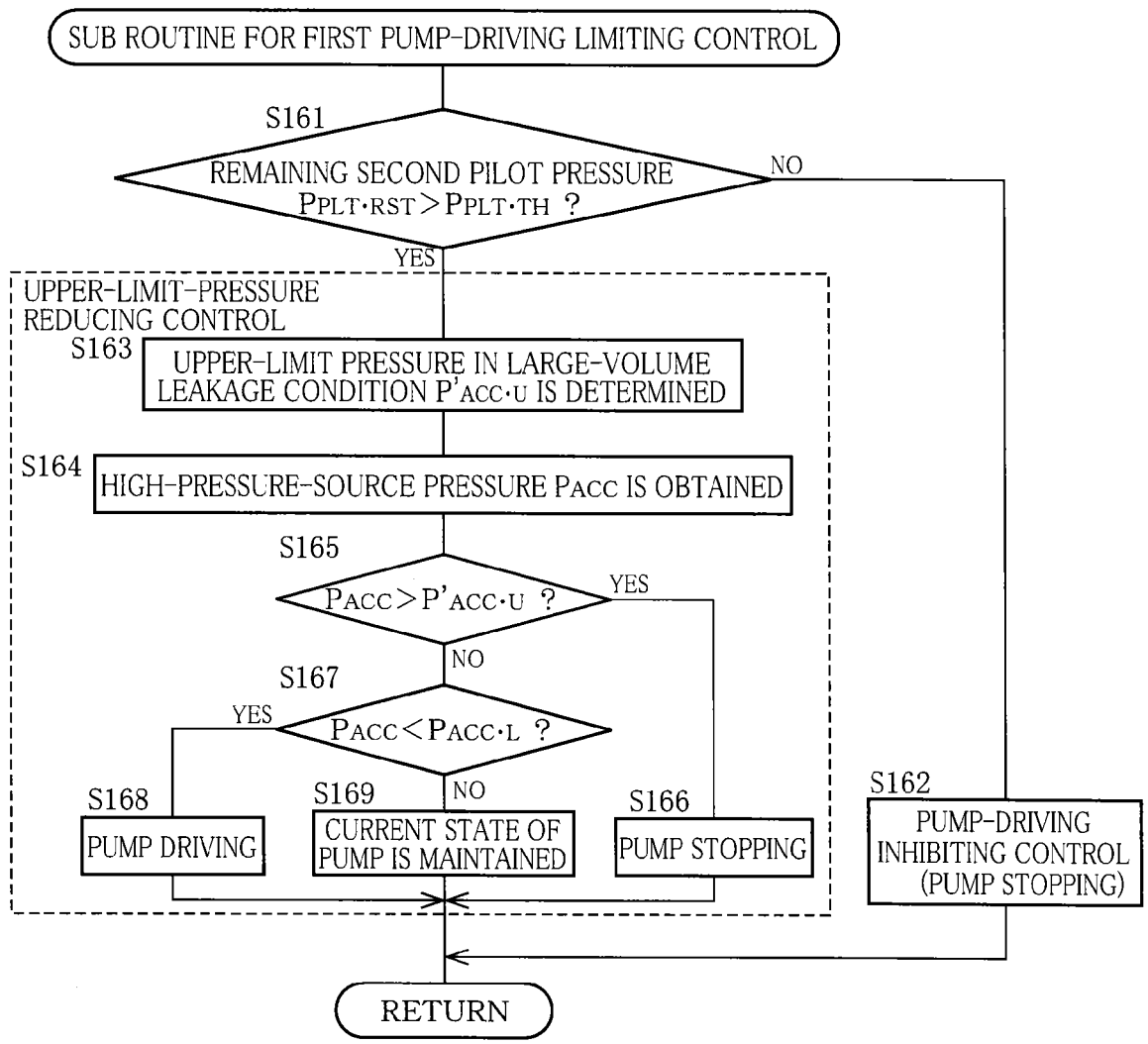
FIG. 14 is a flow chart showing a sub routine for a first pump-driving limiting control that constitutes a part of the routine for the first brake control in the large-volume leakage condition.

The first pump-driving limiting control of S152 is executed by execution of a sub routine for the first pump-driving limiting control indicated by a flow chart of FIG. 14. In the first pump-driving limiting control, one of two prepared controls is selectively executed based on the remaining second pilot pressure $P_{PLT-RST}$ estimated in the fluid leakage detection processing. One of the two controls is a pump-driving inhibiting control and the other is an upper-limit-pressure reducing control. In short, in the first pump-driving inhibiting control, the pump 90 is inhibited from being driven, namely, the pump 90 is not driven, in the braking-force non-required state. In the upper-limit-pressure reducing control, the above-indicated normal-condition high-pressure-source control is executed such that the set upper-limit pressure $P_{ACC-U}$ of the set pressure range within which the high-pressure-source pressure $P_{ACC}$ should be maintained is reduced.

To be more specific, in processing according to the sub routine for the first pump-driving limiting control, it is initially judged at S161 whether or not the remaining second pilot pressure $P_{PLT-RST}$ is higher than a set threshold $P_{PLT-TH}$. Where the remaining second pilot pressure $P_{PLT-RST}$ is higher than the set threshold $P_{PLT-TH}$, the pump-driving inhibiting control is executed at S162. In this control, there is issued a command to stop driving of the pump 90. On the other hand, where it is judged that the remaining second pilot pressure $P_{PLT-RST}$ is not higher than the set threshold $P_{PLT-TH}$, the upper-limit-pressure reducing control of S163 and subsequent steps is executed. That is, the large-volume leakage in the pressure-increase linear valve 26 is classified into two. When the degree of the fluid leakage is comparatively high in the large-volume leakage condition, the pump-driving inhibiting control is executed to reduce the load on the pump 90. When the degree of the fluid leakage is comparatively low in the large-volume leakage condition, the upper-limit-pressure reducing control is executed to obtain a certain level of the high-pressure-source pressure $P_{ACC}$ while reducing the load on the pump 90 to a certain extent in the braking-force non-required state.

In the upper-limit-pressure reducing control, the upper-limit pressure in the large-volume leakage condition $P'_{ACC-U}$ is initially determined at S163 based on the remaining second pilot pressure $P_{PLT-RST}$. More specifically, the upper-limit pressure in the large-volume leakage condition $P'_{ACC-U}$ is determined such that the higher the degree of the fluid leakage, the lower the upper-limit pressure in the large-volume leakage condition $P'_{ACC-U}$ while a relationship between the remaining second pilot pressure and the upper-limit pressure in the large-volume leakage condition stored in the brake ECU 30 is referred to. In this respect, the upper-limit pressure in the large-volume leakage condition $P'_{ACC-U}$ is set to a level at which the brake devices 12 cannot generate the braking force even if the high-pressure-source pressure $P_{ACC}$ reaches the level in question in a state in which the fluid leakage is occurring. Subsequently, at S164, the high-pressure-source pressure $P_{ACC}$ is obtained based on detection by the high-pressure-source pressure sensor 96. It is then judged at S165 whether or not the high-pressure-source pressure $P_{ACC}$ is higher than the determined upper-limit pressure in the large-volume leakage condition $P'_{ACC-U}$. Where it is judged at S165 that the high-pressure-source pressure $P_{ACC}$ is higher than the upper-limit pressure in the large-volume leakage condition $P'_{ACC-U}$, there is issued at S166 a command to stop driving of the pump 90. On the other hand, where it is judged that the high-pressure-source pressure $P_{ACC}$ is not higher than the upper-limit pressure in the large-volume leakage condition $P'_{ACC-U}$, it is judged at S167 whether or not the high-pressure-source pressure $P_{ACC}$ is lower than the set lower-limit pressure $P_{ACC-L}$. Where it is judged that the high-pressure-source pressure $P_{ACC}$ is lower than the set lower-limit pressure $P_{ACC-L}$, there is issued at S168 a command to drive the pump 90. On the other hand, where it is judged that the high-pressure-source pressure $P_{ACC}$ is not lower than the set lower-limit pressure $P_{ACC-L}$, namely, where the high-pressure-source pressure $P_{ACC}$ is equal to or higher than the set lower-limit pressure $P_{ACC-L}$ and is equal to or lower than the upper-limit pressure in the large-volume leakage condition $P'_{ACC-U}$, there is issued at S169 a command to maintain the current state of the pump 90. More specifically, a command to maintain driving of the pump 90 is issued when the pump 90 is being driven while a command to maintain stopping of driving of the pump 90 is issued when the pump 90 is at rest.

In the first brake control in the large-volume leakage condition, one of the above-indicated two controls is selectively executed in accordance with the level of the fluid leakage as described above, in relation to control of the high-pressure-source device 22, thereby effectively reducing the load on the pump 90, namely, the load on the motor 92, when the pressure-increase linear valve 26 is suffering from the large-volume leakage. In this respect, where the pump forcible-driving control is executed in the braking-force required state, it is possible to suitably cope with a situation in which the braking force should be rapidly increased, namely, in a situation in which the increase gradient of the braking force or the pressure increase gradient of the target servo pressure $P^*_{SRV}$ is large.

3. Second Brake Control in Large-Volume Leakage Condition

Figure 15:
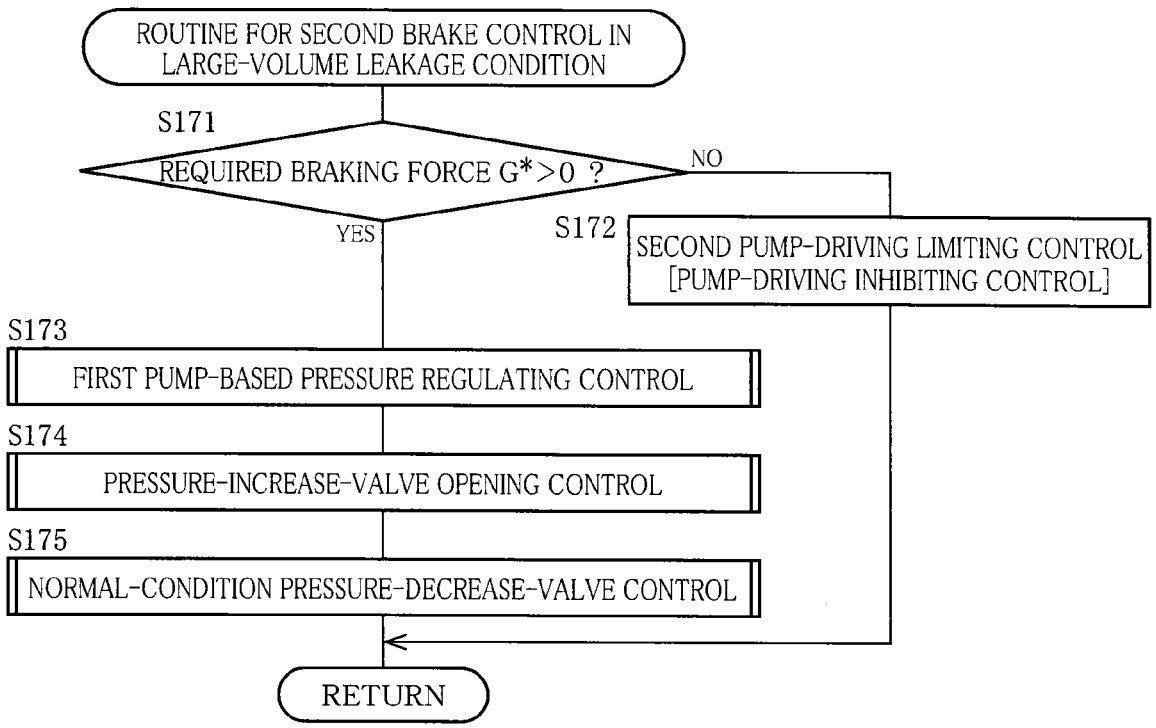
FIG. 15 is a flow chart showing a routine for a second brake control in the large-volume leakage condition that constitutes a part of the brake control program.

The second brake control in the large-volume leakage condition is another sort of the brake control in the large-volume leakage condition. The second brake control in the large-volume leakage condition is executed when the first setting parameter SET1 for control selection is "2". This control is executed by execution, at S10 of the brake control program of FIG. 2, of a routine for the second brake control in the large-volume leakage condition indicated by a flow chart of FIG. 15.

In processing according to the routine for the second brake control in the large-volume leakage condition, it is judged at S171 whether the current state is the braking-force required state or the braking-force non-required state, based on the required braking force G* determined at S1. Where it is judged that the current state is the braking-force non-required state, a second pump-driving limiting control of S172 is executed. In the second pump-driving limiting control, only the above-indicated pump-driving inhibiting control, namely, only the control for inhibiting the pump 90 from being driven, is executed, in contrast to the first pump-driving limiting control executed in the first brake control in the large-volume leakage condition. On the other hand, where it is judged that the current state is the braking-force required state, there is executed at S173 a first pump-based pressure regulating control different from the control executed in the first brake control in the large-volume leakage condition. The first pump-based pressure regulating control will be later explained in detail. In short, in the first pump-based pressure regulating control, the servo pressure $P_{SRV}$ is regulated to the target servo pressure $P^*_{SRV}$ by changing the degree of driving of the pump 90 while driving the pump 90, when the servo pressure $P_{SRV}$ is increased. In this respect, this control is suitable in a case in which the output of the pump 90 is changeable, namely, a case in which the high-pressure-source device 22 is configured such that the output of the motor 92 is changeable in accordance with electricity supplied thereto. More specifically, this control is suitable for the high-pressure-source device 22 in which the motor 92 is a DC brushless motor and is configured to be driven according to the PWM (pulse width modulation) scheme by an inverter as a drive circuit.

In the second brake control in the large-volume leakage condition, a pressure-increase-valve opening control of S174 is executed as a control for the pressure-increase linear valve 26. As explained above, in the process of increase of the braking force, namely, when the servo pressure $P_{SRV}$ is increasing, the servo pressure $P_{SRV}$ is regulated by driving of the pump 90. Accordingly, in the pressure-increase-valve opening control, the pressure-increase linear valve 26 is placed in the open state for easy regulation of the servo pressure $P_{SRV}$. On the other hand, there is executed, for the pressure-decrease linear valve 28, a control similar to the normal-condition brake control. In other words, the normal-condition pressure-decrease-valve control explained above is executed at S175 by execution of the sub routine for the normal-condition pressure-decrease-valve control indicated by the flow chart of FIG. 6.

Figure 16:
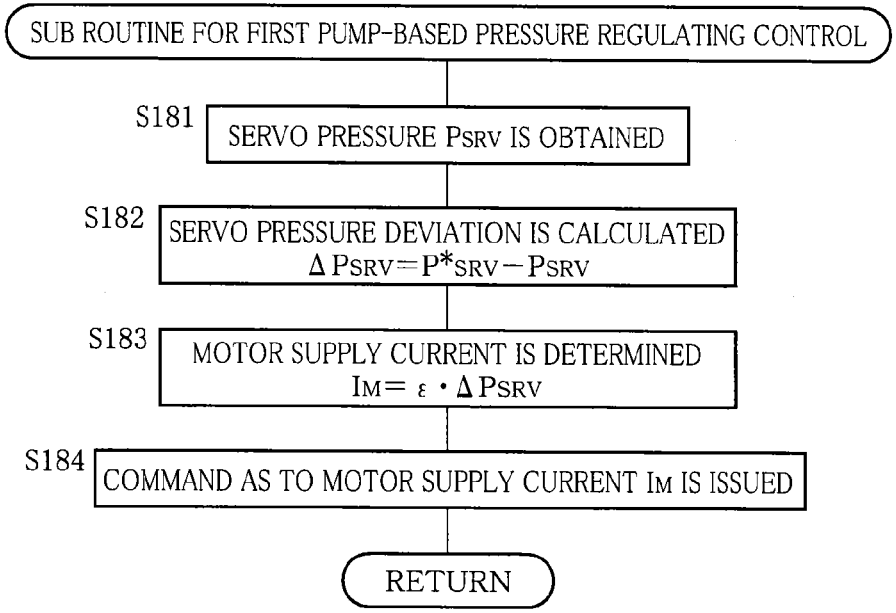
FIG. 16 is a flow chart showing a sub routine for a first pump-based pressure regulating control that constitutes a part of the routine for the second brake control in the large-volume leakage condition.

The first pump-based pressure regulating control of S173 is executed by execution of a sub routine for the first pump-based pressure regulating control indicated by a flow chart of FIG. 16. In processing according to the sub routine, the servo pressure $P_{SRV}$ is initially obtained at S181 based on the value detected by the servo pressure sensor 134. There is subsequently obtained at S182 a deviation of the servo pressure $P_{SRV}$ from the target servo pressure $P^*_{SRV}$ determined at S2, i.e., servo pressure deviation $\Delta P_{SRV}$. Thereafter, a motor supply current $I_M$ that is an electric current to be supplied to the motor 92 is determined at S183 by multiplying the servo pressure deviation $\Delta P_{SRV}$ by a motor supply current determination gain $\epsilon$, and a command as to the determined motor supply current $I_M$ is issued to the drive circuit at S184. In this control, when the servo pressure deviation $\Delta P_{SRV}$ is negative, namely, when the servo pressure $P_{SRV}$ is decreasing, no electricity is supplied to the motor 92, and the pump 90 is stopped. In the first pump-based pressure regulating control, a feedback control based on the servo pressure $P_{SRV}$ is executed with respect to the pump 90. In other words, in the first pump-based pressure regulating control, the pump 90 is driven before the braking force G reaches the required braking force G*, and the pump 90 is stopped being driven when the braking force G reaches the required braking force G*. In the first pump-based pressure regulating control, the output of the pump 90, namely, the degree of driving of the pump 90, is changed in accordance with the servo pressure deviation $\Delta P_{SRV}$, namely, in accordance with the degree of change in the required braking force G*.

Figure 17:
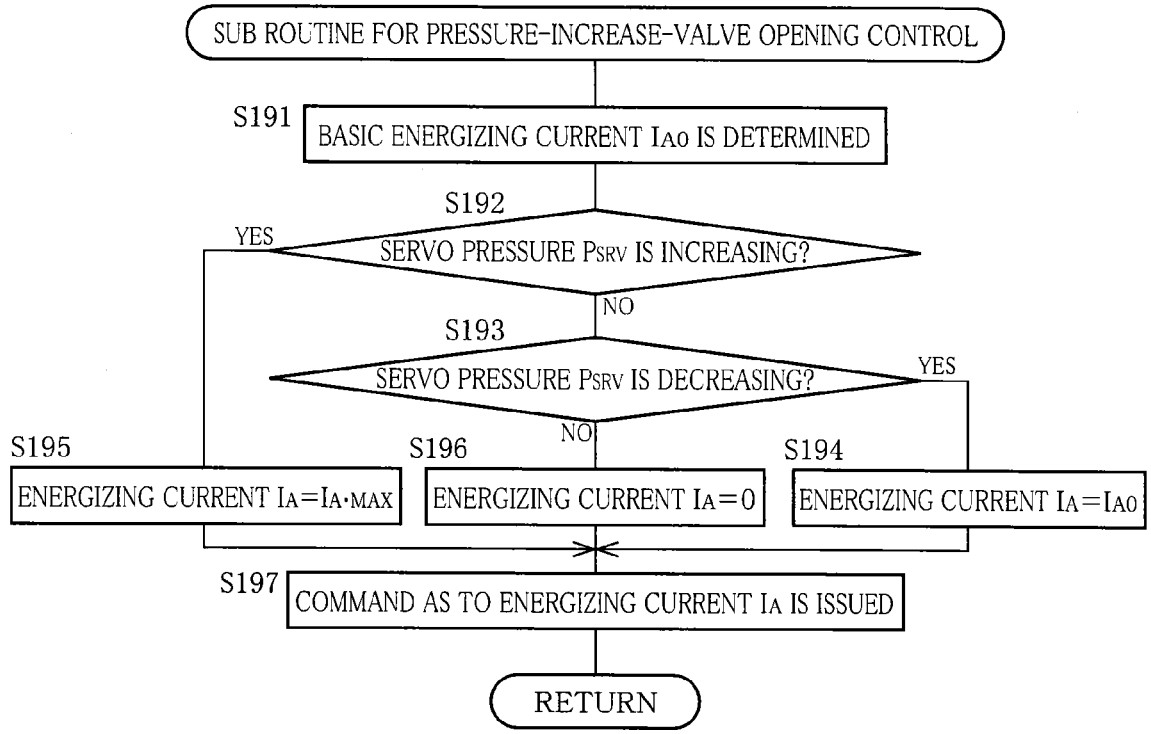
FIG. 17 is a flow chart showing a sub routine for a pressure-increase-valve opening control that constitutes a part of the routine for the second brake control in the large-volume leakage condition.

The pressure-increase-valve opening control of S174 is executed by execution of a sub routine for the pressure-increase-valve opening control indicated by a flow chart of FIG. 17. Processing according to the sub routine differs from the processing according to the sub routine for the normal-condition pressure-increase-valve control indicated by the flow chart of FIG. 5 only in processing executed in the process of increase of the braking force, namely, processing executed when the servo pressure $P_{SRV}$ is increasing. The sub routine will be briefly explained focusing on different points. In the pressure-increase-valve opening control, where it is judged that the servo pressure $P_{SRV}$ is increasing, the energizing current $I_A$ to be supplied to the pressure-increase linear valve 26 is determined at S195 so as to be equal to a maximum energizing current $I_{A\cdot MAX}$, and a command as to the determined energizing current $I_A$ is issued thereafter. As a result, the pressure-increase linear valve 26 is kept opened when the servo pressure $P_{SRV}$ is increasing.

In the second brake control in the large-volume leakage condition, driving of the motor 92 is limited in the braking-force non-required state in relation to control of the high-pressure-source device 22, as in the first brake control in the large-volume leakage condition. Accordingly, the load on the pump 90 is effectively reduced when the pressure-increase linear valve 26 is suffering from the large-volume leakage. In addition, in the second brake control in the large-volume leakage condition, the servo pressure $P_{SRV}$ is regulated by driving of the pump 90 when the servo pressure $P_{SRV}$ is increasing, without relying on the pressure-increase linear valve 26 that is suffering from the fluid leakage. It is therefore possible to accurately regulate the braking force.

4. Third Brake Control in Large-Volume Leakage Condition

Figure 18:
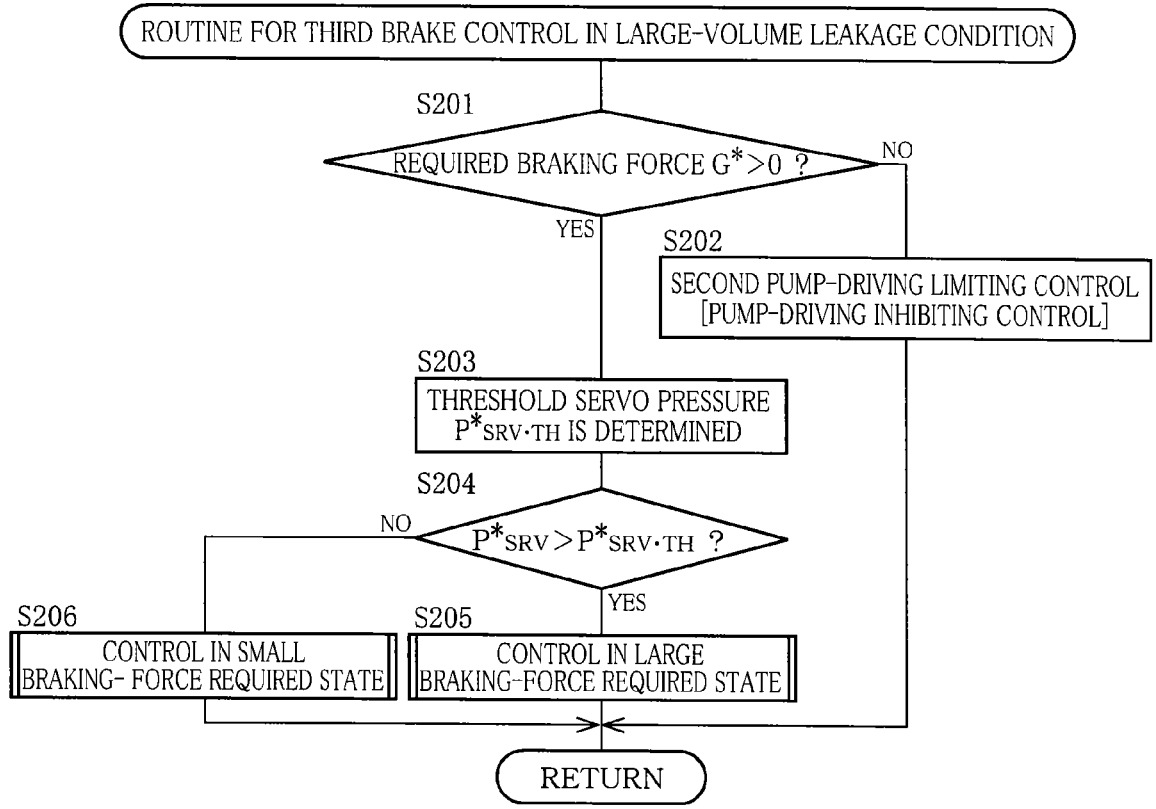
FIG. 18 is a flow chart showing a routine for a third brake control in the large-volume leakage condition that constitutes a part of the brake control program.

A third brake control in the large-volume leakage condition is still another sort of the brake control in the large-volume leakage condition. The third brake control in the large-volume leakage condition is executed when the first setting parameter SET1 for control selection is "3". This control is executed by execution, at S11 of the brake control program of FIG. 2, of a routine for the third brake control in the large-volume leakage condition indicated by a flow chart of FIG. 18.

In processing according to the routine for the third brake control in the large-volume leakage condition, it is initially judged at S201 whether the current state is the braking-force required state or the braking-force non-required state, based on the required braking force G* determined at S1. Where it is judged that the current state is the braking-force non-required state, the second pump-driving limiting control of S202 is executed. As explained in the second brake control in the large-volume leakage condition, only the pump-driving inhibiting control described above is executed in the second pump-driving limiting control. On the other hand, where it is judged that the current state is the braking-force required state, a threshold servo pressure $P^*_{SRV\cdot TH}$ is determined at S203 based on the remaining second pilot pressure $P_{PLT\cdot RST}$ estimated as described above. The threshold servo pressure $P^*_{SRV\cdot TH}$ is the servo pressure $P_{SRV}$ when the second pilot pressure $P_{PLT}$ becomes equal to the remaining second pilot pressure $P_{PLT\cdot RST}$ and is indicative of a braking force G at that time, i.e., a remaining braking force $G_{RST}$ that is a braking force in accordance with a remaining adjusted pressure $P_{AJT\cdot RST}$. The third brake control in the large-volume leakage condition is arranged to switch brake control in the braking-force required state between the following two controls, depending upon whether or not the target servo pressure $P^*_{SRV}$ determined at S2 is higher than the threshold servo pressure $P^*_{SRV\cdot TH}$. More specifically, it is judged at S204 whether or not the target servo pressure $P^*_{SRV}$ is higher than the threshold servo pressure $P^*_{SRV\text{-}T}$. Where it is judged that the target servo pressure $P^*_{SRV}$ is higher than the threshold servo pressure $P^*_{SRV\text{-}TH}$, namely, where it is judged that the braking force is larger than the remaining braking force $G_{RST}$, a control in the large-braking-force required state of S205 is executed. On the other hand, where it is judged that the target servo pressure $P^*_{SRV}$ is not higher than the threshold servo pressure $P^*_{SRV\text{-}TH}$, namely, where it is judged that the braking force is not larger than the remaining braking force $G_{RST}$, a control in the small-braking-force required state of S206 is executed.

Figure 19:
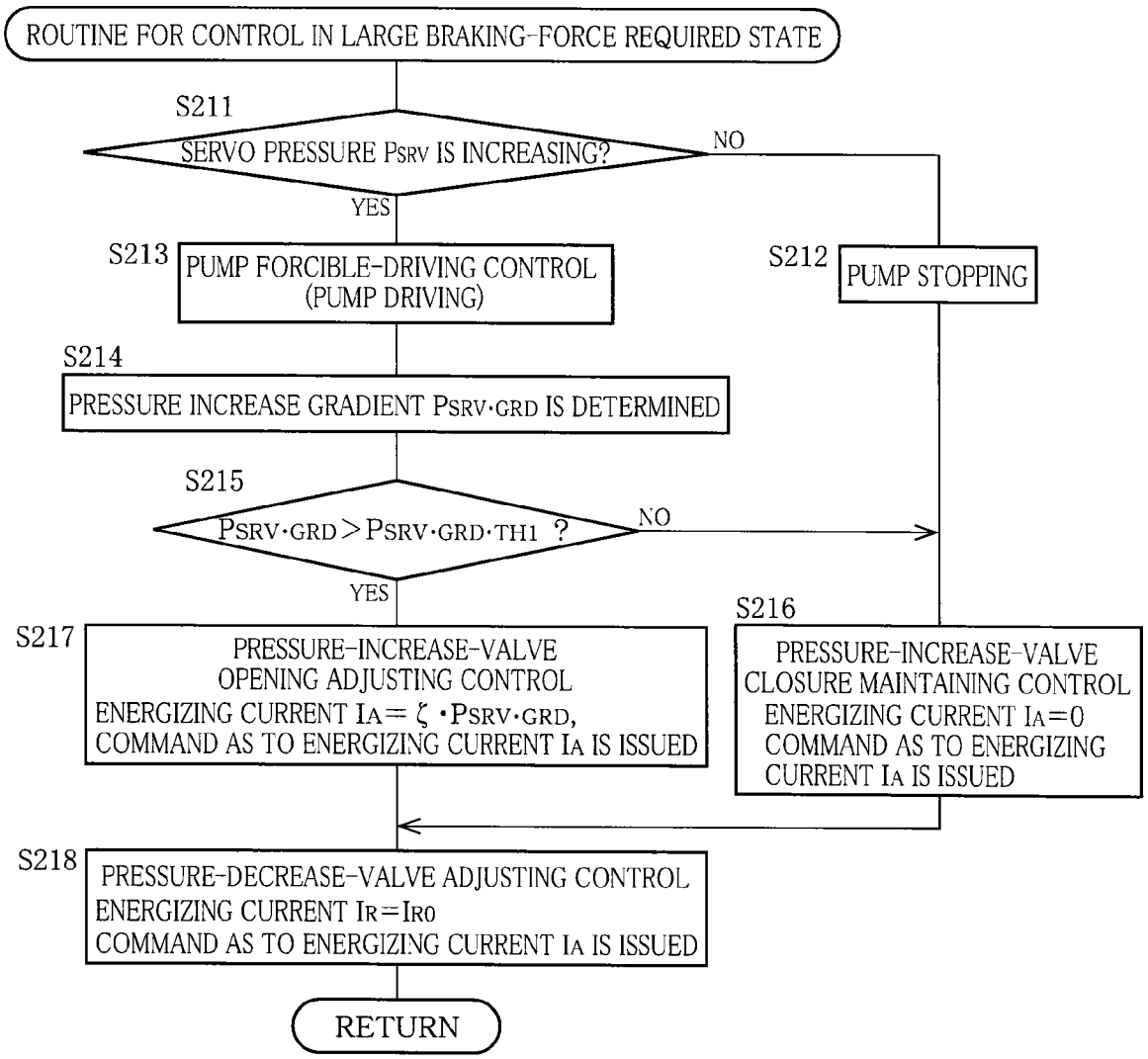
FIG. 19 is a flow chart showing a routine for a control in a large-braking-force required state that constitutes a part of the routine for the third brake control in the large-volume leakage condition.

The control in the large-braking-force required state of S205 is executed by execution of a routine for the control in the large-braking-force required state indicated by a flow chart of FIG. 19. In processing according to this routine, it is initially judged at S211 whether or not the servo pressure $P_{SRV}$ is increasing, namely, whether or not the braking force is in the process of increase, based on a change in the target servo pressure $P^*_{SRV}$ determined at S2. This judgment is carried out according to a technique similar to that in the normal-condition pressure-increase-valve control and the normal-condition pressure-decrease-valve control. Where it is judged that the servo pressure $P_{SRV}$ is not increasing, namely, where it is judged that the servo pressure $P_{SRV}$ is decreasing or is maintained without changing, a command to stop driving of the pump 90 is issued at S212. On the other hand, where it is judged that the servo pressure $P_{SRV}$ is increasing, there is issued at S213 a command to execute the pump forcible-driving control, i.e., a command to drive the pump 90.

When the servo pressure $P_{SRV}$ is increasing, a pressure increase gradient $P_{SRV\text{-}GRD}$ of the servo pressure $P_{SRV}$ is determined at S214, based on a change in the target servo pressure $P^*_{SRV}$. More specifically, the pressure increase gradient $P_{SRV\text{-}GRD}$ is determined as a difference obtained by subtracting the target servo pressure $P^*_{SRV}$ determined in previous execution of the brake control program from the target servo pressure $P^*_{SRV}$ determined current execution of the brake control program, for instance. It is then judged at S215 whether or not the determined pressure increase gradient $P_{SRV\text{-}GRD}$ is larger than a first threshold gradient $P_{SRV\text{-}GRD\text{-}TH1}$. This judgment is made for judging whether or not a rapid increase of the braking force is required, namely, whether or not a rapid increase of the servo pressure $P_{SRV}$ is required. In the control in the large-braking-force required state, there are prepared, in relation to the control of the pressure-increase linear valve 26, two different controls in accordance with the degree of an increase in the braking force. Where it is judged that the pressure increase gradient $P_{SRV\text{-}GRD}$ is not larger than the first threshold gradient $P_{SRV\text{-}GRD\text{-}TH1}$ and where the pump 90 is stopped being driven at S212 based on the judgment made at S211, one of the two controls, i.e., a pressure-increase-valve closure maintaining control is executed at S216. On the other hand, where it is judged that the pressure increase gradient $P_{SRV\text{-}GRD}$ is larger than the first threshold gradient $P_{SRV\text{-}GRD\text{-}TH1}$, the other of the two controls, i.e., a pressure-increase-valve opening adjusting control is executed at S217.

When the pressure-increase linear valve 26 is suffering from the large-volume leakage, a sufficient level of the second pilot pressure $P_{PLT}$, i.e., a sufficient level of the servo pressure $P_{SRV}$, can be obtained by placing the pressure-decrease linear valve 28 in the closed state even if the pressure-increase linear valve 26 is placed in the closed state. It is accordingly possible to sufficiently meet a demand for a normal degree of the braking force. In view of this, the pressure-increase-valve closure maintaining control of S216 is executed for minimizing electricity consumption by the pressure-increase linear valve 26. More specifically, the energizing current $I_A$ is made equal to 0, and a command as to the energizing current $I_A$ is issued. As a result, the pressure-increase linear valve 26 is kept closed. In the meantime, the increase in the servo pressure $P_{SRV}$ utilizing merely the fluid leakage is insufficient for rapidly increasing the braking force. Therefore, the pressure-increase-valve opening adjusting control of S217 effectuates a valve opening degree in accordance with the pressure increase gradient $P_{SRV\text{-}GRD}$. More specifically, the energizing current $I_A$ is determined so as to be equal to a value obtained by multiplying the pressure increase gradient $P_{SRV\text{-}GRD}$ by an energizing current determination gain $\zeta$, and a command as to the energizing current $I_A$ is issued. In other words, in the pressure-increase-valve opening adjusting control, the valve opening degree of the pressure-increase linear valve 26 is adjusted in accordance with a change degree of the required braking force $G^*$. More specifically, the more rapidly the required braking force $G^*$ is increased, the higher the opening degree of the pressure-increase linear valve 26. In other words, the pressure-increase linear valve 26 more easily opens and the amount of the working fluid passing through the pressure-increase linear valve 26 is made larger.

In the control in the large-braking-force required state, a pressure-decrease-valve adjusting control of S218 is executed in relation to the control of the pressure-decrease linear valve 28. In the control in the small-braking-force required state, the adjustment of the servo pressure $P_{SRV}$ to the target servo pressure $P^*_{SRV}$ is executed by controlling the pressure-decrease linear valve 28 even when the servo pressure $P_{SRV}$ is increasing. Accordingly, in contrast to the normal-condition pressure-decrease-valve control indicated by the flow chart of FIG. 6, in the pressure-decrease-valve adjusting control, the energizing current $I_R$ is determined so as to be equal to the above-indicated basic energizing current $I_{R0}$, and a command as to the energizing current $I_R$ is issued not only when the servo pressure $P_{SRV}$ is decreasing or is maintained without changing, but also even when the servo pressure $P_{SRV}$ is increasing.

In the control in the large-braking-force required state, the servo pressure $P_{SRV}$ is adjusted by the pressure-decrease linear valve 28 when the servo pressure $P_{SRV}$ is increasing while minimizing reliance on the pressure-increase linear valve 26 that is suffering from the fluid leakage. Accordingly, the control in the large-braking-force required state enables relatively accurate adjustment of the servo pressure $P_{SRV}$ and accordingly enables generation of the braking force whose magnitude is relatively accurate. The adjustment of the opening degree of the pressure-increase linear valve 26 conducted when the braking force is rapidly increased also contributes to generation of the braking force whose magnitude is relatively accurate. Further, the energizing current $I_A$ to be supplied to the pressure-increase linear valve 26 is minimized. Accordingly, the electricity consumption by the present system is relatively small when the pressure-increase linear valve 26 is suffering from the fluid leakage that is beyond the set degree.

Figure 20:
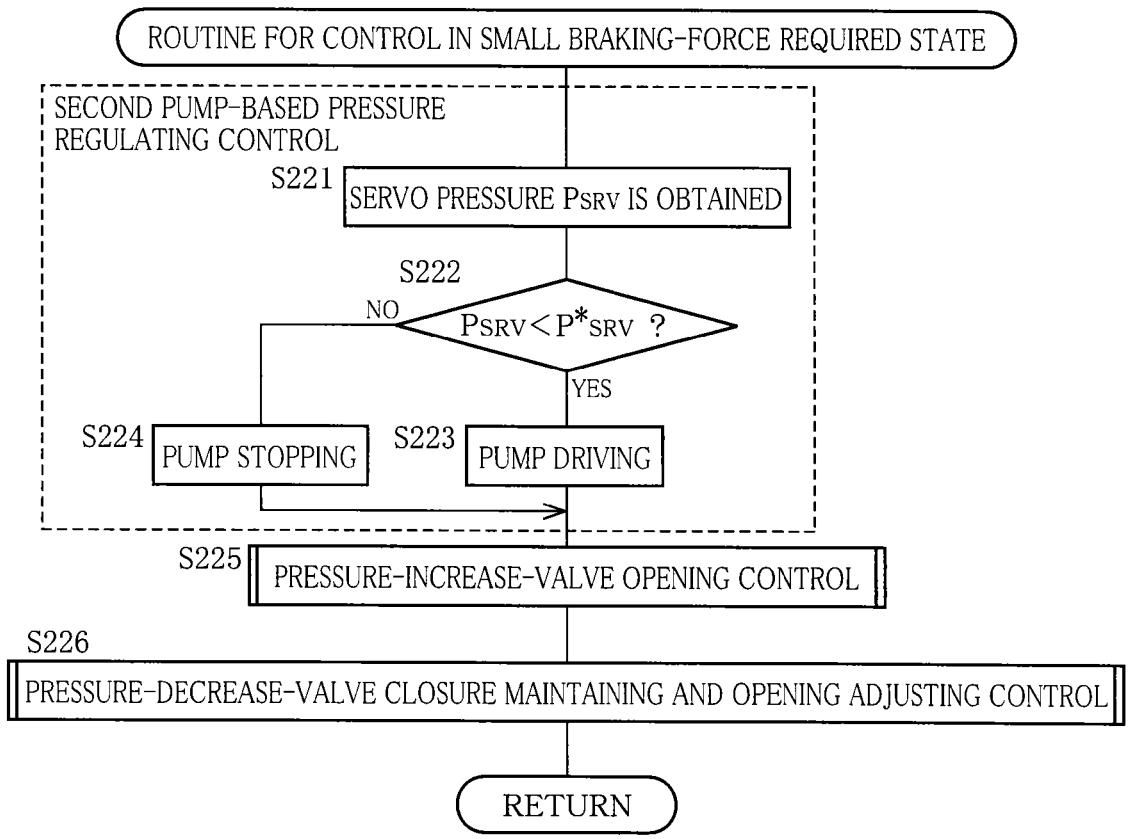
FIG. 20 is a flow chart showing a routine for a control in a small-braking-force required state that constitutes a part of the routine for the third brake control in the large-volume leakage condition.

The control in the small-braking-force required state of S206 is executed by execution of a routine for the control in the small-braking-force required state indicated by a flow chart of FIG. 20. In processing according to this routine, a second pump-based pressure regulating control of S221-S224 is executed as a control for the high-pressure-source device 22. Unlike the first pump-based pressure regulating control of the second brake control in the large-volume leakage condition, namely, unlike the control in which the motor 92 is driven while changing electricity supplied thereto, the second pump-based pressure regulating control is arranged such that electricity supplied to the motor 92 is constant though driving of the motor 92 and stopping of driving of the motor 92 are performed. In the second pump-based pressure regulating control, the servo pressure $P_{SRV}$ is initially obtained at S221 based on the values detected by the servo pressure sensor 134. It is subsequently judged at S222 whether or not the servo pressure $P_{SRV}$ is lower than the target servo pressure $P^*_{SRV}$ determined at S2. Where it is judged that the servo pressure $P_{SRV}$ is lower than the target servo pressure $P^*_{SRV}$, a command to drive the pump 90 is issued at S223. On the other hand, where it is judged that the servo pressure $P_{SRV}$ is not lower than the target servo pressure $P^*_{SRV}$, it is judged that the servo pressure $P_{SRV}$ has reached the target servo pressure $P^*_{SRV}$, and a command to stop driving of the pump 90 is issued at S224.

In the control in the small-braking-force required state, the pressure-increase-valve opening control is executed at S225 as a control for the pressure-increase linear valve 26. As in the second brake control in the large-volume leakage condition, the pressure-increase-valve opening control is executed by execution of the sub routine for the pressure-increase-valve opening control indicated by the flow chart of FIG. 17. According to this control, the pressure-increase linear valve 26 is placed in the open state for easy adjustment of the servo pressure $P_{SRV}$ by the pump 90 when the servo pressure $P_{SRV}$ is increasing by the second pump-based pressure regulating control described above.

Figure 21:
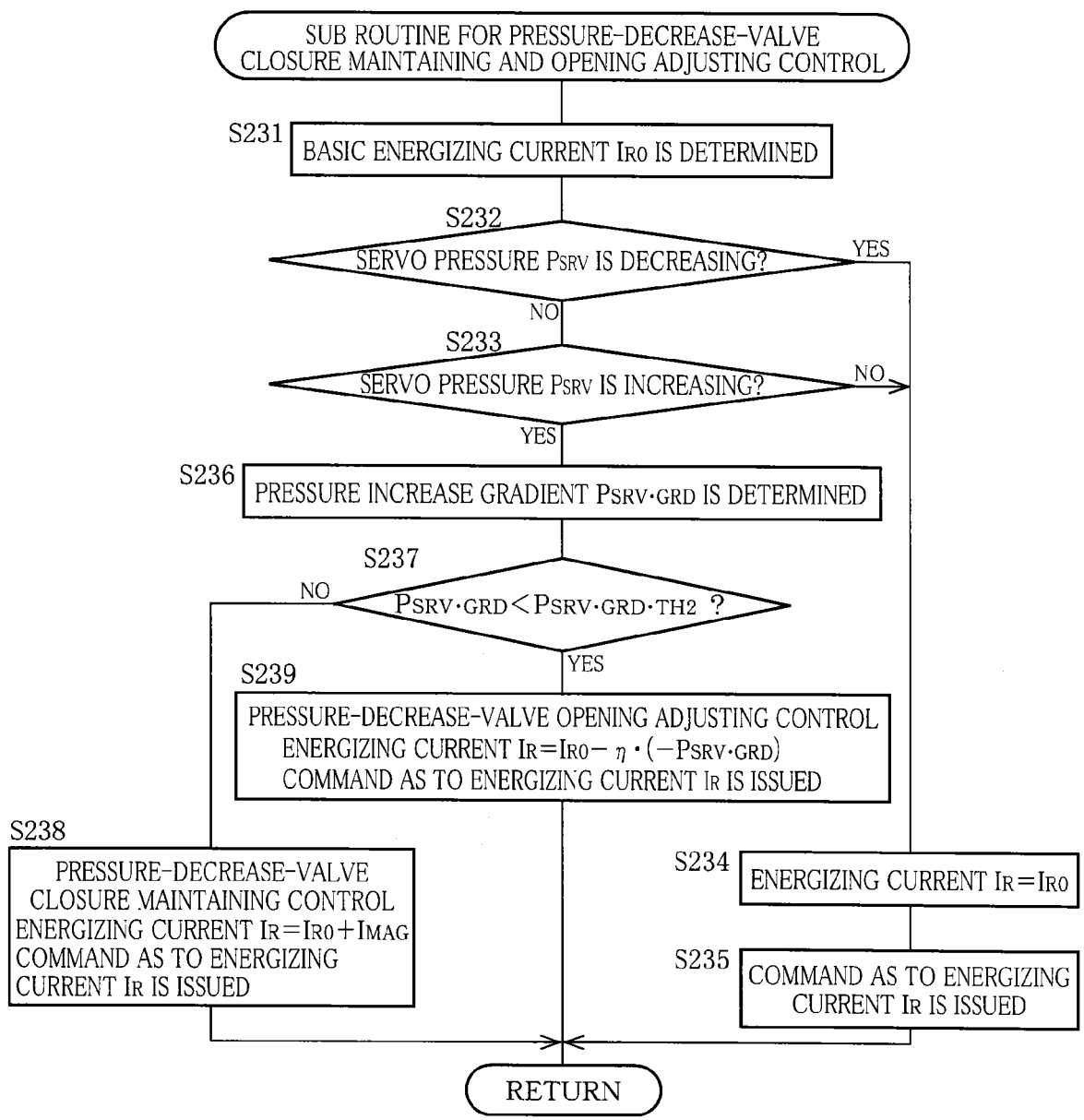
FIG. 21 is a flow chart showing a sub routine for a pressure-decrease-valve closure maintaining and opening adjusting control that constitutes a part of the routine for the control in the small-braking-force required state.

In the control in the small-braking-force required state, a pressure-decrease-valve closure maintaining and opening adjusting control is executed at S226 as a control for the pressure-decrease linear valve 28. In this control, one of a pressure-decrease-valve closure maintaining control and a pressure-decrease-valve opening adjusting control that are explained below is selectively executed when the servo pressure $P_{SRV}$ is increasing. The pressure-decrease-valve closure maintaining and opening adjusting control is executed by execution of a sub routine for the pressure-decrease-valve closure maintaining and opening adjusting control indicated by a flow chart of FIG. 21.

In processing according to the sub routine for the pressure-decrease-valve closure maintaining and opening adjusting control, the basic energizing current $I_{R0}$ is initially determined at S231, it is subsequently judged at S232 whether or not the braking force is in the process of decrease, namely, whether or not the servo pressure $P_{SRV}$ is decreasing, and it is then judged S233 whether or not the braking force is in the process of increase, namely, whether or not the servo pressure $P_{SRV}$ is increasing, as in the normal-condition pressure-decrease-valve control indicated by the flow chart of FIG. 6. Where it is judged that the servo pressure $P_{SRV}$ is decreasing or is maintained without changing according to the judgment described above, the energizing current $I_R$ is made equal to the basic energizing current $I_{R0}$ at S234 and a command as to the energizing current $I_R$ is issued at 235.

Where it is judged at S233 that the servo pressure $P_{SRV}$ is increasing, the pressure increase gradient $P_{SRV-GRD}$ of the servo pressure $P_{SRV}$ is determined at S236 based on a change in the target servo pressure $P^*_{SRV}$, as in the control in the large-braking-force required state. It is subsequently judged at S237 whether or not the determined pressure increase gradient $P_{SRV-GRD}$ is lower than a second threshold gradient $P_{SRV-GRD-TH2}$. This judgment is for judging whether or not a slow increase of the braking force is required, namely, whether or not a slow increase of the servo pressure $P_{SRV}$ is required. In the control in the small-braking-force required state, there are prepared, in relation to the control of the pressure-decrease linear valve 28, two different controls in accordance with the degree of an increase in the braking force. Where it is judged that the pressure increase gradient $P_{SRV-GRD}$ is not lower than the second threshold gradient $P_{SRV-GRD-TH2}$, one of the two controls, i.e., the pressure-decrease-valve closure maintaining control, is executed at S238. On the other hand, where it is judged that the pressure increase gradient $_{SRV-GRD}$ is lower than the second threshold gradient $P_{SRV-GRD-TH2}$, the other of the two controls, i.e., the pressure-decrease-valve opening adjusting control is executed at S239.

In the control in the small-braking-force required state, the servo pressure $P_{SRV}$ is regulated by the above-indicated second pump-based pressure regulating control, namely, by driving of the pump 90 and stopping of driving of the pump 90. It is accordingly possible to appropriately deal with a normal increase in the braking force. In view of this, the pressure-decrease-valve closure maintaining control is executed for maintaining the closed state of the pressure-decrease linear valve 28 as in the normal-condition pressure-decrease-valve control when the pressure increase gradient $P_{SRV-GRD}$ of the servo pressure $P_{SRV}$ is not small. However, there may be a possibility that a slow increase of the servo pressure $P_{SRV}$ is not necessarily appropriately dealt with because the electricity supplied to the pump 90 is constant. In view of this, in the control in the small-braking-force required state, when the pressure increase gradient $P_{SRV-GRD}$ of the servo pressure $P_{SRV}$ is relatively small, the pressure-decrease-valve opening adjusting control is executed to slowly increase the servo pressure $P_{SRV}$, by adjusting the second pilot pressure $P_{PLT}$ while permitting the working fluid to flow from the pressure-decrease linear valve 28 to the reservoir 20.

More specifically, as in the normal-condition pressure-decrease-valve control, in the pressure-decrease-valve closure maintaining control of S238, the energizing current $I_R$ is determined so as to be equal to a sum of the basic energizing current $I_{R0}$ and the margin current $I_{MAG}$, and a command as to the energizing current $I_R$ is issued. In the pressure-decrease-valve opening adjusting control of S239, for attaining the valve opening degree in accordance with the pressure increase gradient $P_{SRV-GRD}$, the energizing current $I_R$ is determined to be equal to a value obtained by subtracting, from the basic energizing current $I_{R0}$, a multiplication product of the pressure increase gradient $P_{SRV-GRD}$, −1, and the energizing current determination gain η, and a command as to the determined energizing current $I_R$ is issued In other words, in the pressure-decrease-valve opening adjusting control, the degree of valve opening of the pressure-decrease linear valve 28 is adjusted in accordance with the change degree of the required braking force G*. More specifically, the slower the increase of the required braking force G*, the higher the opening degree of the pressure-decrease linear valve 28. In other words, the pressure-decrease linear valve 28 more easily opens and the amount of the working fluid passing through the pressure-decrease linear valve 28 is made larger.

In the control in the small-braking-force required state, the servo pressure $P_{SRV}$ is adjusted by driving the pump 90 of the high-pressure-source device 22 when the servo pressure $P_{SRV}$ is increasing while minimizing reliance on the pressure-increase linear valve 26 that is suffering from the fluid leakage. Accordingly, the control in the small-braking-force required state enables relatively accurate adjustment of the servo pressure $P_{SRV}$ and accordingly enables generation of the braking force whose magnitude is relatively accurate. The adjustment of the opening degree of the pressure-decrease linear valve 28 conducted when the braking force is slowly increased also contributes to generation of the braking force whose magnitude is accurate.

In this way, the third brake control in the large-volume leakage condition is executed. As in the first and second brake controls in the large-volume leakage condition, in the third brake control in the large-volume leakage condition, driving of the motor 92 is limited in the braking-force non-required state in relation to control of the high-pressure-source device 22, whereby the load on the pump 90 can be effectively reduced when the pressure-increase linear valve 26 is suffering from the large-volume leakage. Also in the third brake control in the large-volume leakage condition, the braking force G is adjusted by driving of the pump 90 and stopping of driving of the pump 90. However, the electricity supplied to the motor 92 when the pump 90 is driven is not changed in the third brake control in the large-volume leakage condition, in contrast to the second brake control in the large-volume leakage condition. Therefore, the third brake control in the large-volume leakage condition is employable in a system in which the supply current to the motor is constant.

[E] Functional Structure of Brake Electronic Control Unit

Figure 22:
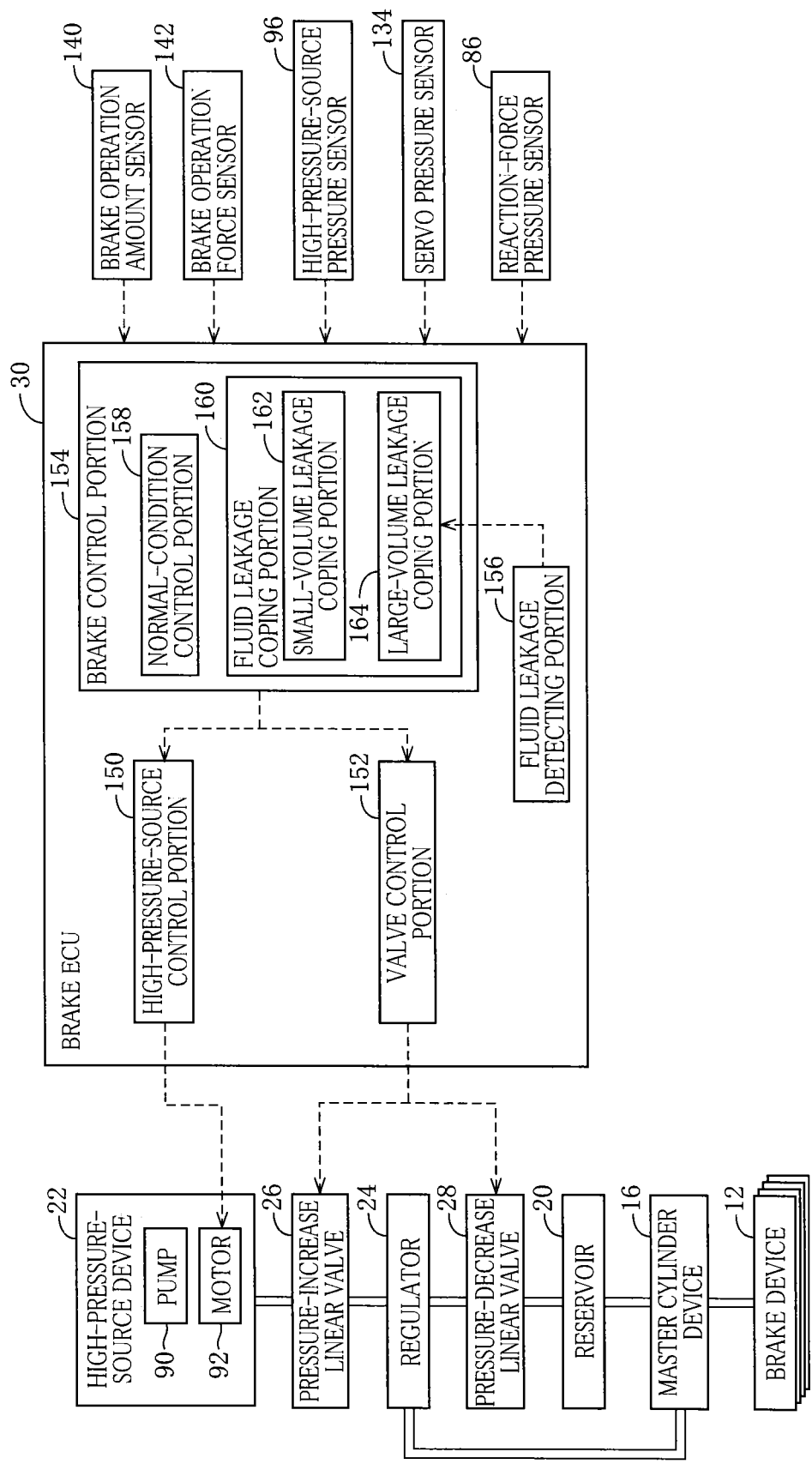
FIG. 22 is a block diagram showing functions of the brake electronic control unit (ECU).

The brake ECU 30 that is a controller of the present hydraulic brake system is considered as having various functional portions that function by execution of the brake control program and the first and second fluid leakage detection processing programs explained above. More specifically, as shown in the block diagram of FIG. 22, the brake ECU 30 has a high-pressure-source control portion 150, a valve control portion 152, a brake control portion 154, and a fluid leakage detecting portion 156 that is configured to detect the fluid leakage in the pressure-increase linear valve 26. The high-pressure-source control portion 150 is considered as a functional portion that directly controls the high-pressure-source device 22, more specifically, the operation of the motor 92 of the device 22. The valve control portion 152 is considered as a functional portion that directly controls the operation of the pressure-increase linear valve 26 and the operation of the pressure-decrease linear valve 28. The brake control portion 154 is considered as a functional portion that controls the high-pressure-source control portion 150 and the valve control portion 152.

The brake control portion 154 has, each as a subordinate functional portion, a normal-condition control portion 158 and a fluid leakage coping portion 160. The fluid leakage coping portion 160 has, each as a subordinate functional portion, a small-volume leakage coping portion 162 and a large-volume leakage coping portion 164. The normal-condition control portion 158 controls, in a normal condition, the high-pressure-source control portion 150 and the valve control portion 152. The fluid leakage coping portion 160 controls, in place of the normal-condition control portion 158, the high-pressure-source control portion 150 and the valve control portion 152 when the fluid leakage in the pressure-increase linear valve 26 is detected by the fluid leakage detecting portion 156. More specifically, the small-volume leakage coping portion 162 controls the high-pressure-source control portion 150 when it is judged that the detected fluid leakage is not beyond the set degree. The large-volume leakage coping portion 164 controls the valve control portion 152 when it is judged that the detected fluid leakage is beyond the set degree.

By execution of the brake control program, various controls relating to each of the high-pressure-source device 22, the pressure-increase linear valve 26, and the pressure-decrease linear valve 28 are executed. The controls are systematically indicated in a table of FIG. 23. There is hereinafter explained a relationship between the controls and the functional portions described above. The high-pressure-source control portion 150 is considered as a functional portion effectuated by execution of the controls listed in a column "CONTROL OF HIGH-PRESSURE-SOURCE DEVICE". The valve control portion 152 is considered as a functional portion effectuated by execution of the controls listed in columns "CONTROL OF PRESSURE-INCREASE LINEAR VALVE" and "CONTROL OF PRESSURE-DECREASE LINEAR VALVE". As apparent from the table, the brake ECU 30 is configured such that the high-pressure-source control portion 150 executes, in place of the normal-condition high-pressure-source control, various controls when the fluid leakage in the pressure-increase linear valve 26 occurs and such that the valve control portion 152 executes various controls, in place of the normal-condition pressure-increase-valve control and the normal-condition pressure-decrease-valve control, various controls when the fluid leakage in the pressure-increase linear valve 26 occurs. The normal-condition control portion 158 is considered as a functional portion effectuated by execution of the normal-condition brake control. The small-volume leakage coping portion 162 is considered as a functional portion effectuated by execution of the brake control in the small-volume leakage condition while the large-volume leakage coping portion 164 is considered as a functional portion effectuated by execution of the first through third brake controls in the large-volume leakage condition. The fluid leakage detecting portion 156 is considered as a functional portion effectuated by execution of the first and second leakage detection processing programs explained above.

<Modified Examples>

In the hydraulic brake system according to the illustrated embodiment, the adjusted pressure is introduced as the pilot pressure into the regulator 24 as the pressure regulator, the servo pressure that is the supply pressure from the regulator 24 is introduced into the master cylinder device 16, and the master pressure that is the supply pressure from the master cylinder device 16 is introduced into the brake devices 12. The claimable invention may be applied to systems constructed otherwise. For instance, the claimable invention may be applied to a system configured such that the servo pressure from the regulator is introduced directly into the brake devices without passing through the master cylinder device. Further, the claimable invention may be applied to a system configured such that the adjusted pressure is introduced as the servo pressure directly into the master cylinder device, without providing the regulator. Moreover, the claimable invention may be applied to a system configured such that the adjusted pressure is introduced directly into the brake devices. In other words, the claimable invention may be applied to a system in which a pair of pressure-increase valve and pressure-decrease valve that constitute the antilock unit is a pair of pressure-increase linear valve and pressure-decrease linear valve.

In the system according to the illustrated embodiment, the brake control in the small-volume leakage condition and the three sorts of the brake control in the large-volume leakage condition are executable. The system may be configured such that only one of: the brake control in the small-volume leakage condition and the brake control in the large-volume leakage condition is executed. Only any one or two of the three sorts of the brake control in the large-volume leakage condition may be executed.

Concerning the brake control in the large-volume leakage condition, only one of the pump-driving inhibiting control and the upper-limit-pressure reducing control may be executed in the braking-force non-required state of the first brake control in the large-volume leakage condition. Further, only the upper-limit-pressure reducing control may be executed or one of the pump-driving inhibiting control and the upper-limit-pressure reducing control may be selectively executed, in the braking-force non-required state of the second and third brake controls in the large-volume leakage condition.

The second brake control in the large-volume leakage condition may be arranged such that the pressure-increase-valve opening control is not executed. Similarly, the third brake control in the large-volume leakage condition may be arranged such that one of or both of the pressure-increase-valve closure maintaining control and the pressure-increase-valve opening adjusting control are not executed in the large-braking-force required state. Further, the third brake control in the large-volume leakage condition may be arranged such that one of or both of the pressure-decrease-valve closure maintaining control and the pressure-decrease-valve opening adjusting control are not executed in the small-braking-force required state. The third brake control in the large-volume leakage condition may be arranged such that the pressure-increase-valve opening control is not executed.

Concerning the fluid leakage detection processing, it is possible not to execute one of the first fluid leakage detection processing and the second fluid leakage detection processing. Further, the second fluid leakage detection processing may be arranged such that one of the detection processing in the pump non-driven state and the detection processing in the pump driven state is not executed. In short, a system in which none of the fluid leakage detection processing is executed is incorporated in the hydraulic brake system according to the claimable invention.

[Reference Signs List]

12: brake device 14: brake pedal [brake operation member] 16: master cylinder device 20: reservoir [low-pressure source] 22: high-pressure-source device 24: regulator [pressure regulator] 26: electromagnetic pressure-increase linear valve [SAR] 28: electromagnetic pressure-decrease linear valve [SLR] 30: brake electronic control unit (brake ECU) [controller] 40: housing 42: first pressurizing piston [pressurizing piston] 44: second pressurizing piston [pressurizing piston] 46: input piston 48: stroke simulator mechanism [reaction-force applying mechanism] 50: partition portion 52: front-side chamber 54: rear-side chamber 56: flange 58: main body portion 60: protruding portion 62: opening 86: reaction-force pressure sensor [$P_{RCT}$] 90: pump 92: motor 94: accumulator 96: high-pressure-source pressure sensor [$P_{ACC}$] 100: housing 102: first piston [movable member] 104: second piston [movable member] 106: ring-shaped valve seat 108: valve rod 110: piston main body 112: plunger 120: valve mechanism 130: atmospheric pressure passage [low-pressure-source communication passage] 134: servo pressure sensor [$P_{SRV}$] 140: brake operation amount sensor [$\delta_{PDL}$] 142: brake operation force sensor [$F_{PDL}$] 150: high-pressure-source control portion 152: valve control portion 154: brake control portion 156: fluid leakage detecting portion 158: normal-condition control portion 160: fluid leakage coping portion 162: small-volume leakage coping portion 164: large-volume leakage coping portion R1: first pressurizing chamber [pressurizing chamber] R2: second pressurizing chamber [pressurizing chamber] R3: inter-piston chamber R4: input chamber R5: opposing chamber R6: reaction-force chamber R7: buffer chamber R8: first pilot chamber R9: second pilot chamber [pilot chamber] R10: regulated-pressure chamber R11: high pressure chamber

The invention claimed is:

1. A hydraulic brake system for a vehicle, comprising: (a) a brake device provided for a wheel of the vehicle, (b) a high-pressure-source device having a pump configured to pump up a working fluid from a low-pressure source and to pressurize the working fluid and an accumulator for accumulating the working fluid pressurized by the pump, the high-pressure-source device being configured to supply the working fluid that is highly pressurized, (c) a pressure adjusting valve device having an electromagnetic pressure-increase linear valve and an electromagnetic pressure-decrease linear valve that are disposed in series between the high-pressure-source device and the low-pressure source, the pressure adjusting valve device being configured to adjust a pressure of the working fluid between the pressure-increase linear valve and the pressure-decrease linear valve, and (d) a controller configured to control the hydraulic brake system, the hydraulic brake system being configured to cause the brake device to generate a braking force whose magnitude depends on an adjusted pressure that is a pressure of the working fluid adjusted by the pressure adjusting valve device, wherein the controller includes:
   a high-pressure-source control portion configured to execute a normal-condition high-pressure-source control in which a high-pressure-source pressure that is a pressure of the working fluid supplied from the high-pressure-source device is maintained so as to fall within a set pressure range by activating the pump when the high-pressure-source pressure becomes lower than a set lower-limit pressure and by stopping the pump when the high-pressure-source pressure becomes higher than a set upper-limit pressure;
   a valve control portion configured to execute a normal-condition pressure-increase-valve control in which electricity to be supplied to the pressure-increase linear valve is adjusted and a normal-condition pressure-decrease-valve control in which electricity to be supplied to the pressure-decrease linear valve is adjusted, such that the adjusted pressure becomes equal to a pressure in accordance with a required braking force that is a braking force required to be generated by the brake device; and
   a fluid leakage coping portion configured to cope with leakage of the working fluid when the leakage of the working fluid is detected in the pressure-increase linear valve,
wherein the fluid leakage coping portion has a large-volume leakage coping portion configured to cope with the leakage of the working fluid in the pressure-increase linear valve that is beyond a set degree.

2. The hydraulic brake system according to claim 1, wherein the large-volume leakage coping portion is configured to control the high-pressure-source control portion to execute, in a braking-force non-required state in which generation of the braking force by the brake device is not required, a pump-driving limiting control in which driving of the pump is limited, in place of the normal-condition high-pressure-source control.

3. The hydraulic brake system according to claim 2, wherein the high-pressure-source control portion is configured to limit driving of the pump in the pump-driving limiting control by inhibiting driving of the pump irrespective of whether the high-pressure-source pressure falls within the set pressure range.

4. The hydraulic brake system according to claim 1, wherein the high-pressure-source control portion is configured to limit driving of the pump in the pump-driving limiting control by stopping driving of the pump when the high-pressure-source pressure becomes higher than an upper-limit pressure in a large-volume leakage condition that is set so as to be lower than the set upper-limit pressure.

5. The hydraulic brake system according to claim 4, wherein the upper-limit pressure in the large-volume leakage condition is set as a pressure that does not cause generation of the braking force by the brake device in the braking-force non-required state.

6. The hydraulic brake system according to claim 1, wherein the large-volume leakage coping portion is configured to control the high-pressure-source control portion to execute, in a braking-force required state in which generation of the braking force by the brake device is required, a pump forcible-driving control in which the pump is driven irrespective of whether the high-pressure-source pressure falls within the set pressure range, in place of the normal-condition high-pressure-source control.

7. The hydraulic brake system according to claim 1, wherein the large-volume leakage coping portion is configured to control the high-pressure-source control portion to execute, in a braking-force required state in which generation of the braking force by the brake device is required, a pump-based pressure regulating control in which the pump is driven until the braking force generated by the brake device reaches the required braking force and the pump is stopped being driven when the braking force reaches the required braking force, in place of the normal-condition high-pressure-source control.

8. The hydraulic brake system according to claim 7, wherein the high-pressure-source control portion is configured to change, in the pump-based pressure regulating control, a degree of driving of the pump in accordance with a degree of change in the required braking force.

9. The hydraulic brake system according to claim 1,
wherein, in a situation in which there is caused the leakage of the working fluid in the pressure-increase linear valve to such an extent that the adjusted pressure is equal to a remaining pressure at a certain level in a state in which the pressure-decrease linear valve is opened and the pump is being driven, the large-volume leakage coping portion controls the high-pressure-source control portion to execute, in place of the normal-condition high-pressure-source control, a pump forcible-driving control in which the pump is driven in the process of increase of the braking force irrespective of whether the high-pressure-source pressure falls within the set pressure range, and the large-volume leakage coping portion controls the valve control portion to execute, in place of the normal-condition pressure-decrease-valve control, a pressure-decrease-valve adjusting control in which electricity supplied to the pressure-decrease linear valve is adjusted also in the process of increase of the braking force such that the braking force becomes equal to the required braking force, where the required braking force is larger than the braking force in accordance with the remaining pressure in a braking-force required state in which generation of the braking force by the brake device is required, and
wherein, in the situation, the large-volume leakage coping portion controls the high-pressure-source control portion to execute, in place of the normal-condition high-pressure-source control, a pump-based pressure regulating control in which the pump is driven until the braking force generated by the brake device reaches the required braking force and the pump is stopped being driven when the braking force reaches the required braking force, where the required braking force is not larger than the braking force in accordance with the remaining pressure in the braking-force required state.

10. The hydraulic brake system according to claim 1, wherein the fluid leakage coping portion has a small-volume leakage coping portion configured to cope with the leakage of the working fluid in the pressure-increase linear valve that does not exceed the set degree.

11. The hydraulic brake system according to claim 10, wherein the small-volume leakage coping portion is configured to control the high-pressure-source control portion to execute, in place of the normal-condition high-pressure-source control, a pump intermittent-driving control in which the pump is repeatedly driven at set driving time intervals during a set driving time.

12. The hydraulic brake system according to claim 10, wherein the small-volume leakage coping portion is configured to control the high-pressure-source control portion to execute a pump intermittent-driving control in which the pump is repeatedly driven at set driving time intervals during a set driving time in a braking-force non-required state in which generation of the braking force by the brake device is not required and to execute a pump forcible-driving control in which the pump is driven in a braking-force required state in which the generation of the braking force by the brake device is required irrespective of whether the high-pressure-source pressure falls within the set pressure range, in place of the normal-condition high-pressure-source control.

13. The hydraulic brake system according to claim 1, wherein the set degree is set as a degree of the leakage of the working fluid in the pressure-increase linear valve at which generation of the braking force is expected when the pressure-increase linear valve is in a closed state and the pressure-decrease linear valve is in an open state.

14. The hydraulic brake system according to claim 1, further comprising a fluid leakage detecting portion configured to detect leakage of the working fluid in the pressure-increase linear valve,
wherein the fluid leakage coping portion is configured to cope with the leakage of the working fluid in the pressure-increase linear valve based on a result of detection by the fluid leakage detecting portion.

15. The hydraulic brake system according to claim 14, wherein the fluid leakage detecting portion is configured to place the pressure-decrease linear valve in a closed state in a stationary state of the vehicle and to detect the leakage of the working fluid in the pressure-increase linear valve based on a change of a braking force index in the stationary state of the vehicle, the braking force index indicative of the braking force.

16. The hydraulic brake system according to claim 14, wherein the fluid leakage detecting portion is configured to detect the leakage of the working fluid in the pressure-increase linear valve based on a change in the high-pressure-source pressure in a braking-force non-required state in which generation of the braking force by the brake device is not required.

17. The hydraulic brake system according to claim 16, wherein the fluid leakage detecting portion is configured to detect the leakage of the working fluid in the pressure-increase linear valve based on a degree of increase in the high-pressure-source pressure when the pump is being driven in the braking-force non-required state.

18. The hydraulic brake system according to claim 16, wherein the fluid leakage detecting portion is configured to detect the leakage of the working fluid in the pressure-increase linear valve based on a degree of decrease in the high-pressure-source pressure when the pump is not being driven in the braking-force non-required state.

19. The hydraulic brake system according to claim 1, further comprising a pressure regulator having a pilot chamber and configured to regulate a pressure of the working fluid supplied from the high-pressure-source device so as to be equal to a pressure in accordance with a pilot pressure that is a pressure of the working fluid in the pilot chamber and to supply the working fluid whose pressure is regulated,
 wherein the pressure-increase linear valve is disposed between the high-pressure-source device and the pilot chamber and the pressure-decrease linear valve is disposed between the pilot chamber and the low-pressure source, whereby the pressure adjusting valve device adjusts the pilot pressure as the adjusted pressure, and
 wherein the hydraulic brake system is configured to cause the brake device to generate a braking force whose magnitude depends on a supply pressure that is a pressure of the working fluid supplied from the pressure regulator.

20. The hydraulic brake system according to claim 1, further comprising a master cylinder device to which a brake operation member is connected and which is configured to receive the working fluid having the adjusted pressure or a pressure in accordance with the adjusted pressure and to supply, to the brake device, the working fluid that is pressurized depending on the pressure of the received working fluid without depending on an operation force applied to the brake operation member by a driver,
 wherein the hydraulic brake system is configured to cause the brake device to generate a braking force whose magnitude depends on a master pressure that is a pressure of the working fluid supplied from the master cylinder device to the brake device.

* * * * *